US 7,714,071 B2

(12) United States Patent
Hoenig et al.

(10) Patent No.: US 7,714,071 B2
(45) Date of Patent: *May 11, 2010

(54) POLYMER BLENDS FROM INTERPOLYMERS OF ETHYLENE/α-OLEFINS AND FLEXIBLE MOLDED ARTICLES MADE THEREFROM

(75) Inventors: Stephen M. Hoenig, Lake Jackson, TX (US); Yunwa W. Cheung, Lake Jackson, TX (US); Daniel G. Moldovan, Danbury, TX (US); Wenbin Liang, Sugar Land, TX (US); Chuiwah A. Cheung, Lake Jackson, TX (US); Ray A. Lewis, Midland, MI (US); John Newton, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 643 days.

This patent is subject to a terminal disclaimer.

(21) Appl. No.: 11/376,956

(22) Filed: Mar. 15, 2006

(65) Prior Publication Data

US 2006/0211819 A1 Sep. 21, 2006

Related U.S. Application Data

(63) Continuation-in-part of application No. PCT/US2005/008917, filed on Mar. 17, 2005.

(60) Provisional application No. 60/553,906, filed on Mar. 17, 2004, provisional application No. 60/718,245, filed on Sep. 16, 2005.

(51) Int. Cl.
*C08L 23/00* (2006.01)
*C08L 23/04* (2006.01)
*C08G 18/42* (2006.01)
*C08K 5/00* (2006.01)

(52) U.S. Cl. .................. 525/191; 525/240; 524/500; 524/515

(58) Field of Classification Search .............. 525/191, 525/240, 241; 524/500, 515
See application file for complete search history.

(56) References Cited

U.S. PATENT DOCUMENTS

| | | | |
|---|---|---|---|
| 2,973,344 A | 2/1961 | Fasce | |
| 2,997,432 A | 8/1961 | Koble et al. | |
| 3,873,642 A | 3/1975 | Jezl | |
| 4,146,492 A | 3/1979 | Cusano et al. | |
| 4,299,931 A | 11/1981 | Coran et al. | |
| 4,429,079 A * | 1/1984 | Shibata et al. | 525/240 |
| 4,510,031 A | 4/1985 | Matsumura et al. | |
| 4,780,228 A | 10/1988 | Gardiner et al. | |
| 4,798,081 A | 1/1989 | Hazlitt et al. | |
| 5,068,047 A | 11/1991 | Chung et al. | |
| 5,266,626 A * | 11/1993 | Hert et al. | 524/518 |
| 5,322,728 A | 6/1994 | Davey et al. | |
| 5,391,629 A | 2/1995 | Turner et al. | |
| 5,468,810 A | 11/1995 | Hayakawa et al. | |
| 5,594,080 A | 1/1997 | Waymouth et al. | |
| 5,597,881 A | 1/1997 | Winter et al. | |
| 5,610,253 A | 3/1997 | Hatke et al. | |
| 5,624,991 A | 4/1997 | Harada et al. | |
| 5,733,980 A | 3/1998 | Cozewith et al. | |
| 5,773,155 A | 6/1998 | Kale et al. | |
| 5,783,531 A | 7/1998 | Andrew et al. | |
| 5,798,420 A | 8/1998 | Cozewith et al. | |
| 5,868,984 A | 2/1999 | Winter et al. | |
| 5,892,076 A | 4/1999 | Nickias | |
| 5,916,953 A | 6/1999 | Jacoby et al. | |
| 5,969,070 A | 10/1999 | Waymouth et al. | |
| 5,994,255 A | 11/1999 | Nickias et al. | |
| 6,008,262 A | 12/1999 | McKay et al. | |
| 6,025,448 A | 2/2000 | Swindoll et al. | |
| 6,087,431 A | 7/2000 | Uchida et al. | |
| 6,096,668 A | 8/2000 | Abuto et al. | |
| 6,114,457 A | 9/2000 | Markel et al. | |
| 6,121,402 A * | 9/2000 | Machida et al. | 526/352 |
| 6,124,400 A | 9/2000 | Chien et al. | |
| 6,136,937 A | 10/2000 | Lai et al. | |
| 6,143,828 A | 11/2000 | Chee et al. | |
| 6,147,180 A | 11/2000 | Markel et al. | |

(Continued)

FOREIGN PATENT DOCUMENTS

EP 0 274 906 A2 7/1988

(Continued)

OTHER PUBLICATIONS

International Search Report and Written Opinion of the International Searching Authority mailed Apr. 25, 2007 (PCT/US2006/009378).

(Continued)

*Primary Examiner*—Nathan M Nutter
(74) *Attorney, Agent, or Firm*—Whyte Hirschboeck Dudek SC

(57) ABSTRACT

Polymer blends comprises 1) at least one ethylene/α-olefin interpolymer and 2) at least one polyolefin, or at least one styrenic block copolymer, or a combination thereof. Such polyolefins include, but are not limited to, high melt strength high density polyethylene and high melt strength polypropylene. The ethylene/α-olefin interpolymers are random block copolymers comprising at least a hard block and at least a soft block. The polyolefins can be homopolymers or interpolymers. The resulting polymer blends can be used to make flexible molded articles.

24 Claims, 9 Drawing Sheets

U.S. PATENT DOCUMENTS

| | | | |
|---|---|---|---|
| 6,160,029 | A | 12/2000 | Chaudhary et al. |
| 6,177,377 | B1 | 1/2001 | Chien |
| 6,187,424 | B1 | 2/2001 | Kjellqvist et al. |
| 6,197,404 | B1 | 3/2001 | Varona |
| 6,262,203 | B1 | 7/2001 | Chien et al. |
| 6,287,705 | B1 | 9/2001 | Seta et al. |
| 6,362,252 | B1 | 3/2002 | Prutkin |
| 6,433,090 | B1 | 8/2002 | Ellul et al. |
| 6,455,638 | B2 | 9/2002 | Laughner et al. |
| 6,537,472 | B2 | 3/2003 | Masubuchi |
| 6,566,446 | B1 | 5/2003 | Parikh et al. |
| 6,566,544 | B1 | 5/2003 | Waymouth et al. |
| 6,815,023 | B1 * | 11/2004 | Tatarka et al. ............ 428/34.9 |
| 7,005,395 | B2 | 2/2006 | Zafiroglu et al. |
| 7,355,089 | B2 * | 4/2008 | Chang et al. ............ 604/358 |
| 2001/0039314 | A1 | 11/2001 | Mehta et al. |
| 2003/0027954 | A1 | 2/2003 | Becke et al. |
| 2003/0194575 | A1 | 10/2003 | Tau et al. |
| 2003/0195128 | A1 | 10/2003 | Deckman et al. |
| 2003/0216518 | A1 * | 11/2003 | Tau et al. ............ 525/191 |
| 2004/0082750 | A1 | 4/2004 | Tau et al. |
| 2004/0121922 | A1 | 6/2004 | Okada et al. |
| 2004/0143048 | A1 | 7/2004 | Tomioka et al. |
| 2004/0158011 | A1 * | 8/2004 | Jain et al. ............ 526/160 |
| 2004/0192147 | A1 * | 9/2004 | Smith et al. ............ 442/415 |
| 2005/0009993 | A1 | 1/2005 | Morioka et al. |
| 2005/0176892 | A1 | 8/2005 | Weaver et al. |
| 2006/0030667 | A1 | 2/2006 | Yalvac et al. |
| 2006/0199884 | A1 * | 9/2006 | Hoenig et al. ............ 524/230 |
| 2006/0199887 | A1 * | 9/2006 | Liang et al. ............ 524/423 |
| 2006/0199897 | A1 * | 9/2006 | Karjala et al. ............ 524/543 |
| 2006/0199905 | A1 * | 9/2006 | Hughes et al. ............ 525/191 |
| 2006/0199906 | A1 * | 9/2006 | Walton et al. ............ 525/191 |
| 2006/0199907 | A1 * | 9/2006 | Chang et al. ............ 525/191 |
| 2006/0199908 | A1 * | 9/2006 | Cheung et al. ............ 525/191 |
| 2006/0199910 | A1 * | 9/2006 | Walton et al. ............ 525/192 |
| 2006/0199912 | A1 * | 9/2006 | Fuchs et al. ............ 525/240 |
| 2006/0199931 | A1 * | 9/2006 | Poon et al. ............ 526/346 |
| 2006/0205833 | A1 * | 9/2006 | Martinez et al. ............ 521/142 |
| 2007/0010616 | A1 * | 1/2007 | Kapur et al. ............ 524/525 |
| 2007/0066756 | A1 * | 3/2007 | Poon et al. ............ 525/191 |
| 2007/0078222 | A1 * | 4/2007 | Chang et al. ............ 525/88 |
| 2007/0092704 | A1 * | 4/2007 | Patel et al. ............ 428/212 |
| 2007/0112127 | A1 * | 5/2007 | Soediono et al. ............ 524/543 |
| 2007/0155900 | A1 * | 7/2007 | Chang et al. ............ 525/88 |
| 2008/0177242 | A1 * | 7/2008 | Chang et al. ............ 604/385.01 |
| 2008/0234435 | A1 * | 9/2008 | Chang et al. ............ 525/240 |
| 2008/0299857 | A1 | 12/2008 | Harding et al. |
| 2009/0042472 | A1 * | 2/2009 | Poon et al. ............ 442/182 |

FOREIGN PATENT DOCUMENTS

| | | |
|---|---|---|
| EP | 0 287 282 | 10/1988 |
| EP | 0 741 164 | 11/1996 |
| EP | 0 877 050 | 11/1998 |
| EP | 0982328 A1 | 3/2000 |
| EP | 1002814 A1 | 5/2000 |
| EP | 1 026 184 | 8/2000 |
| EP | 1097976 A2 | 5/2001 |
| EP | 1162213 A1 | 12/2001 |
| EP | 0 958 313 B1 | 9/2002 |
| EP | 1 262 498 A2 | 12/2002 |
| EP | 1 288 256 | 3/2003 |
| EP | 1 375 585 A1 | 1/2004 |
| EP | 1588843 A1 | 10/2005 |
| JP | 2002-206007 A | 7/2002 |
| JP | 2004-204058 A | 7/2004 |
| WO | WO 95/27745 A1 | 10/1995 |
| WO | WO 95/27746 A1 | 10/1995 |
| WO | 9612762 A1 | 5/1996 |
| WO | WO 97/12919 | 4/1997 |
| WO | WO 98/05731 A1 | 2/1998 |
| WO | WO 98/34970 A1 | 8/1998 |
| WO | WO 99/35171 A1 | 7/1999 |
| WO | WO 00/37514 A1 | 6/2000 |
| WO | WO 02/066540 A2 | 8/2002 |
| WO | WO 02/079322 | 10/2002 |
| WO | WO 03/002625 | 1/2003 |
| WO | WO 03/014046 A1 | 2/2003 |
| WO | WO 03/040095 | 5/2003 |
| WO | WO 03/040201 A1 | 5/2003 |
| WO | WO 03/082971 A2 | 10/2003 |
| WO | WO 2004/031292 | 4/2004 |
| WO | WO 2005/090425 A1 | 9/2005 |
| WO | WO 2005/090426 A1 | 9/2005 |
| WO | WO 2005/090427 A1 | 9/2005 |

OTHER PUBLICATIONS

International Search Report and Written Opinion of the International Searching Authority mailed May 18, 2007 (PCT/US2006/009402).

Nitta K, et al.; "Polypropylene-block-poly(ethylene-co-propylene) addition to polypropylene/poly(ethylene-co-propylene) blends: morphology and mechanical properties"; Aug. 2000; Polymer, Elsevier Science Publishers B.V., GB.

Tanem B. S. et al., "Blends of single-site linear and branched polyethylene. I Thermal characterisation", Jun. 2001, pp. 5389-5399, vol. 42, No. 12, Polymer, Elsevier Science Publishers B.V., GB (XP004231005).

International Search Report and Written Opinion of the International Searching Authority mailed Aug. 6, 2007 (PCT/US2006/009501).

International Search Report and Written Opinion of the International Searching Authority mailed Jun. 1, 2007 (PCT/US2006/009856).

International Search Report and Written Opinion of the International Searching Authority mailed Jun. 1, 2007 (PCT/US2006/009404).

International Preliminary Report on Patentability [Chap. I] (PCT/US2006/9559), dated Sep. 27, 2007.

International Preliminary Report on Patentability [Chap. I] (PCT/US2006/9501), dated Sep. 27, 2007.

International Preliminary Report on Patentability [Chap. I] (PCT/US2006/9856), dated Sep. 27, 2007.

International Preliminary Report on Patentability [Chap. I] (PCT/US2006/9406), dated Sep. 27, 2007.

International Preliminary Report on Patentability [Chap. II] (PCT/US2006/9378), dated Nov. 16, 2007.

International Preliminary Report on Patentability [Chap. II] (PCT/US2006/9857), dated Nov. 15, 2007.

Nitta et al, Polymer, 41(18), 2000, 6765-6771.

* cited by examiner

US 7,714,071 B2

POLYMER BLENDS FROM INTERPOLYMERS OF ETHYLENE/α-OLEFINS AND FLEXIBLE MOLDED ARTICLES MADE THEREFROM

CROSS-REFERENCE TO RELATED APPLICATIONS

This application claims priority to U.S. Provisional Application No. 60/718,245, filed Sep. 16, 2005, which further claims priority to PCT Application No. PCT/US2005/008917, filed on Mar. 17, 2005, which in turn claims priority to U.S. Provisional Application No. 60/553,906, filed Mar. 17, 2004. For purposes of United States patent practice, the contents of the provisional application and the PCT application are herein incorporated by reference in their entirety.

FIELD OF THE INVENTION

This invention relates to polymer blends comprising at least one ethylene/α-olefin interpolymer and at least one polyolefin, methods of making the blends, and molded products made from the blends.

BACKGROUND OF THE INVENTION

The manufacture of durable goods in the United States alone accounts for millions of tons of plastics consumption annually. Durable goods are manufactured products capable of long utility which are found in various markets such as the automotive, construction, medical, food and beverage, electrical, appliance, business machine, and consumer markets. Some applications in these markets require the uses of flexible polymers or polymer blends. These applications include, but are not limited to, toys, grips, soft touch handles, bumper rub strips, floorings, auto floor mats, wheels, casters, furniture and appliance feet, tags, seals, gaskets such as static and dynamic gaskets, automotive doors, bumper fascia, grill components, rocker panels, hoses, linings, office supplies, seals, liners, diaphragms, tubes, lids, stoppers, plunger tips, delivery systems, kitchen wares, shoes, shoe bladders and shoe soles.

For used in durable goods applications, polymers or polymer blends are desired to possess good processibility (e.g., moldability), appealing appearance (e.g., clear or colorable), suitable surface properties (e.g., good adhesion to substrates, rubber-like feel, non-stickiness and good paintability), and a good combination of mechanical properties (e.g., flexibility, heat resistance, abrasion and/or scratch resistance, toughness, tensile strength, and compression set). Some polymers that possess suitable properties for durable goods include flexible polyvinylchloride (f-PVC), poly(styrene-butadiene-styrene) (SBS), poly(styrene-ethylene/butadiene-styrene) (SEBS), thermoplastic vulcanizates (TPV), thermoplastic poly(urethane) (TPU), and polyolefins such as polyolefin homopolymers and polyoelfin interpolymers.

Some polyolefins such as polypropylene (PP) and low density polyethylene (LDPE) have found wide acceptance for use in durable goods applications for their ease of molding, good heat resistance and mechanical properties. Furthermore, many formulations based on blends of polyolefins and other polymers have been developed to meet the demands required by the production of parts of durable goods. For example, a blend of polypropylene and polyethylene can be used to manufacture fibers for artificial turf applications.

Further, some flexible polymers including some polyolefin homopolymers or polyoelfin interpolymers may be tacky, which is an undesirable property in some processes or applications. In general, additives such as fatty acid amides, waxes or other non-tacky polymers can be mixed with such flexible polymers to reduce their tackiness. However, such additives are only effective to some degree and are known to have some undesirable properties of their own.

Despite the availability of a variety of polyolefins and their blends, there exists a continuing need for new polymers or new polymer blends that have improved properties and performance characteristics.

SUMMARY OF THE INVENTION

The aforementioned needs are met by various aspects of the inventions. In one aspect, the invention relates to a polymer blend comprising at least one ethylene/α-olefin interpolymer and one or more additional polymers. The additional polymer can be a polyolefin, styrenic block copolymer, polyvinylchloride, thermoplastic polyurethanes, or a combination thereof. In one embodiment, the ethylene/α-olefin interpolymer has a $M_w/M_n$ from about 1.7 to about 3.5, at least one melting point, $T_m$, in degrees Celsius, and a density, d, in grams/cubic centimeter, wherein the numerical values of $T_m$ and d correspond to the relationship:

$$T_m \geq -2002.9 + 4538.5(d) - 2422.2(d)^2.$$

In another embodiment, the ethylene/α-olefin interpolymer has a $M_w/M_n$ from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.

In another embodiment, the ethylene/α-olefin interpolymer is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$$Re > 1481 - 1629(d).$$

In another embodiment, the ethylene/α-olefin interpolymer has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer.

In another embodiment, the ethylene/α-olefin interpolymer is characterized by a storage modulus at 25° C., G'(25° C.), and a storage modulus at 100° C., G'(100° C.), wherein the ratio of G'(25° C.) to G'(100° C.) is from about 1:1 to about 10:1.

In another embodiment, the ethylene/α-olefin interpolymer has at least one molecular fraction which elutes between 40° C. and 130° C. when fractionated using TREF, characterized in that the fraction has a block index of at least 0.5 and up to about 1 and a molecular weight distribution, Mw/Mn, greater than about 1.3. In another embodiment, the ethylene/α-olefin interpolymer has an average block index greater than zero and up to about 1.0 and a molecular weight distribution, Mw/Mn, greater than about 1.3.

In another embodiment, the α-olefin in the ethylene/α-olefin interpolymer is styrene, propylene, 1-butene, 1-hexene, 1-octene, 4-methyl-1-pentene, norbornene, 1-decene, 1,5-hexadiene, or a combination thereof.

In another embodiment, the ethylene/α-olefin interpolymer is present in the range from about 5% to about 95% by weight of the total composition.

In another embodiment, the additional polymer is a polyolefin which is an olefin homopolymer, an olefin copolymer, an olefin terpolymer or a combination thereof. In another embodiment, the additional polymer includes, but is not limited to, a high melt strength polypropylene, a high melt strength high density polyethylene, an ethylene/propylene copolymer, a styrene-butadiene-styrene block copolymer, an ethylene/propylene/diene terpolymer, a styrene-ethylene-co-(butene)-styrene block copolymer or a combination thereof.

In another embodiment, the polyolefin is a high melt strength polypropylene, a high melt strength high density polyethylene, an ethylene/propylene copolymer, an ethylene/propylene/diene terpolymer, or a combination thereof. In another embodiment, the polyolefin is a polypropylene having a melt strength of at least 6 cN. In another embodiment, the polyolefin is a polypropylene having a melt strength of at least 10 cN.

In another embodiment, the styrenic block copolymer is a styrene-butadiene-styrene block copolymer, a styrene-ethylene-co-(butene)-styrene block copolymer or a combination thereof. In another embodiment, the styrenic block copolymer is a styrene-butadiene-styrene block copolymer. In another embodiment, the styrenic block copolymer is a styrene-ethylene/butylene-styrene block copolymer.

In another embodiment, the polymer blend further comprises at least an additive, which in some instances may be a slip agent, anti-blocking agent, plasticizer, oil, antioxidant, UV stabilizer, colorant or pigment, filler, lubricant, antifogging agent, flow aid, coupling agent, cross-linking agent, nucleating agent, surfactant, solvent, flame retardant, antistatic agent or a combination thereof.

In another aspect, the invention relates to flexible molded article comprising the polymer blend disclosed herein. In some embodiments, the flexible molded article includes toys, grips, soft touch handles, bumper rub strips, floorings, auto floor mats, wheels, casters, furniture and appliance feet, tags, seals, gaskets such as static and dynamic gaskets, automotive doors, bumper fascia, grill components, rocker panels, hoses, linings, office supplies, seals, liners, diaphragms, tubes, lids, stoppers, plunger tips, delivery systems, kitchen wares, shoes, shoe bladders, shoe soles and combinations thereof.

DETAILED DESCRIPTION OF THE INVENTION

General Definitions

Figure 1:
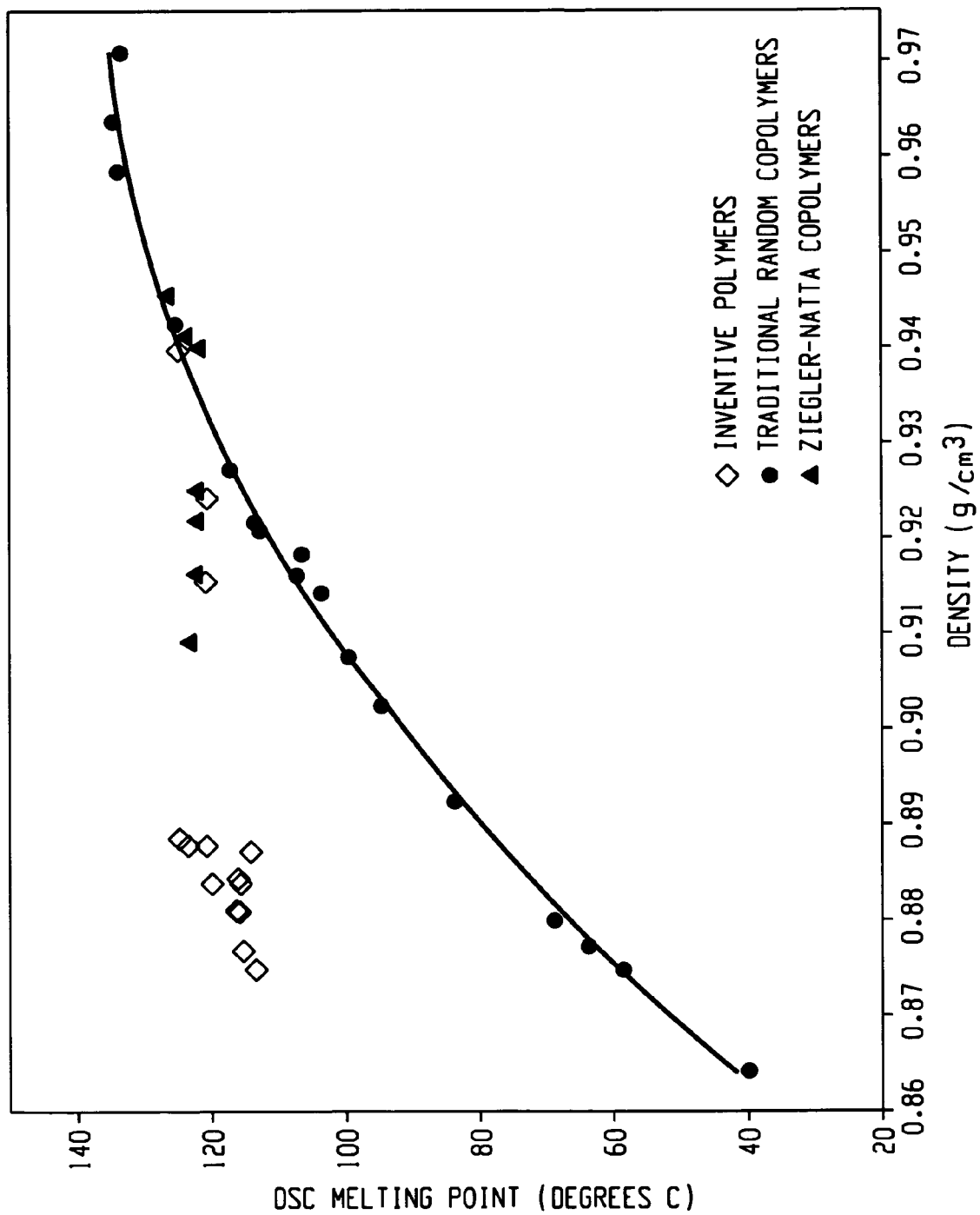
FIG. 1 shows the melting point/density relationship for the inventive polymers (represented by diamonds) as compared to traditional random copolymers (represented by circles) and Ziegler-Natta copolymers (represented by triangles).

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

The ethylene/α-olefin interpolymers comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and copolymer" are used interchangeably herein. In some embodiments, the multi-block copolymer can be represented by the following formula:

(AB)$_n$ where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA—AA—BBB—BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The multi-block polymers typically comprise various amounts of "hard" and "soft" segments. "Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprises all or substantially all ethylene. "Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in a concurrently filed U.S. patent application Ser. No. 11/376,835 entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed.

Embodiments of the invention provide polymer blends comprising at least one ethylene/α-olefin block interpolymer (to be described below) and one or more polymers, which are different than the ethylene/α-olefin block interpolymer. The additional polymers include, but are not limited to, thermoplastic polymers, elastomers, and rubbers, such as polyolefins, styrenic block copolymers, etc. The term "different" when referring to two polymers means that the two polymers differ in composition (comonomer type, comonomer content, etc.), structure, property, or a combination of both. For example, a block ethylene/octene copolymer is different than a random ethylene/octene copolymer, even if they have the same amount of comonomers. A block ethylene/octene copolymer is different than an ethylene/butane copolymer, regardless of whether it is a random or block copolymer or whether it has the same comonomer content. Two polyolefins also are considered different if they have a different molecular weight, even though they have the same structure and composition. Moreover, a random homogeneous ethylene/octene copolymer is different than a random heterogenous ethylene/octene copolymer, even if all other parameters may be the same.

The polymer blends possess unique physical and mechanical properties that are suitable for making molded articles for a variety of applications. The blends have relatively low modulus, while maintaining relatively high heat resistance. Such balance of properties makes the blends suitable for making flexible molded articles. The molded articles should have an upper use or service temperature of at least 40° C., at least 50° C., at least 60° C., at least 80° C., or at least 90° C.

The flexural modulus of the blends should be less than 20,000 psi, less than 10,000 psi, less than 5000 psi, less than 1000 psi, less than 500 psi.

Ethylene/α-Olefin Interpolymers

The ethylene/α-olefin interpolymers used in embodiments of the invention (also referred to as "inventive interpolymer" or "inventive polymer") comprise ethylene and one or more copolymerizable α-olefin comonomers in polymerized form, characterized by multiple blocks or segments of two or more polymerized monomer units differing in chemical or physical properties (block interpolymer), preferably a multi-block copolymer. The ethylene/α-olefin interpolymers are characterized by one or more of the aspects described as follows.

In one aspect, the ethylene/α-olefin interpolymers used in embodiments of the invention have a $M_w/M_n$ from about 1.7 to about 3.5 and at least one melting point, $T_m$, in degrees Celsius and density, d, in grams/cubic centimeter, wherein the numerical values of the variables correspond to the relationship:

$$T_m > -2002.9 + 4538.5(d) - 2422.2(d)^2\text{, and preferably}$$

$$T_m \geq -6288.1 + 13141(d) - 6720.3(d)_2\text{, and more preferably}$$

$$T_m \geq 858.91 - 1825.3(d) + 1112.8(d)^2.$$

Such melting point/density relationship is illustrated in FIG. 1. Unlike the traditional random copolymers of ethylene/α-olefins whose melting points decrease with decreasing densities, the inventive interpolymers (represented by diamonds) exhibit melting points substantially independent of the density, particularly when density is between about 0.87 g/cc to about 0.95 g/cc. For example, the melting point of such polymers are in the range of about 110° C. to about 130° C. when density ranges from 0.875 g/cc to about 0.945 g/cc. In some embodiments, the melting point of such polymers are in the range of about 115° C. to about 125° C. when density ranges from 0.875 g/cc to about 0.945 g/cc.

Figure 2:
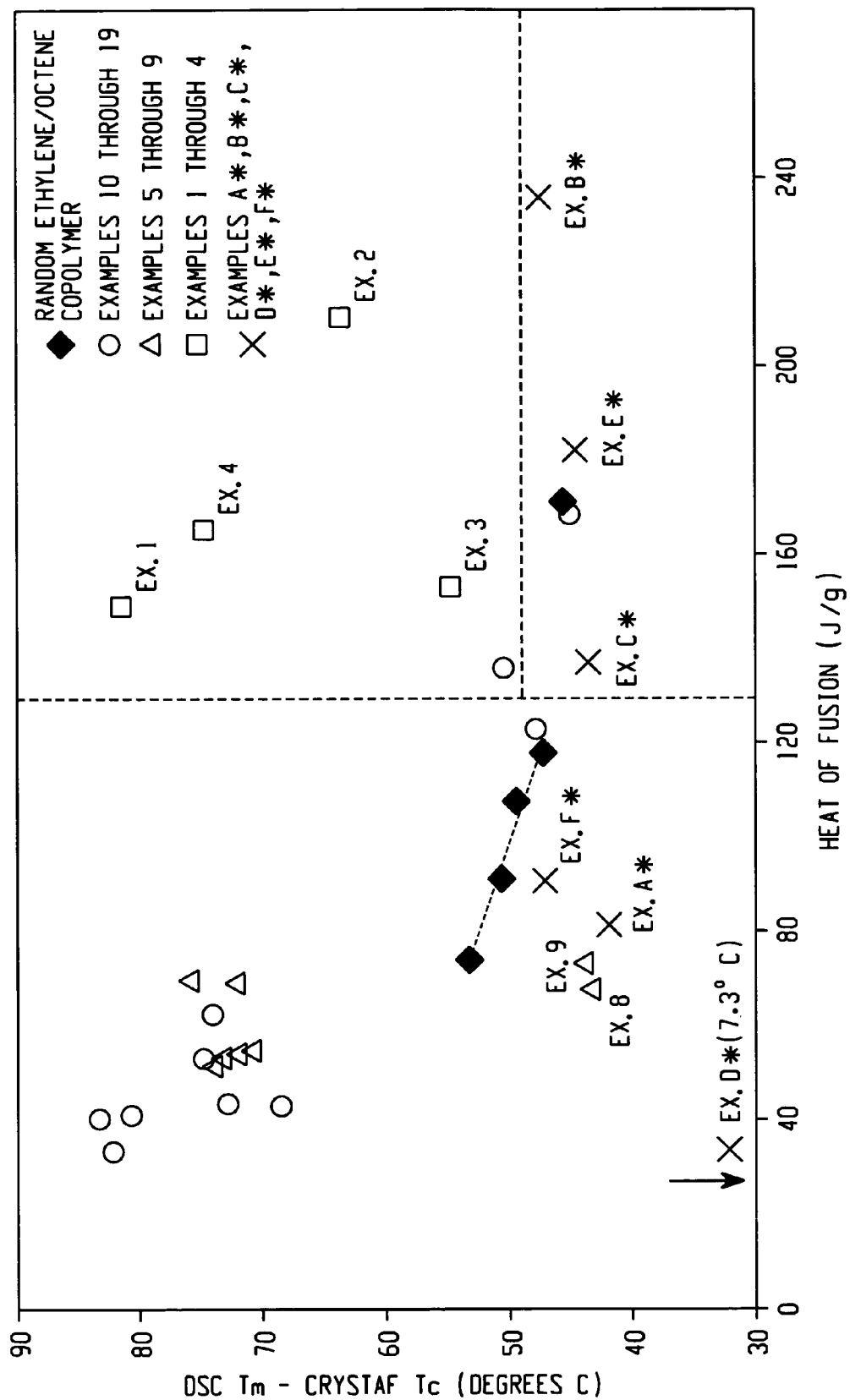
FIG. 2 shows plots of delta DSC-CRYSTAF as a function of DSC Melt Enthalpy for various polymers. The diamonds represent random ethylene/octene copolymers; the squares represent polymer examples 1-4; the triangles represent polymer examples 5-9; and the circles represent polymer Examples 10-19. The "X" symbols represent polymer Comparative Examples A*-F*.

In another aspect, the ethylene/α-olefin interpolymers comprise, in polymerized form, ethylene and one or more α-olefins and are characterized by a ΔT, in degree Celsius, defined as the temperature for the tallest Differential Scanning Calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$$\Delta T > -0.1299(\Delta H) + 62.81\text{, and preferably}$$

$$\Delta T \geq -0.1299(\Delta H) + 64.38\text{, and more preferably}$$

$$\Delta T \geq -0.1299(\Delta H) + 65.95,$$

for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer. FIG. 2 shows plotted data for inventive polymers as well as comparative examples. Integrated peak areas and peak temperatures are calculated by the computerized drawing program supplied by the instrument maker. The diagonal line shown for the random ethylene octene comparative polymers corresponds to the equation ΔT=−0.1299(ΔH)+62.81.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re > 1481 - 1629(d)$; and preferably $Re \geq 1491 - 1629(d)$; and more preferably $Re \geq 1501 - 1629(d)$; and even more preferably $Re \geq 1511 - 1629(d)$.

Figure 3:
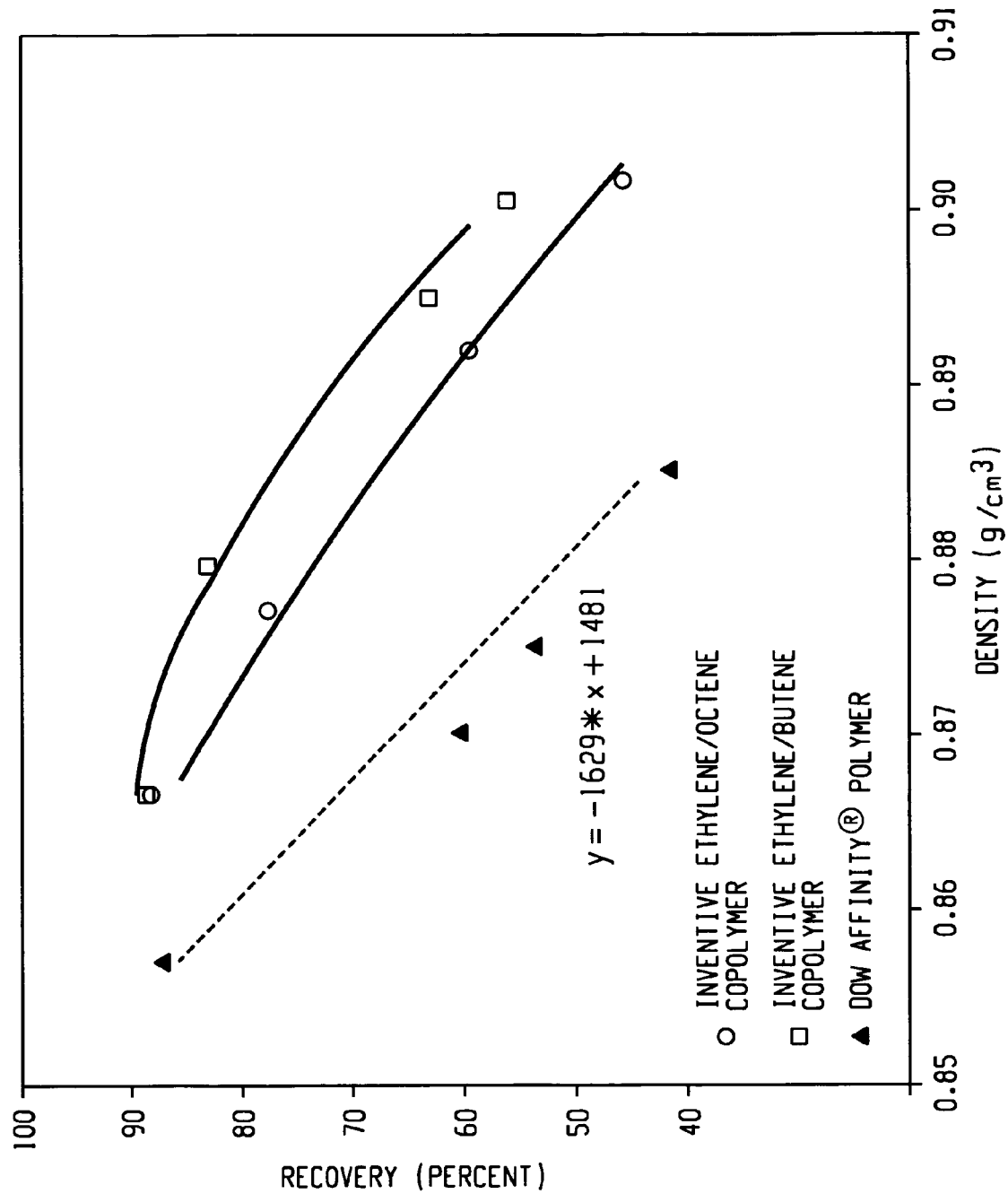
FIG. 3 shows the effect of density on elastic recovery for unoriented films made from inventive interpolymers (represented by the squares and circles) and traditional copolymers (represented by the triangles which are various Dow AFFINITY® polymers). The squares represent inventive ethylene/butene copolymers; and the circles represent inventive ethylene/octene copolymers.

FIG. 3 shows the effect of density on elastic recovery for unoriented films made from certain inventive interpolymers and traditional random copolymers. For the same density, the inventive interpolymers have substantially higher elastic recoveries.

In some embodiments, the ethylene/α-olefin interpolymers have a tensile strength above 10 MPa, preferably a tensile strength $\geq 11$ MPa, more preferably a tensile strength $\geq 13$ MPa and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G'(25° C.)/G'(100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of 0 percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin interpolymers have a heat of fusion of less than 85 J/g and/or a pellet blocking strength of equal to or less than 100 pounds/foot$^2$ (4800 Pa), preferably equal to or less than 50 lbs/ft$^2$ (2400 Pa), especially equal to or less than 5 lbs/ft$^2$ (240 Pa), and as low as 0 lbs/ft$^2$ (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the inventive polymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl: methylene area ratio [$CH_3/CH_2$] of the TREF peak.

Comonomer content may be measured using any suitable technique, with techniques based on nuclear magnetic resonance (NMR) spectroscopy preferred. Using this technique, said blocked interpolymers has higher molar comonomer content than a corresponding comparable interpolymer.

Preferably, for interpolymers of ethylene and 1-octene, the block interpolymer has a comonomer content of the TREF fraction eluting between 40 and 130° C. greater than or equal to the quantity (−0.2013)T+20.07, more preferably greater than or equal to the quantity (−0.2013) T+21.07, where T is the numerical value of the peak elution temperature of the TREF fraction being compared, measured in ° C.

Figure 4:
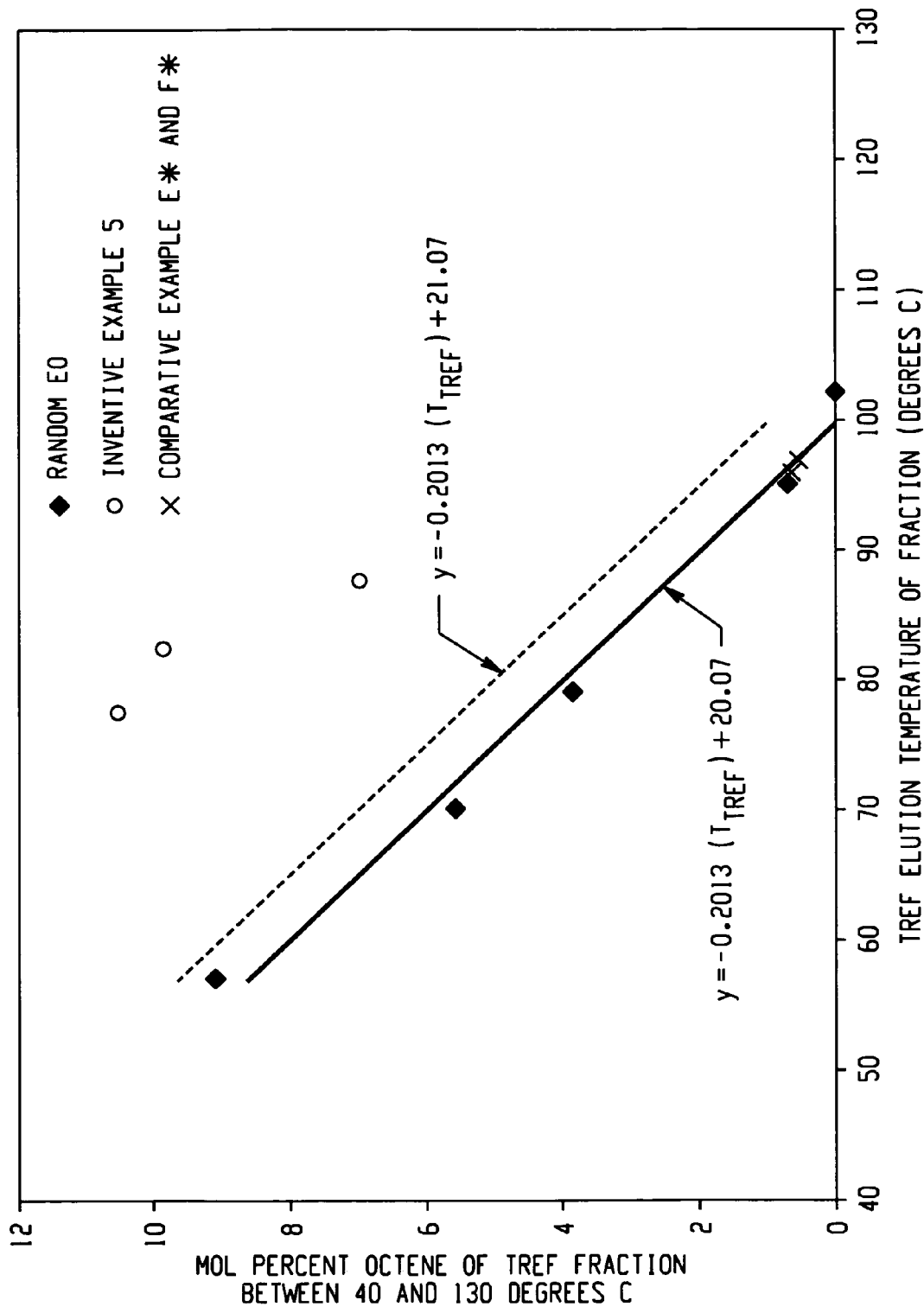
FIG. 4 is a plot of octene content of TREF fractionated ethylene/1-octene copolymer fractions versus TREF elution temperature of the fraction for the polymer of Example 5 (represented by the circles) and comparative polymer Comparative Examples E* and F* (represented by the "X" symbols). The diamonds represent traditional random ethylene/octene copolymers.

FIG. 4 graphically depicts an embodiment of the block interpolymers of ethylene and 1-octene where a plot of the comonomer content versus TREF elution temperature for several comparable ethylene/1-octene interpolymers (random copolymers) are fit to a line representing (−0.2013)T+20.07 (solid line). The line for the equation (−0.2013)T+21.07 is depicted by a dotted line. Also depicted are the comonomer contents for fractions of several block ethylene/1-octene interpolymers of the invention (multi-block copolymers). All of the block interpolymer fractions have significantly higher 1-octene content than either line at equivalent elution temperatures. This result is characteristic of the inventive interpolymer and is believed to be due to the presence of differentiated blocks within the polymer chains, having both crystalline and amorphous nature.

Figure 5:
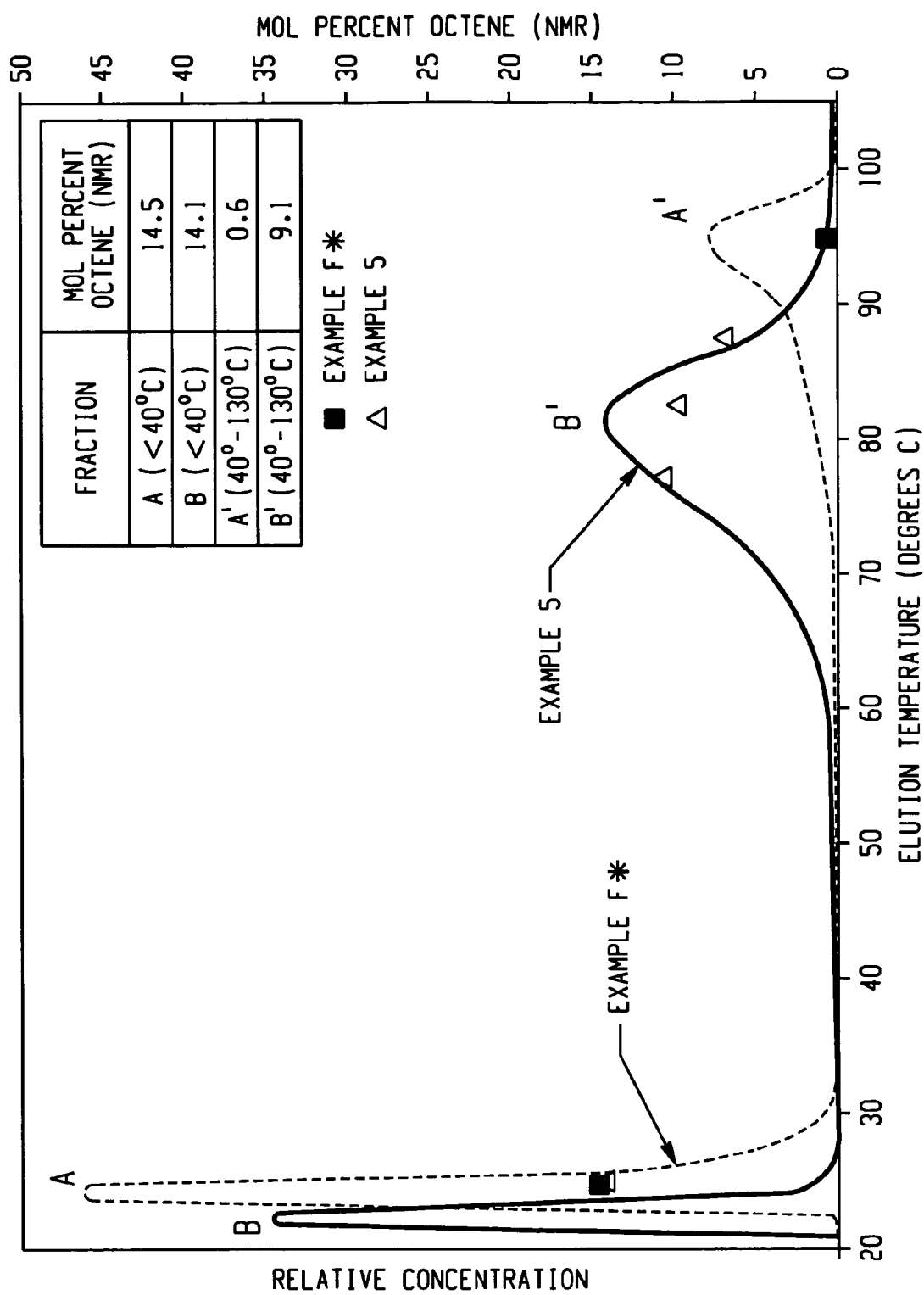
FIG. 5 is a plot of octene content of TREF fractionated ethylene/1-octene copolymer fractions versus TREF elution temperature of the fraction for the polymer of Example 5 (curve 1) and for polymer Comparative Examples F* (curve 2). The squares represent polymer Comparative Examples F*; and the triangles represent Example 5.

FIG. 5 graphically displays the TREF curve and comonomer contents of polymer fractions for Example 5 and comparative F to be discussed below. The peak eluting from 40 to 130° C., preferably from 60° C. to 95° C. for both polymers is fractionated into three parts, each part eluting over a temperature range of less than 10° C. Actual data for Example 5 is represented by triangles. The skilled artisan can appreciate that an appropriate calibration curve may be constructed for interpolymers containing different comonomers and a line used as a comparison fitted to the TREF values obtained from comparative interpolymers of the same monomers, preferably random copolymers made using a metallocene or other homogeneous catalyst composition. Inventive interpolymers are characterized by a molar comonomer content greater than the value determined from the calibration curve at the same TREF elution temperature, preferably at least 5 percent greater, more preferably at least 10 percent greater.

In addition to the above aspects and properties described herein, the inventive polymers can be characterized by one or more additional characteristics. In one aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one α-olefin, especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity (−0.1356) T+13.89, more preferably greater than or equal to the quantity (−0.1356) T+14.93, and most preferably greater than or equal to the quantity (−0.2013)T+21.07, where T is the numerical value of the peak ATREF elution temperature of the TREF fraction being compared, measured in ° C.

Preferably, for the above interpolymers of ethylene and at least one alpha-olefin especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

In still another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mol percent comonomer, has a DSC melting point that corresponds to the equation:

$$T_m \geq (-5.5926)(\text{mol percent comonomer in the fraction}) + 135.90.$$

In yet another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

$$\text{Heat of fusion (J/gm)} \leq (3.1718)(\text{ATREF elution temperature in Celsius}) - 136.58,$$

The inventive block interpolymers have a molecular fraction which elutes between 40° C. and 130° C., when fractionated using TREF increments, characterized in that every fraction that has an ATREF elution temperature between 40° C.

and less than about 76° C., has a melt enthalpy (heat of fusion) as measured by DSC, corresponding to the equation:

Heat of fusion (J/gm)≦(1.1312)(ATREF elution temperature in Celsius)+22.97.

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 $cm^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying a the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area $[CH_3/CH_2]$ from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100.; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170., both of which are incorporated by reference herein in their entirety.

In other embodiments, the inventive ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI = \Sigma(w_i BI_i)$$

where $BI_i$ is the block index for the ith fraction of the inventive ethylene/α-olefin interpolymer obtained in preparative TREF, and $w_i$ is the weight percentage of the ith fraction.

For each polymer fraction, BI is defined by one of the two following equations (both of which give the same BI value):

$$BI = \frac{1/T_X - 1/T_{XO}}{1/T_A - 1/T_{AB}} \quad \text{or} \quad BI = -\frac{LnP_X - LnP_{XO}}{LnP_A - LnP_{AB}}$$

where $T_X$ is the preparative ATREF elution temperature for the ith fraction (preferably expressed in Kelvin), $P_X$ is the ethylene mole fraction for the ith fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372° K, $P_A$ is 1.

$T_{AB}$ is the ATREF temperature for a random copolymer of the same composition and having an ethylene mole fraction of $P_{AB}$. $T_{AB}$ can be calculated from the following equation:

$$Ln P_{AB} = \alpha/T_{AB} + \beta$$

where $\alpha$ and $\beta$ are two constants which can be determined by calibration using a number of known random ethylene copolymers. It should be noted that $\alpha$ and $\beta$ may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$Ln P = -237.83/T_{ATREF} + 0.639$$

$T_{XO}$ is the ATREF temperature for a random copolymer of the same composition and having an ethylene mole fraction of $P_X$. $T_{XO}$ can be calculated from $LnP_X = \alpha/T_{XO} + \beta$. Conversely, $P_{XO}$ is the ethylene mole fraction for a random copolymer of the same composition and having an ATREF temperature of $T_X$, which can be calculated from $LnP_{XO} = \alpha/T_X + \beta$.

Once the block index (BI) for each preparative TREF fraction is obtained, the weight average block index, ABI, for the whole polymer can be calculated. In some embodiments, ABI is greater than zero but less than about 0.3 or from about 0.1 to about 0.3. In other embodiments, ABI is greater than about 0.3 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive ethylene/α-olefin interpolymer is that the inventive ethylene/α-olefin interpolymer comprises at least one polymer fraction which can be obtained by preparative TREF, wherein the fraction has a block index greater than about 0.1 and up to about 1.0 and a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than −25° C., more preferably less than −30° C., and/or (5) one and only one $T_m$.

Figure 6:
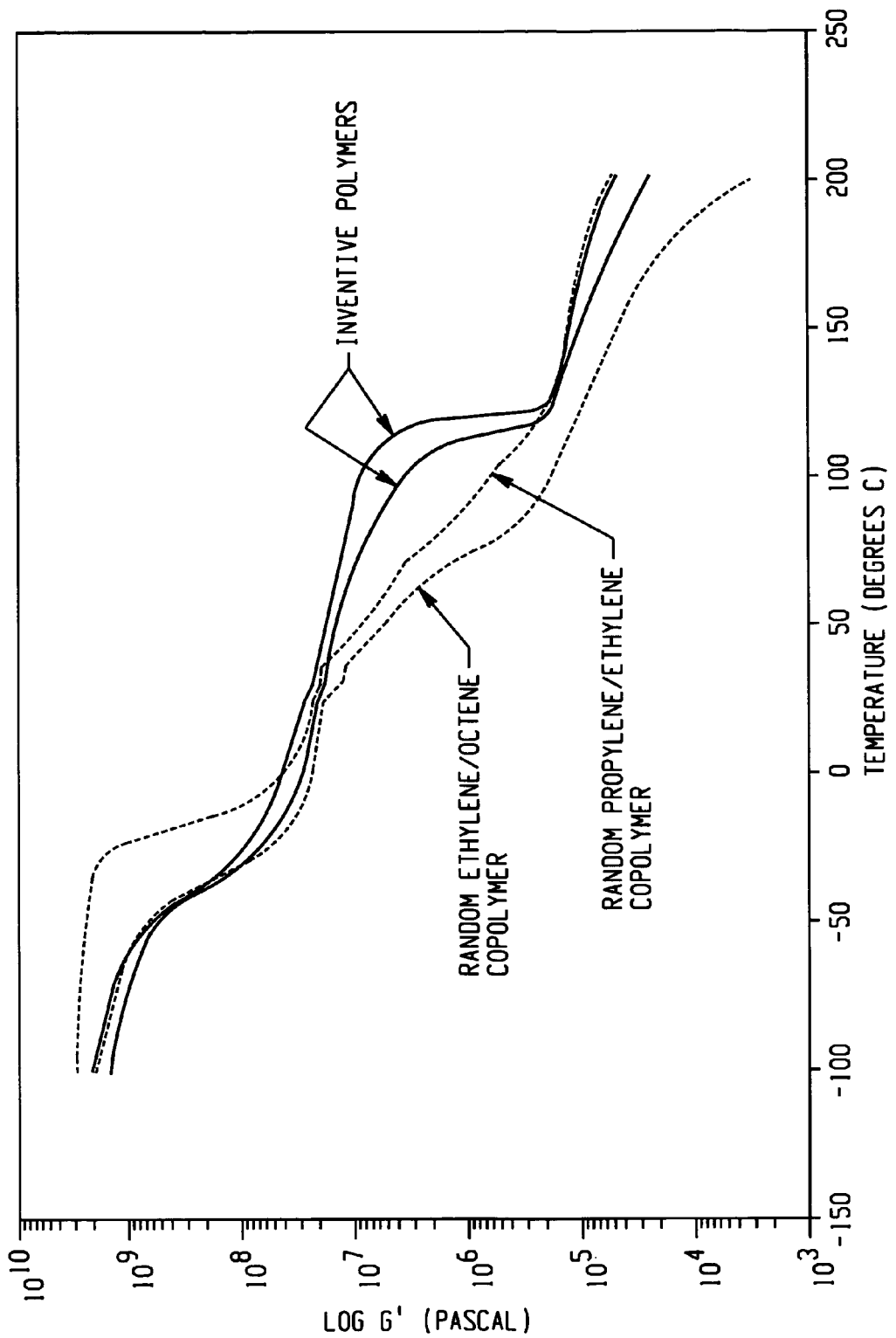
FIG. 6 is a graph of the log of storage modulus as a function of temperature for comparative ethylene/1-octene copolymer (curve 2) and propylene/ethylene copolymer (curve 3) and for two ethylene/1-octene block copolymers of the invention made with differing quantities of chain shuttling agent (curves 1).

Further, the inventive polymers can have, alone or in combination with any other properties disclosed herein, a storage modulus, G', such that log (G') is greater than or equal to 400 kPa, preferably greater than or equal to 1.0 MPa, at a temperature of 100° C. Moreover, the inventive polymers possess a relatively flat storage modulus as a function of temperature in the range from 0 to 100° C. (illustrated in FIG. 6) that is characteristic of block copolymers, and heretofore unknown for an olefin copolymer, especially a copolymer of ethylene and one or more $C_{3-8}$ aliphatic α-olefins. (By the term "relatively flat" in this context is meant that log G' (in Pascals) decreases by less than one order of magnitude between 50 and 100° C., preferably between 0 and 100° C.).

Figure 7:
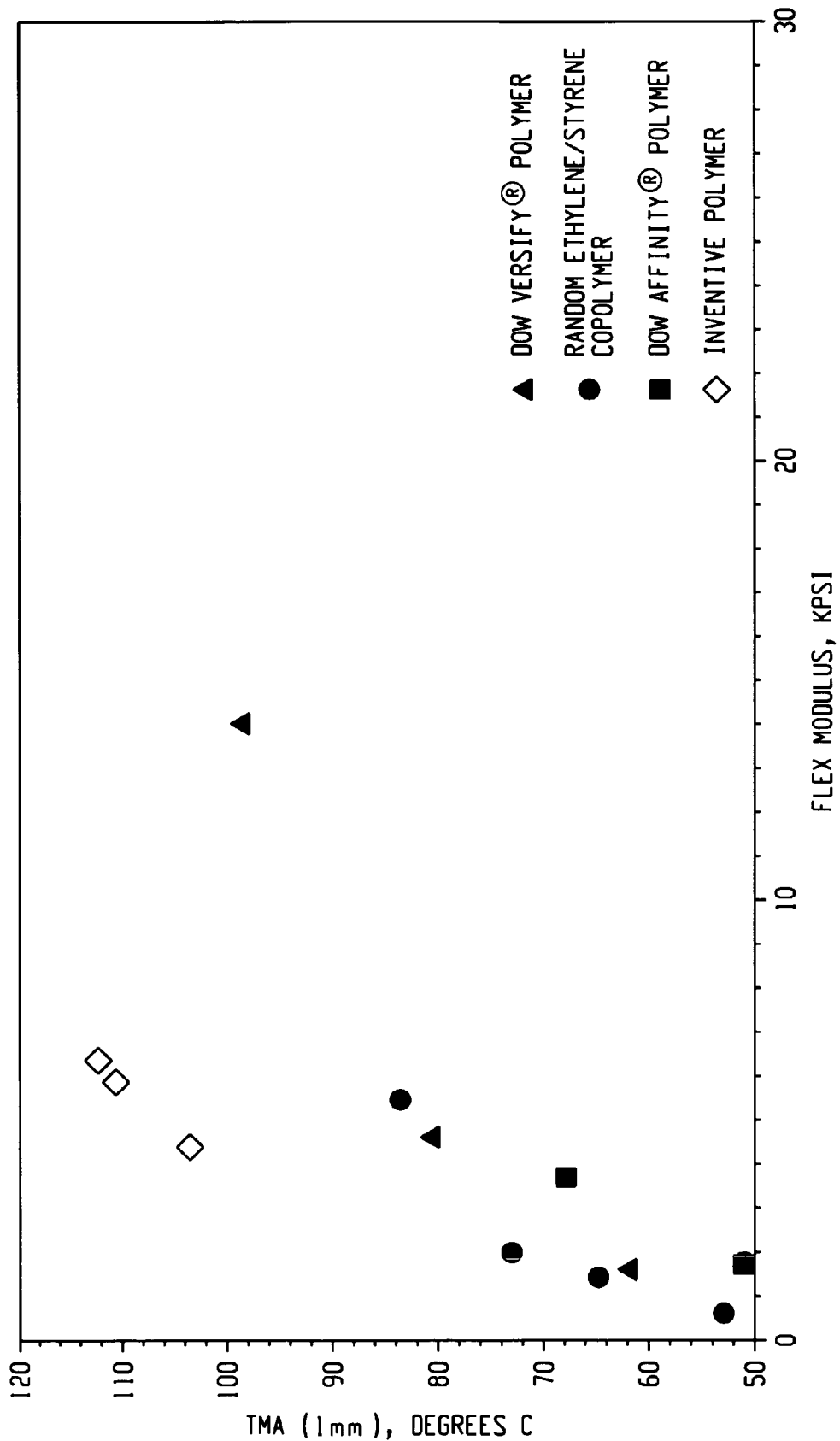
FIG. 7 shows a plot of TMA (1 mm) versus flex modulus for some inventive polymers (represented by the diamonds), as compared to some known polymers. The triangles represent various Dow VERSIFY® polymers; the circles represent various random ethylene/styrene copolymers; and the squares represent various Dow AFFINITY® polymers.

The inventive interpolymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the inventive interpolymers can have a thermomechanical analysis penetration depth of 1 mm at a temperature of at least 104° C. as well as a flexural modulus of at least 3 kpsi (20 MPa). They may be characterized as having an abrasion resistance (or volume loss) of less than 90 mm³. FIG. 7 shows the TMA (1 mm) versus flex modulus for the inventive polymers, as compared to other known polymers. The inventive polymers have significantly better flexibility-heat resistance balance than the other polymers.

Additionally, the ethylene/α-olefin interpolymers can have a melt index, I2, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, I2, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the inventive polymers can be from 0.80 to 0.99 g/cm³ and preferably for ethylene containing polymers from 0.85 g/cm³ to 0.97 g/cm³. In certain embodiments, the density of the ethylene/α-olefin polymers ranges from 0.860 to 0.925 g/cm³ or 0.867 to 0.910 g/cm³.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/566,2938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety. For example, one such method comprises contacting ethylene and optionally one or more addition polymerizable monomers other than ethylene under addition polymerization conditions with a catalyst composition comprising:

the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

Representative catalysts and chain shuttling agent are as follows.

Catalyst (A1) is [N-(2,6-di(1-methylethyl)phenyl)amido) (2-isopropylphenyl)(α-naphthalen-2-diyl(6-pyridin-2-diyl) methane)]hafnium dimethyl, prepared according to the teachings of WO 03/40195, 2003US0204017, U.S. Ser. No. 10/429,024, filed May 2, 2003, and WO 04/24740.

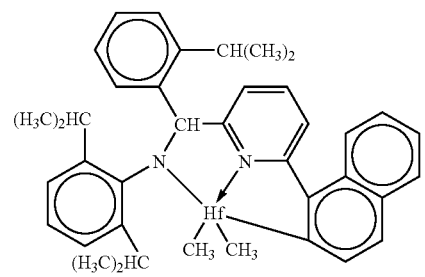

Catalyst (A2) is [N-(2,6-di(1-methylethyl)phenyl)amido) (2-methylphenyl)(1,2-phenylene-(6-pyridin-2-diyl)methane)]hafnium dimethyl, prepared according to the teachings of WO 03/40195, 2003US0204017, U.S. Ser. No. 10/429, 024, filed May 2, 2003, and WO 04/24740.

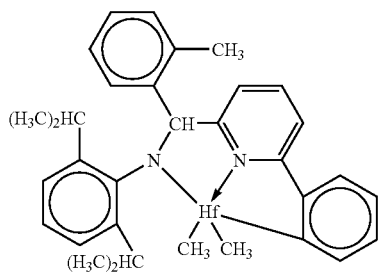

Catalyst (A3) is bis[N,N'''-(2,4,6-tri(methylphenyl)amido) ethylenediamine]hafnium dibenzyl.

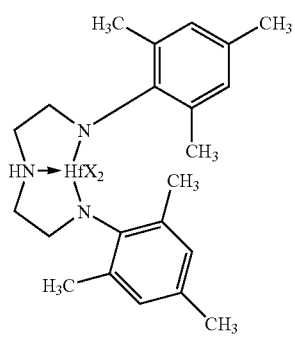

X= CH₂C₆H₅

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

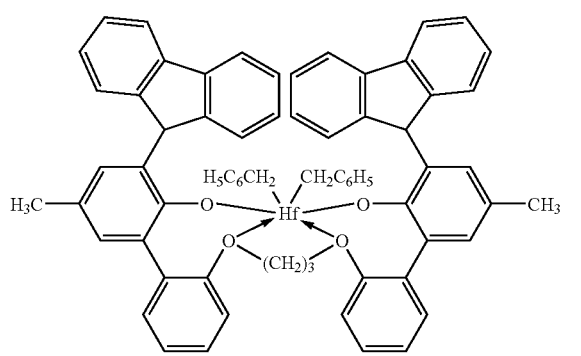

Catalyst (B1) is 1,2-bis-(3,5-di-t-butylphenylene)(1-(N-(1-methylethyl)immino)methyl)(2-oxoyl)zirconium dibenzyl

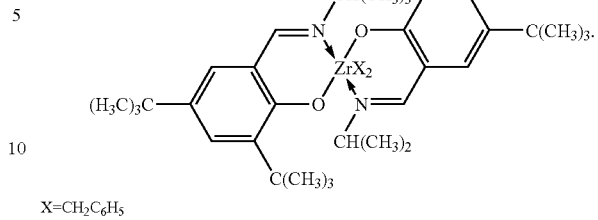

X=CH₂C₆H₅

Catalyst (B2) is 1,2-bis-(3,5-di-t-butylphenylene)(1-(N-(2-methylcyclohexyl)-immino)methyl)(2-oxoyl)zirconium dibenzyl

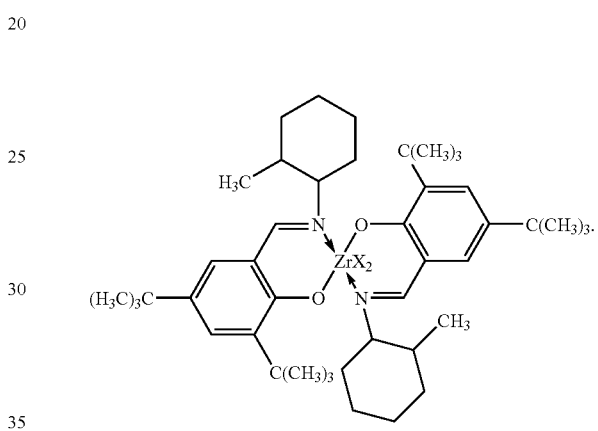

X=CH₂C₆H₅

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

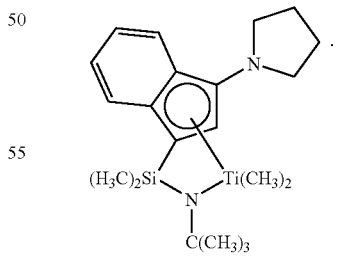

Catalyst (C2) is (t-butylamido)di(4-methylphenyl)(2-methyl-1,2,3,3a,7a-η-inden-1-yl)silanetitanium dimethyl prepared substantially according to the teachings of US-A-2003/004286:

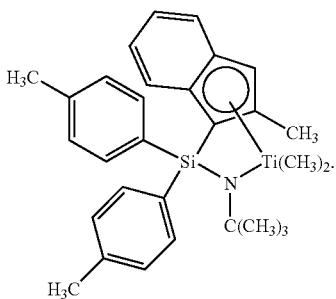

Catalyst (C3) is (t-butylamido)di(4-methylphenyl)(2-methyl-1,2,3,3a,8a-η-s-indacen-1-yl)silanetitanium dimethyl prepared substantially according to the teachings of US-A-2003/004286:

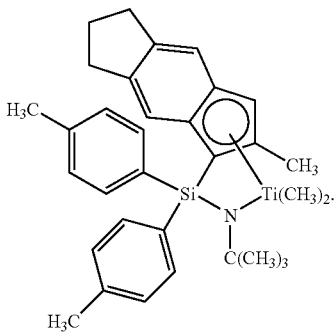

Catalyst (D1) is bis(dimethyldisiloxane)(indene-1-yl)zirconium dichloride available from Sigma-Aldrich:

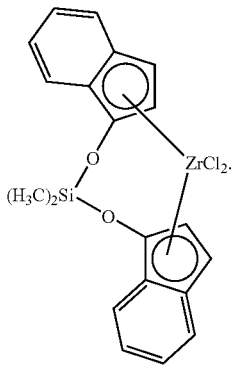

Shuttling Agents The shuttling agents employed include diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

Preferably, the foregoing process takes the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

The inventive interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the inventive interpolymers have better (higher) heat resistance as measured by melting point, higher TMA penetration temperature, higher high-temperature tensile strength, and/or higher high-temperature torsion storage modulus as determined by dynamic mechanical analysis. Compared to a random copolymer containing the same monomers and monomer content, the inventive interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

The inventive interpolymers also exhibit a unique crystallization and branching distribution relationship. That is, the inventive interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the inventive interpolymers is due to the unique distribution of the comonomer in blocks within the polymer backbone. In particular, the inventive interpolymers may comprise alternating blocks of differing comonomer content (including homopolymer blocks). The inventive interpolymers may also comprise a distribution in number and/or block size of polymer blocks of differing density or comonomer content, which is a Schultz-Flory type of distribution. In addition, the inventive interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the inventive interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene α-olefin interpolymers used in the embodiments of the invention are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2=CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is malic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

The amount of the ethylene/α-olefin interpolymer in the polymer blend disclosed herein can be from about 5 to about 95 wt %, from about 10 to about 90 wt %, from about 20 to about 80 wt %, from about 30 to about 70 wt %, from about 10 to about 50 wt %, from about 50 to about 90 wt %, from about 60 to about 90 wt %, or from about 70 to about 90 wt % of the total weight of the polymer blend.

Polyolefins

The polymer blends disclosed herein can comprise at least one polyolefin. Preferably, a suitable polyolefin should have a melt strength ("MS") of at least about 6 cN. In some embodiments, the MS of the polyolefin is at least about 7 cN, at least about 8 cN, at least about 9 cN, at least about 10 cN, at least about 13 cN, at least about 15 cN, at least about 17 cN, or at least about 20 cN. Generally, the MS of the polyolefin is less than about 200 cN, preferably less than about 150 cN, less than about 100 cN, or less than about 50 cN. Typically, the compression set at 70° C. of such polyolefins is great than about 50 percent. In some embodiments, the compression set at 70° C. is great than about 60 percent, great than about 70 percent, great than about 80 percent, or great than about 90 percent.

A polyolefin is a polymer derived from two or more olefins (i.e., alkenes). An olefin (i.e., alkene) is a hydrocarbon contains at least one carbon-carbon double bond. The olefin can be a monoene (i.e, an olefin having a single carbon-carbon double bond), diene (i.e, an olefin having two carbon-carbon double bonds), triene (i.e, an olefin having three carbon-carbon double bonds), tetraene (i.e, an olefin having four carbon-carbon double bonds), and other polyenes. The olefin or alkene, such as monoene, diene, triene, tetraene and other polyenes, can have 3 or more carbon atoms, 4 or more carbon atoms, 6 or more carbon atoms, 8 or more carbon atoms. In some embodiments, the olefin has from 3 to about 100 carbon atoms, from 4 to about 100 carbon atoms, from 6 to about 100 carbon atoms, from 8 to about 100 carbon atoms, from 3 to about 50 carbon atoms, from 3 to about 25 carbon atoms, from 4 to about 25 carbon atoms, from 6 to about 25 carbon atoms, from 8 to about 25 carbon atoms, or from 3 to about 10 carbon atoms. In some embodiments, the olefin is a linear or branched, cyclic or acyclic, monoene having from 2 to about 20 carbon atoms. In other embodiments, the alkene is a diene such as butadiene and 1,5-hexadiene. In further embodiments, at least one of the hydrogen atoms of the alkene is substituted with an alkyl or aryl. In particular embodiments, the alkene is ethylene, propylene, 1-butene, 1-hexene, 1-octene, 1-decene, 4-methyl-1-pentene, norbornene, 1-decene, butadiene, 1,5-hexadiene, styrene or a combination thereof.

The amount of the polyolefin in the polymer blend can be from about 0.5 to about 99 wt %, from about 1 to about 95 wt %, from about 10 to about 90 wt %, from about 20 to about 80 wt %, from about 30 to about 70 wt %, from about 5 to about 50 wt %, from about 50 to about 95 wt %, from about 10 to about 50 wt %, from about 10 to about 30 wt %, or from about 50 to about 90 wt % of the total weight of the polymer blend. In some embodiments, the amount of the polyolefin in the polymer blend can be from about 1 to about 25 wt %, from about 5 to about 15 wt %, from about 7.5 to about 12.5 wt %, or about 10 wt % of the total weight of the polymer blend.

Any polyolefin known to a person of ordinary skill in the art may be used to prepare the polymer blend disclosed herein. The polyolefins can be olefin homopolymers, olefin copolymers, olefin terpolymers, olefin quaterpolymers and the like, and combinations thereof.

In some embodiments, the polyolefin is an olefin homopolymer. The olefin homopolymer can be derived from one olefin. Any olefin homopolymer known to a person of ordinary skill in the art may be used. Non-limiting examples of olefin homopolymers include polyethylene, polypropylene, polybutylene, polypentene-1, polyhexene-1, polyoctene-1, polydecene-1, poly-3-methylbutene-1, poly-4-methylpentene-1, polyisoprene, polybutadiene, poly-1,5-hexadiene.

In other embodiments, the olefin homopolymer is a polyethylene. Any polyethylene known to a person of ordinary skill in the art may be used to prepare the polymer blends disclosed herein. Non-limiting examples of polypropylene include ultralow density polyethylene (ULDPE), low density polyethylene (LDPE), linear high density low density polyethylene (LLDPE), medium density polyethylene (MDPE), high density polyethylene (HDPE), high melt strength high density polyethylene (HMS-HDPE), and ultrahigh density polyethylene (UHDPE), and the like, and combinations thereof. In some embodiments, the olefin homopolymer is a HMS-HDPE such as Dow CONTINUUM® HDPE 2492 (available from Dow Chemical, Midland, Mich.). In other embodiments, the amount of the HMS-HDPE in the polymer blend can be from about 1 to about 25 wt %, from about 5 to about 15 wt %, from about 7.5 to about 12.5 wt %, or about 10 wt % of the total weight of the polymer blend.

In other embodiments, the olefin homopolymer is a polypropylene. Any polypropylene known to a person of ordinary skill in the art may be used to prepare the polymer blends disclosed herein. Non-limiting examples of polypropylene include low density polypropylene (LDPP), high density polypropylene (HDPP), high melt strength polypropylene (HMS-PP), high impact polypropylene (HIPP), isotactic polypropylene (iPP), syndiotactic polypropylene (sPP) and the like, and combinations thereof. In some embodiments, the olefin homopolymer is a HMS-PP such as Dow INSPIRE® D114 (available from Dow Chemical, Midland, Mich.), PROFAX® PF814 (available from Basell Polyolefins, Elkton, Md.), DAPLOY® WB130 and WB260 (available from Borealis A/S, Lyngby, Denmark). In other embodiments, the amount of the HMS-PP in the polymer blend can be from about 1 to about 25 wt %, from about 5 to about 15 wt %, from about 7.5 to about 12.5 wt %, or about 10 wt % of the total weight of the polymer blend.

In other embodiments, the polyolefin is an olefin copolymer. The olefin copolymer can be derived from any two different olefins. Any olefin copolymer known to a person of ordinary skill in the art may be used in the polymer blends disclosed herein. Non-limiting examples of olefin copolymers include copolymers derived from ethylene and a monoene having 3 or more carbon atoms. Non-limiting examples of the monoene having 3 or more carbon atoms include propene; butenes (e.g., 1-butene, 2-butene and isobutene) and alkyl substituted butenes; pentenes (e.g., 1-pentene and 2 pentene) and alkyl substituted pentenes (e.g., 4-methyl-1-pentene); hexenes (e.g., 1-hexene, 2-hexene and 3-hexene) and alkyl substituted hexenes; heptenes (e.g., 1-heptene, 2-heptene and 3-heptene) and alkyl substituted heptenes; octenes (e.g., 1-octene, 2-octene, 3-octene and 4-octene) and alkyl substituted octenes; nonenes (e.g., 1-nonene, 2-nonene, 3-nonene and 4-nonene) and alkyl substituted nonenes; decenes (e.g., 1-decene, 2-decene, 3-decene, 4-decene and 5-decene) and alkyl substituted decenes; dodecenes and alkyl substituted dodecenes; and butadiene. In some embodiments, the olefin copolymer is an ethylene/alpha-olefin (EAO) copolymer or ethylene/propylene copolymer (EPM).

In other embodiments, the polyolefin is an olefin terpolymer. The olefin terpolymer can be derived from three different olefins. Any olefin terpolymer known to a person of ordinary skill in the art may be used in the polymer blends disclosed herein. Non-limiting examples of olefin terpolymers include terpolymers derived from (i) ethylene, (ii) a monoene having 3 or more carbon atoms, and (iii) a diene. In some embodiments, the olefin terpolymer is an ethylene/alpha-olefin/diene terpolymers (EAODM) and ethylene/propylene/diene terpolymer (EPDM).

Some of the important properties for suitable polyolefins include tensile strength, tear strength, modulus, upper service temperature, scratch and mar resistance, and others. The combination of high tensile strength, heat resistance and processability of polypropylene homopolymer, propylene-alpha-olefin copolymer, propylene impact copolymer, high density polyethylene, low density polyethylene, linear low density polyethylene and ethylene-alpha-olefin copolymer makes these polymers preferred blend components. Furthermore, styrenic block copolymers (styrene-ethylene-butene-styrene) can be blended to obtain a unique balance of elastic recovery and heat resistance (see below).

Styrenic Block Copolymers

In addition to or in place of the at least one polyolefin described above, the polymer blend also can comprise at least one styrenic block copolymer. The amount of a styrenic block copolymer in the polymer blend can be from about 0.5 to about 99 wt %, from about 1 to about 95 wt %, from about 10 to about 90 wt %, from about 20 to about 80 wt %, from about 30 to about 70 wt %, from about 5 to about 50 wt %, from about 50 to about 95 wt %, from about 10 to about 50 wt %, from about 10 to about 30 wt %, or from about 50 to about 90 wt % of the total weight of the polymer blend. In some embodiments, the amount of the styrenic block copolymer in the polymer blend can be from about 1 to about 25 wt %, from about 5 to about 15 wt %, from about 7.5 to about 12.5 wt %, or about 10 wt % of the total weight of the polymer blend.

Generally speaking, styrenic block copolymers include at least two monoalkenyl arene blocks, preferably two polystyrene blocks, separated by a block of a saturated conjugated diene, preferably a saturated polybutadiene block. The preferred styrenic block copolymers have a linear structure, although branched or radial polymers or functionalized block copolymers make useful compounds. The total number average molecular weight of the styrenic block copolymer is preferably from 30,000 to about 250,000 if the copolymer has a linear structure. Such block copolymers may have an average polystyrene content from 10% by weight to 40% by weight.

Suitable unsaturated block copolymers include, but are not limited to, those represented by the following formulas:

    Formula I or

    Formula II wherein each A is a polymer block comprising a vinyl aromatic monomer, preferably styrene, and each B is a polymer block comprising a conjugated diene, preferably isoprene or butadiene, and optionally a vinyl aromatic monomer, preferably styrene; R is the remnant of a multifunctional coupling agent (if R is present, the block copolymer can be a star or branched block copolymer); n is an integer from 1 to 5; x is zero or 1; and y is a real number from zero to 4.

Methods for the preparation of such block copolymers are known in the art. See, e.g., U.S. Pat. No. 5,418,290. Suitable catalysts for the preparation of useful block copolymers with unsaturated rubber monomer units include lithium based catalysts and especially lithium-alkyls. U.S. Pat. No. 3,595,942 describes suitable methods for hydrogenation of block copolymers with unsaturated rubber monomer units to from block copolymers with saturated rubber monomer units. The structure of the polymers is determined by their methods of polymerization. For example, linear polymers result by sequential introduction of the desired rubber monomer into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the block copolymers with unsaturated rubber monomer units of three or more. Coupling may be effected with multifunctional coupling agents such as dihaloalkanes or alkenes and divinyl benzene as well as with certain polar compounds such as silicon halides, siloxanes or esters of monohydric alcohols with carboxylic acids. The presence of any coupling residues in the polymer may be ignored for an adequate description of the block copolymers.

Suitable block copolymers having unsaturated rubber monomer units include, but are not limited to, styrene-butadiene (SB), styrene-ethylene/butadiene (SEB), styrene-isoprene (SI), styrene-butadiene-styrene (SBS), styrene-isoprene-styrene (SIS), α-methylstyrene-butadiene-α-methylstyrene and α-methylstyrene-isoprene-α-methylstyrene.

The styrenic portion of the block copolymer is preferably a polymer or interpolymer of styrene and its analogs and homologs including α-methylstyrene and ring-substituted styrenes, particularly ring-methylated styrenes. The preferred styrenics are styrene and α-methylstyrene, and styrene is particularly preferred.

Block copolymers with unsaturated rubber monomer units may comprise homopolymers of butadiene or isoprene or they may comprise copolymers of one or both of these two dienes with a minor amount of styrenic monomer. In some embodiments, the block copolymers are derived from (i) a $C_{3-20}$ olefin substituted with an alkyl or aryl group (e.g., 4-methyl-1-pentene and styrene) and (ii) a diene (e.g. butadiene, 1,5-hexadiene, 1,7-octadiene and 1,9-decadiene). A non-limiting example of such olefin copolymer includes styrene-butadiene-styrene (SBS) block copolymer.

Preferred block copolymers with saturated rubber monomer units comprise at least one segment of a styrenic unit and at least one segment of an ethylene-butene or ethylene-propylene copolymer. Preferred examples of such block copolymers with saturated rubber monomer units include styrene/ethylene-butene copolymers, styrene/ethylene-propylene copolymers, styrene/ethylene-butene/styrene (SEBS) copolymers, styrene/ethylene-propylene/styrene (SEPS) copolymers.

Hydrogenation of block copolymers with unsaturated rubber monomer units is preferably effected by use of a catalyst comprising the reaction products of an aluminum alkyl compound with nickel or cobalt carboxylates or alkoxides under such conditions as to substantially completely hydrogenate at least 80 percent of the aliphatic double bonds while hydrogenating no more than 25 percent of the styrenic aromatic double bonds. Preferred block copolymers are those where at least 99 percent of the aliphatic double bonds are hydrogenated while less than 5 percent of the aromatic double bonds are hydrogenated.

The proportion of the styrenic blocks is generally between 8 and 65 percent by weight of the total weight of the block copolymer. Preferably, the block copolymers contain from 10 to 35 weight percent of styrenic block segments and from 90 to 65 weight percent of rubber monomer block segments, based on the total weight of the block copolymer.

The average molecular weights of the individual blocks may vary within certain limits. In most instances, the styrenic block segments will have number average molecular weights in the range of 5,000 to 125,000, preferably from 7,000 to 60,000 while the rubber monomer block segments will have average molecular weights in the range of 10,000 to 300,000, preferably from 30,000 to 150,000. The total average molecular weight of the block copolymer is typically in the range of 25,000 to 250,000, preferably from 35,000 to 200,000.

Further, the various block copolymers suitable for use in embodiments of the invention may be modified by graft incorporation of minor amounts of functional groups, such as, for example, maleic anhydride by any of the methods well known in the art.

Suitable block copolymers include, but are not limited to, those commercially available, such as, KRATON™ supplied by KRATON Polymers LLC in Houston, Tex. and VECTOR™ supplied by Dexco Polymers, L.P. in Houston, Tex.

Additives

Optionally, the polymer blends disclosed herein can comprise at least one additive for the purposes of improving and/or controlling the processibility, appearance, physical, chemical, and/or mechanical properties of the polymer blends. In some embodiments, the polymer blends do not comprise an additive. Any plastics additive known to a person of ordinary skill in the art may be used in the polymer blends disclosed herein. Non-limiting examples of suitable additives include slip agents, anti-blocking agents, plasticizers, oils, antioxidants, UV stabilizers, colorants or pigments, fillers, lubricants, antifogging agents, flow aids, coupling agents, crosslinking agents, nucleating agents, surfactants, solvents, flame retardants, antistatic agents, and combinations thereof. The total amount of the additives can range from about greater than 0 to about 80%, from about 0.001% to about 70%, from about 0.01% to about 60%, from about 0.1% to about 50%, from about 1% to about 40%, or from about 10% to about 50% of the total weight of the polymer blend. Some polymer additives have been described in Zweifel Hans et al., "*Plastics Additives Handbook,*" Hanser Gardner Publications, Cincinnati, Ohio, 5th edition (2001), which is incorporated herein by reference in its entirety.

In some embodiments, the polymer blends disclosed herein comprise a slip agent. In other embodiments, the polymer blends disclosed herein do not comprise a slip agent. Slip is the sliding of film surfaces over each other or over some other substrates. The slip performance of films can be measured by ASTM D 1894, *Static and Kinetic Coefficients of Friction of Plastic Film and Sheeting*, which is incorporated herein by reference. In general, the slip agent can convey slip properties by modifying the surface properties of films; and reducing the friction between layers of the films and between the films and other surfaces with which they come into contact.

Any slip agent known to a person of ordinary skill in the art may be added to the polymer blends disclosed herein. Non-limiting examples of the slip agents include primary amides having about 12 to about 40 carbon atoms (e.g., erucamide, oleamide, stearamide and behenamide); secondary amides having about 18 to about 80 carbon atoms (e.g., stearyl erucamide, behenyl erucamide, methyl erucamide and ethyl erucamide); secondary-bis-amides having about 18 to about 80 carbon atoms (e.g., ethylene-bis-stearamide and ethylenebis-oleamide); and combinations thereof. In a particular embodiment, the slip agent for the polymer blends disclosed herein is an amide represented by Formula (I) below:

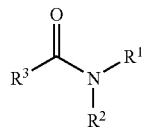

(I)

wherein each of $R^1$ and $R^2$ is independently H, alkyl, cycloalkyl, alkenyl, cycloalkenyl or aryl; and $R^3$ is alkyl or alkenyl, each having about 11 to about 39 carbon atoms, about 13 to about 37 carbon atoms, about 15 to about 35 carbon atoms, about 17 to about 33 carbon atoms or about 19 to about 33 carbon atoms. In some embodiments, $R^3$ is alkyl or alkenyl, each having at least 19 to about 39 carbon atoms. In other embodiments, $R^3$ is pentadecyl, heptadecyl, nonadecyl, heneicosanyl, tricosanyl, pentacosanyl, heptacosanyl, nonacosanyl, hentriacontanyl, tritriacontanyl, nonatriacontanyl or a combination thereof. In further embodiments, $R^3$ is pentadecenyl, heptadecenyl, nonadecenyl, heneicosanenyl, tricosanenyl, pentacosanenyl, heptacosanenyl, nonacosanenyl, hentriacontanenyl, tritriacontanenyl, nonatriacontanenyl or a combination thereof.

In a further embodiment, the slip agent for the polymer blends disclosed herein is an amide represented by Formula (II) below:

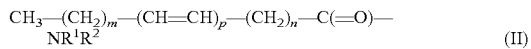

(II)

wherein each of m and n is independently an integer between about 1 and about 37; p is an integer between 0 and 3; each of $R^1$ and $R^2$ is independently H, alkyl, cycloalkyl, alkenyl, cycloalkenyl or aryl; and the sum of m, n and p is at least 8. In some embodiments, each of $R^1$ and $R^2$ of Formulae (I) and (II) is an alkyl group containing between 1 and about 40 carbon atoms or an alkenyl group containing between 2 and about 40 carbon atoms. In further embodiments, each of $R^1$ and $R^2$ of Formulae (I) and (II) is H. In certain embodiments, the sum of m, n and p is at least 18.

The amide of Formula (I) or (II) can be prepared by the reaction of an amine of formula $H-NR^1R^2$ where each of $R^1$ and $R^2$ is independently H, alkyl, cycloalkyl, alkenyl, cycloalkenyl or aryl with a carboxylic acid having a formula of $R^3-CO_2H$ or $CH_3-(CH_2)_m-(CH=CH)_p-(CH_2)_n-CO_2H$ where $R^3$ is alkyl or alkenyl, each having at least 19 to about 39 carbon atoms; each of m and n is independently an integer between about 1 and about 37; and p is 0 or 1. The amine of formula $H-NR^1R^2$ can be ammonia (i.e., each of $R^1$ and $R^2$ is H), a primary amine (i.e., $R^1$ is alkyl, cycloalkyl, alkenyl, cycloalkenyl or aryl and $R^2$ is H) or a secondary amine (i.e., each of $R^1$ and $R^2$ is independently alkyl, cycloalkyl, alkenyl, cycloalkenyl or aryl). Some non-limiting examples of primary amine include methylamine, ethylamine, octadecylamine, behenylamine, tetracosanylamine, hexacosanylamine, octacosanylamine, triacontylamine, dotriacontylamine, tetratriacontylamine, tetracontylamine, cyclohexylamine and combinations thereof. Some non-limiting examples of secondary amine include dimethylamine, diethylamine, dihexadecylamine, dioctadecylamine, dieicosylamine, didocosylamine, dicetylamine, distearylamine, diarachidylamine, dibehenylamine, dihydrogenated tallow amine, and combinations thereof. The primary amines and secondary amines can be prepared by methods known to a person of ordinary skill in the art or obtained from a commercial supplier such as Aldrich Chemicals, Milwaukee, Wis.; ICC Chemical Corporation, New York, N.Y.; Chemos GmbH, Regenstauf, Germany; ABCR GmbH & Co. KG, Karlsruhe, Germany; and Acros Organics, Geel, Belgium.

The primary amines or secondary amines may be prepared by reductive amination reaction. The reductive amination is the process by which ammonia or a primary amine is condensed with an aldehyde or a ketone to form the corresponding imine which is subsequently reduced to an amine. The subsequent reduction of imine to amine may be accomplished by reacting the imine with hydrogen and a suitable hydrogenation catalyst such as Raney Nickel and platinum oxide, aluminum-mercury amalgam, or a hydride such as lithium aluminum hydride, sodium cyanoborohydride, and sodium borohydride. The reductive amination is described in U.S. Pat. No. 3,187,047; and articles by Haskelberg, "Aminative Reduction of Ketones," J. Am. Chem. Soc., 70 (1948) 2811-2; Mastagli et al., "Study of the Aminolysis of Some Ketones and Aldehydes," Bull. soc. chim. France (1950) 1045-8; B. J. Hazzard, Practical Handbook of Organic Chemistry, Addison-Wesley Publishing Co., Inc., pp. 458-9 and 686 (1973); and Alexander et al., "A Low Pressure Reductive Alkylation Method for the Conversion of Ketones to Primary Amines," J. Am. Chem. Soc., 70, 1315-6 (1948). The above U.S. patent and articles are incorporated herein by reference.

Non-limiting examples of the carboxylic acid include straight-chain saturated fatty acids such as tetradecanoic acid, pentadecanoic acid, hexadecanoic acid, heptadecanoic acid, octadecanoic acid, nonadecanoic acid, eicosanoic acid, heneicosanic acid, docosanoic acid, tricosanoic acid, tetracosanoic acid, pentacosanoic acid, hexacosanoic acid, heptacosanoic acid, octacosanoic acid, nonacosanoic acid, triacontanoic acid, hentriacontanoic acid, dotriacontanoic acid, tetratriacontanoic acid, hexatriacontanoic acid, octatriacontanoic acid and tetracontanoic acid; branched-chain saturated fatty acids such as 16-methylheptadecanoic acid, 3-methyl-2-octylynonanoic acid, 2,3-dimethyloctadecanoic acid, 2-methyltetracosanoic acid, 11-methyltetracosanoic acid, 2-pentadecyl-heptadecanoic acid; unsaturated fatty acids such as trans-3-octadecenoic acid, trans-11-eicosenoic acid, 2-methyl-2-eicosenoic acid, 2-methyl-2-hexacosenoic acid, β-eleostearic acid, α-parinaric acid, 9-nonadecenoic acid, and 22-tricosenoic acid, oleic acid and erucic acid. The carboxylic acids can be prepared by methods known to a person of ordinary skill in the art or obtained from a commercial supplier such as Aldrich Chemicals, Milwaukee, Wis.; ICC Chemical Corporation, New York, N.Y.; Chemos GmbH, Regenstauf, Germany; ABCR GmbH & Co. KG, Karlsruhe, Germany; and Acros Organics, Geel, Belgium. Some known methods for the preparation of the carboxylic acids include the oxidation of the corresponding primary alcohols with an oxidation agent such as metal chromates, metal dichromates and potassium permanganate. The oxidation of alcohols to carboxylic acids is described in Carey et al., "Advance Organic Chemistry, Part B: Reactions and Synthesis," Plenum Press, New York, 2nd Edition, pages 481-491 (1983), which is incorporated herein by reference.

The amidation reaction can take place in a solvent that is not reactive toward the carboxylic acid. Non-limiting examples of suitable solvents include ethers (i.e., diethyl ether and tetrahydrofuran), ketones (such as acetone and methyl ethyl ketone), acetonitrile, dimethyl sulfoxide, dimethyl formamide and the like. The amidation reaction can be promoted by a base catalyst. Non-limiting examples of the base catalyst include inorganic bases such as sodium hydroxide, potassium hydroxide, sodium carbonate, potassium carbonate, sodium hydrogen carbonate, sodium acetate, ammonium acetate, and the like, metal alkoxides such as sodium methoxide, sodium ethoxide, and the like, amines such as triethylamine, diisopropylethylamine, and the like. In some embodiments, the catalyst is an amine or a metal alkoxide.

In some embodiments, the slip agent is a primary amide with a saturated aliphatic group having between 18 and about 40 carbon atoms (e.g., stearamide and behenamide). In other embodiments, the slip agent is a primary amide with an unsaturated aliphatic group containing at least one carbon-carbon double bond and between 18 and about 40 carbon atoms (e.g., erucamide and oleamide). In further embodiments, the slip agent is a primary amide having at least 20 carbon atoms. In further embodiments, the slip agent is erucamide, oleamide, stearamide, behenamide, ethylene-bis-stearamide, ethylene-bis-oleamide, stearyl erucamide, behenyl erucamide or a combination thereof. In a particular embodiment, the slip agent is erucamide. In further embodiments, the slip agent is commercially available having a trade name such as ATMER™ SA from Uniqema, Everberg, Belgium; ARMOSLIP® from Akzo Nobel Polymer Chemicals, Chicago, Ill.; KEMAMIDE® from Witco, Greenwich, Conn.; and CRODAMIDE® from Croda, Edison, N.J. Where used, the amount of the slip agent in the polymer blend can be from about greater than 0 to about 3 wt %, from about 0.0001 to about 2 wt %, from about 0.001 to about 1 wt %, from about 0.001 to about 0.5 wt % or from about 0.05 to about 0.25 wt % of the total weight of the polymer blend. Some slip agents have been described in Zweifel Hans et al., "Plastics Additives Handbook," Hanser Gardner Publications, Cincinnati, Ohio, 5th edition, Chapter 8, pages 601-608 (2001), which is incorporated herein by reference.

Optionally, the polymer blends disclosed herein can comprise an anti-blocking agent. In some embodiments, the polymer blends disclosed herein do not comprise an anti-blocking agent. The anti-blocking agent can be used to prevent the undesirable adhesion between touching layers of articles made from the polymer blends, particularly under moderate pressure and heat during storage, manufacture or use. Any anti-blocking agent known to a person of ordinary skill in the art may be added to the polymer blends disclosed herein. Non-limiting examples of anti-blocking agents include minerals (e.g., clays, chalk, and calcium carbonate), synthetic silica gel (e.g., SYLOBLOC® from Grace Davison, Columbia, Md.), natural silica (e.g., SUPER FLOSS® from Celite Corporation, Santa Barbara, Calif.), talc (e.g., OPTIBLOC® from Luzenac, Centennial, Colo.), zeolites (e.g., SIPERNAT® from Degussa, Parsippany, N.J.), aluminosilicates (e.g., SILTON® from Mizusawa Industrial Chemicals, Tokyo, Japan), limestone (e.g., CARBOREX® from Omya, Atlanta, Ga.), spherical polymeric particles (e.g., EPOSTAR®, poly(methyl methacrylate) particles from Nippon Shokubai, Tokyo, Japan and TOSPEARL®, silicone particles from GE Silicones, Wilton, Conn.), waxes, amides (e.g. erucamide, oleamide, stearamide, behenamide, ethylene-bis-stearamide, ethylene-bis-oleamide, stearyl erucamide and other slip agents), molecular sieves, and combinations thereof. The mineral particles can lower blocking by creating a physical gap between articles, while the organic anti-blocking agents can migrate to the surface to limit surface adhesion. Where used, the amount of the anti-blocking agent in the polymer blend can be from about greater than 0 to about 3 wt %, from about 0.0001 to about 2 wt %, from about 0.001 to about 1 wt %, or from about 0.001 to about 0.5 wt % of the total weight of the polymer blend. Some anti-blocking agents have been described in Zweifel Hans et al., "Plastics Additives Handbook," Hanser Gardner Publications, Cincinnati, Ohio, 5th edition, Chapter 7, pages 585-600 (2001), which is incorporated herein by reference.

Optionally, the polymer blends disclosed herein can comprise a plasticizer. In general, a plasticizer is a chemical that can increase the flexibility and lower the glass transition temperature of polymers. Any plasticizer known to a person of ordinary skill in the art may be added to the polymer blends disclosed herein. Non-limiting examples of plasticizers include mineral oils, abietates, adipates, alkyl sulfonates, azelates, benzoates, chlorinated paraffins, citrates, epoxides, glycol ethers and their esters, glutarates, hydrocarbon oils, isobutyrates, oleates, pentaerythritol derivatives, phosphates, phthalates, esters, polybutenes, ricinoleates, sebacates, sulfonamides, tri- and pyromellitates, biphenyl derivatives, stearates, difuran diesters, fluorine-containing plasticizers, hydroxybenzoic acid esters, isocyanate adducts, multi-ring aromatic compounds, natural product derivatives, nitriles, siloxane-based plasticizers, tar-based products, thioeters and combinations thereof. Where used, the amount of the plasticizer in the polymer blend can be from greater than 0 to about 15 wt %, from about 0.5 to about 10 wt %, or from about 1 to about 5 wt % of the total weight of the polymer blend. Some plasticizers have been described in George Wypych, "Handbook of Plasticizers," ChemTec Publishing, Toronto-Scarborough, Ontario (2004), which is incorporated herein by reference.

In some embodiments, the polymer blends disclosed herein optionally comprise an antioxidant that can prevent the oxidation of polymer components and organic additives in the polymer blends. Any antioxidant known to a person of ordinary skill in the art may be added to the polymer blends disclosed herein. Non-limiting examples of suitable antioxidants include aromatic or hindered amines such as alkyl diphenylamines, phenyl-α-naphthylamine, alkyl or aralkyl substituted phenyl-α-naphthylamine, alkylated p-phenylene diamines, tetramethyl-diaminodiphenylamine and the like; phenols such as 2,6-di-t-butyl-4-methylphenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamate)]methane (e.g., IRGANOX™ 1010, from Ciba Geigy, New York); acryloyl modified phenols; octadecyl-3,5-di-t-butyl-4-hydroxycinnamate (e.g., IRGANOX™ 1076, commercially available from Ciba Geigy); phosphites and phosphonites; hydroxylamines; benzofuranone derivatives; and combinations thereof. Where used, the amount of the antioxidant in the polymer blend can be from about greater than 0 to about 5 wt %, from about 0.0001 to about 2.5 wt %, from about 0.001 to about 1 wt %, or from about 0.001 to about 0.5 wt % of the total weight of the polymer blend. Some antioxidants have been described in Zweifel Hans et al., "Plastics Additives Handbook," Hanser Gardner Publications, Cincinnati, Ohio, 5th edition, Chapter 1, pages 1-140 (2001), which is incorporated herein by reference.

In other embodiments, the polymer blends disclosed herein optionally comprise an UV stabilizer that may prevent or reduce the degradation of the polymer blends by UV radiations. Any UV stabilizer known to a person of ordinary skill in the art may be added to the polymer blends disclosed herein. Non-limiting examples of suitable UV stabilizers include benzophenones, benzotriazoles, aryl esters, oxanilides, acrylic esters, formamidines, carbon black, hindered amines, nickel quenchers, hindered amines, phenolic antioxidants, metallic salts, zinc compounds and combinations thereof. Where used, the amount of the UV stabilizer in the polymer blend can be from about greater than 0 to about 5 wt %, from about 0.01 to about 3 wt %, from about 0.1 to about 2 wt %, or from about 0.1 to about 1 wt % of the total weight of the polymer blend. Some UV stabilizers have been described in Zweifel Hans et al., "*Plastics Additives Handbook*," Hanser Gardner Publications, Cincinnati, Ohio, 5th edition, Chapter 2, pages 141-426 (2001), which is incorporated herein by reference.

In further embodiments, the polymer blends disclosed herein optionally comprise a colorant or pigment that can change the look of the polymer blends to human eyes. Any colorant or pigment known to a person of ordinary skill in the art may be added to the polymer blends disclosed herein. Non-limiting examples of suitable colorants or pigments include inorganic pigments such as metal oxides such as iron oxide, zinc oxide, and titanium dioxide, mixed metal oxides, carbon black, organic pigments such as anthraquinones, anthanthrones, azo and monoazo compounds, arylamides, benzimidazolones, BONA lakes, diketopyrrolo-pyrroles, dioxazines, disazo compounds, diarylide compounds, flavanthrones, indanthrones, isoindolinones, isoindolines, metal complexes, monoazo salts, naphthols, b-naphthols, naphthol AS, naphthol lakes, perylenes, perinones, phthalocyanines, pyranthrones, quinacridones, and quinophthalones, and combinations thereof. Where used, the amount of the colorant or pigment in the polymer blend can be from about greater than 0 to about 10 wt %, from about 0.1 to about 5 wt %, or from about 0.25 to about 2 wt % of the total weight of the polymer blend. Some colorants have been described in Zweifel Hans et al., "*Plastics Additives Handbook*," Hanser Gardner Publications, Cincinnati, Ohio, 5th edition, Chapter 15, pages 813-882 (2001), which is incorporated herein by reference.

Optionally, the polymer blends disclosed herein can comprise a filler which can be used to adjust, inter alia, volume, weight, costs, and/or technical performance. Any filler known to a person of ordinary skill in the art may be added to the polymer blends disclosed herein. Non-limiting examples of suitable fillers include talc, calcium carbonate, chalk, calcium sulfate, clay, kaolin, silica, glass, fumed silica, mica, wollastonite, feldspar, aluminum silicate, calcium silicate, alumina, hydrated alumina such as alumina trihydrate, glass microsphere, ceramic microsphere, thermoplastic microsphere, barite, wood flour, glass fibers, carbon fibers, marble dust, cement dust, magnesium oxide, magnesium hydroxide, antimony oxide, zinc oxide, barium sulfate, titanium dioxide, titanates and combinations thereof. In some embodiments, the filler is barium sulfate, talc, calcium carbonate, silica, glass, glass fiber, alumina, titanium dioxide, or a mixture thereof. In other embodiments, the filler is talc, calcium carbonate, barium sulfate, glass fiber or a mixture thereof. Where used, the amount of the filler in the polymer blend can be from about greater than 0 to about 80 wt %, from about 0.1 to about 60 wt %, from about 0.5 to about 40 wt %, from about 1 to about 30 wt %, or from about 10 to about 40 wt % of the total weight of the polymer blend. Some fillers have been disclosed in U.S. Pat. No. 6,103,803 and Zweifel Hans et al., "*Plastics Additives Handbook*," Hanser Gardner Publications, Cincinnati, Ohio, 5th edition, Chapter 17, pages 901-948 (2001), both of which are incorporated herein by reference.

Optionally, the polymer blends disclosed herein can comprise a lubricant. In general, the lubricant can be used, inter alia, to modify the rheology of the molten polymer blends, to improve the surface finish of molded articles, and/or to facilitate the dispersion of fillers or pigments. Any lubricant known to a person of ordinary skill in the art may be added to the polymer blends disclosed herein. Non-limiting examples of suitable lubricants include fatty alcohols and their dicarboxylic acid esters, fatty acid esters of short-chain alcohols, fatty acids, fatty acid amides, metal soaps, oligomeric fatty acid esters, fatty acid esters of long-chain alcohols, montan waxes, polyethylene waxes, polypropylene waxes, natural and synthetic paraffin waxes, fluoropolymers and combinations thereof. Where used, the amount of the lubricant in the polymer blend can be from about greater than 0 to about 5 wt %, from about 0.1 to about 4 wt %, or from about 0.1 to about 3 wt % of the total weight of the polymer blend. Some suitable lubricants have been disclosed in Zweifel Hans et al., "*Plastics Additives Handbook*," Hanser Gardner Publications, Cincinnati, Ohio, 5th edition, Chapter 5, pages 511-552 (2001), both of which are incorporated herein by reference.

Optionally, the polymer blends disclosed herein can comprise an antistatic agent. Generally, the antistatic agent can increase the conductivity of the polymer blends and to prevent static charge accumulation. Any antistatic agent known to a person of ordinary skill in the art may be added to the polymer blends disclosed herein. Non-limiting examples of suitable antistatic agents include conductive fillers (e.g., carbon black, metal particles and other conductive particles), fatty acid esters (e.g., glycerol monostearate), ethoxylated alkylamines, diethanolamides, ethoxylated alcohols, alkylsulfonates, alkylphosphates, quaternary ammonium salts, alkylbetaines and combinations thereof. Where used, the amount of the antistatic agent in the polymer blend can be from about greater than 0 to about 5 wt %, from about 0.01 to about 3 wt %, or from about 0.1 to about 2 wt % of the total weight of the polymer blend. Some suitable antistatic agents have been disclosed in Zweifel Hans et al., "*Plastics Additives Handbook*," Hanser Gardner Publications, Cincinnati, Ohio, 5th edition, Chapter 10, pages 627-646 (2001), both of which are incorporated herein by reference.

Optionally, the polymer blends may be crosslinked, partially or completely. When crosslinking is desired, the polymer blends disclosed herein comprise a cross-linking agent that can be used to effect the cross-linking of the polymer blends, thereby increasing their modulus and stiffness, among other things. Any cross-linking agent known to a person of ordinary skill in the art may be added to the polymer blends disclosed herein. Non-limiting examples of suitable cross-linking agents include organic peroxides (e.g., alkyl peroxides, aryl peroxides, peroxyesters, peroxycarbonates, diacylperoxides, peroxyketals, and cyclic peroxides) and silanes (e.g., vinyltrimethoxysilane, vinyltriethoxysilane, vinyltris(2-methoxyethoxy)silane, vinyltriacetoxysilane, vinylmethyldimethoxysilane, and 3-methacryloyloxypropyltrimethoxysilane). Where used, the amount of the cross-linking agent in the polymer blend can be from about greater than 0 to about 20 wt %, from about 0.1 to about 15 wt %, or from about 1 to about 10 wt % of the total weight of the polymer blend. Some suitable cross-linking agents have been disclosed in Zweifel Hans et al., "*Plastics Additives Handbook*," Hanser Gardner Publications, Cincinnati, Ohio, 5th edition, Chapter 14, pages 725-812 (2001), both of which are incorporated herein by reference.

The cross-linking of the polymer blends can also be initiated by any radiation means known in the art, including, but not limited to, electron-beam irradiation, beta irradiation, gamma irradiation, corona irradiation, and UV radiation with or without cross-linking catalyst. U.S. patent application Ser. No. 10/086,057 (published as US2002/0132923 A1) and U.S. Pat. No. 6,803,014 disclose electron-beam irradiation methods that can be used in embodiments of the invention.

Irradiation may be accomplished by the use of high energy, ionizing electrons, ultra violet rays, X-rays, gamma rays, beta particles and the like and combination thereof. Preferably, electrons are employed up to 70 megarads dosages. The irradiation source can be any electron beam generator operating in a range of about 150 kilovolts to about 6 megavolts with a power output capable of supplying the desired dosage. The voltage can be adjusted to appropriate levels which may be, for example, 100,000, 300,000, 1,000,000 or 2,000,000 or 3,000,000 or 6,000,000 or higher or lower. Many other apparati for irradiating polymeric materials are known in the art. The irradiation is usually carried out at a dosage between about 3 megarads to about 35 megarads, preferably between about 8 to about 20 megarads. Further, the irradiation can be carried out conveniently at room temperature, although higher and lower temperatures, for example 0° C. to about 60° C., may also be employed. Preferably, the irradiation is carried out after shaping or fabrication of the article. Also, in a preferred embodiment, the ethylene interpolymer which has been incorporated with a pro-rad additive is irradiated with electron beam radiation at about 8 to about 20 megarads.

Crosslinking can be promoted with a crosslinking catalyst, and any catalyst that will provide this function can be used. Suitable catalysts generally include organic bases, carboxylic acids, and organometallic compounds including organic titanates and complexes or carboxylates of lead, cobalt, iron, nickel, zinc and tin. Dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylate, especially dibutyltindilaurate and dioctyltinmaleate, are particularly effective for this invention. The catalyst (or mixture of catalysts) is present in a catalytic amount, typically between about 0.015 and about 0.035 phr.

Representative pro-rad additives include, but are not limited to, azo compounds, organic peroxides and polyfunctional vinyl or allyl compounds such as, for example, triallyl cyanurate, triallyl isocyanurate, pentaerthritol tetramethacrylate, glutaraldehyde, ethylene glycol dimethacrylate, diallyl maleate, dipropargyl maleate, dipropargyl monoallyl cyanurate, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, tert-butyl peracetate, azobisisobutyl nitrite and the like and combination thereof. Preferred pro-rad additives for use in the present invention are compounds which have poly-functional (i.e. at least two) moieties such as C=C, C=N or C=O.

At least one pro-rad additive can be introduced to the ethylene interpolymer by any method known in the art. However, preferably the pro-rad additive(s) is introduced via a masterbatch concentrate comprising the same or different base resin as the ethylene interpolymer. Preferably, the pro-rad additive concentration for the masterbatch is relatively high e.g., about 25 weight percent (based on the total weight of the concentrate).

The at least one pro-rad additive is introduced to the ethylene polymer in any effective amount. Preferably, the at least one pro-rad additive introduction amount is from about 0.001 to about 5 weight percent, more preferably from about 0.005 to about 2.5 weight percent and most preferably from about 0.015 to about 1 weight percent (based on the total weight of the ethylene interpolymer.

In addition to electron-beam irradiation, crosslinking can also be effected by UV irradiation. U.S. Pat. No. 6,709,742 discloses a cross-linking method by UV irradiation which can be used in embodiments of the invention. The method comprises mixing a photoinitiator, with or without a photocrosslinker, with a polymer before, during, or after a fiber is formed and then exposing the fiber with the photoinitiator to sufficient UV radiation to crosslink the polymer to the desired level. The photoinitiators used in the practice of the invention are aromatic ketones, e.g., benzophenones or monoacetals of 1,2-diketones. The primary photoreaction of the monoacetals is the homolytic cleavage of the α-bond to give acyl and dialkoxyalkyl radicals. This type of α-cleavage is known as a Norrish Type I reaction which is more fully described in W. Horspool and D. Armesto, Organic Photochemistry: *A Comprehensive Treatment*, Ellis Horwood Limited, Chichester, England, 1992; J. Kopecky, *Organic Photochemistry: A Visual Approach*, VCH Publishers, Inc., New York, N.Y. 1992; N. J. Turro, et al., *Acc. Chem. Res.*, 1972, 5, 92; and J. T. Banks, et al., *J. Am. Chem. Soc.*, 1993, 115, 2473. The synthesis of monoacetals of aromatic 1,2 diketones, Ar—CO—C(OR)$_2$—Ar' is described in U.S. Pat. No. 4,190,602 and Ger. Offen. 2,337,813. The preferred compound from this class is 2,2-dimethoxy-2-phenylacetophenone, C$_6$H$_5$—CO—C(OCH$_3$)$_2$—C$_6$H$_5$, which is commercially available from Ciba-Geigy as Irgacure 651. Examples of other aromatic ketones useful in the practice of this invention as photoinitiators are Irgacure 184, 369, 819, 907 and 2959, all available from Ciba-Geigy.

In one embodiment of the invention, the photoinitiator is used in combination with a photocrosslinker. Any photocrosslinker that will upon the generation of free radicals, link two or more polyolefin backbones together through the formation of covalent bonds with the backbones can be used in this invention. Preferably these photocrosslinkers are polyfunctional, i.e., they comprise two or more sites that upon activation will form a covalent bond with a site on the backbone of the copolymer. Representative photocrosslinkers include, but are not limited to polyfunctional vinyl or allyl compounds such as, for example, triallyl cyanurate, triallyl isocyanurate, pentaerthritol tetramethacrylate, ethylene glycol dimethacrylate, diallyl maleate, dipropargyl maleate, dipropargyl monoallyl cyanurate and the like. Preferred photocrosslinkers for use in the present invention are compounds which have polyfunctional (i.e. at least two) moieties. Particularly preferred photocrosslinkers are triallycyanurate (TAC) and triallylisocyanurate (TAIC).

Certain compounds act as both a photoinitiator and a photocrosslinker in the practice of this invention. These compounds are characterized by the ability to generate two or more reactive species (e.g., free radicals, carbenes, nitrenes, etc.) upon exposure to UV-light and to subsequently covalently bond with two polymer chains. Any compound that can perform these two functions can be used in the practice of this invention, and representative compounds include the sulfonyl azides described in U.S. Pat. Nos. 6,211,302 and 6,284,842.

In another embodiment of this invention, the copolymer is subjected to secondary crosslinking, i.e., crosslinking other than and in addition to photocrosslinking. In this embodiment, the photoinitiator is used either in combination with a nonphotocrosslinker, e.g., a silane, or the copolymer is subjected to a secondary crosslinking procedure, e.g, exposure to E-beam radiation. Representative examples of silane crosslinkers are described in U.S. Pat. No. 5,824,718, and crosslinking through exposure to E-beam radiation is described in U.S. Pat. Nos. 5,525,257 and 5,324,576. The use of a photocrosslinker in this embodiment is optional At least one photoadditive, i.e., photoinitiator and optional photocrosslinker, can be introduced to the copolymer by any method known in the art. However, preferably the photoadditive(s) is (are) introduced via a masterbatch concentrate comprising the same or different base resin as the copolymer. Preferably, the photoadditive concentration for the masterbatch is relatively high e.g., about 25 weight percent (based on the total weight of the concentrate).

The at least one photoadditive is introduced to the copolymer in any effective amount. Preferably, the at least one photoadditive introduction amount is from about 0.001 to about 5, more preferably from about 0.005 to about 2.5 and most preferably from about 0.015 to about 1, wt % (based on the total weight of the copolymer).

The photoinitiator(s) and optional photocrosslinker(s) can be added during different stages of the fiber or film manufacturing process. If photoadditives can withstand the extrusion temperature, a polyolefin resin can be mixed with additives before being fed into the extruder, e.g., via a masterbatch addition. Alternatively, additives can be introduced into the extruder just prior the slot die, but in this case the efficient mixing of components before extrusion is important. In another approach, polyolefin fibers can be drawn without photoadditives, and a photoinitiator and/or photocrosslinker can be applied to the extruded fiber via a kiss-roll, spray, dipping into a solution with additives, or by using other industrial methods for post-treatment. The resulting fiber with photoadditive(s) is then cured via electromagnetic radiation in a continuous or batch process. The photo additives can be blended with the polyolefin using conventional compounding equipment, including single and twin-screw extruders.

The power of the electromagnetic radiation and the irradiation time are chosen so as to allow efficient crosslinking without polymer degradation and/or dimensional defects. The preferred process is described in EP 0 490 854 B1. Photoadditive(s) with sufficient thermal stability is (are) premixed with a polyolefin resin, extruded into a fiber, and irradiated in a continuous process using one energy source or several units linked in a series. There are several advantages to using a continuous process compared with a batch process to cure a fiber or sheet of a knitted fabric which are collected onto a spool.

Irradiation may be accomplished by the use of UV-radiation. Preferably, UV-radiation is employed up to the intensity of 100 J/cm$^2$. The irradiation source can be any UV-light generator operating in a range of about 50 watts to about 25000 watts with a power output capable of supplying the desired dosage. The wattage can be adjusted to appropriate levels which may be, for example, 1000 watts or 4800 watts or 6000 watts or higher or lower. Many other apparati for UV-irradiating polymeric materials are known in the art. The irradiation is usually carried out at a dosage between about 3 J/cm$^2$ to about 500 J/scm$^2$, preferably between about 5 J/cm$^2$ to about 100 J/cm$^2$. Further, the irradiation can be carried out conveniently at room temperature, although higher and lower temperatures, for example 0° C. to about 60° C., may also be employed. The photocrosslinking process is faster at higher temperatures. Preferably, the irradiation is carried out after shaping or fabrication of the article. In a preferred embodiment, the copolymer which has been incorporated with a photoadditive is irradiated with UV-radiation at about 10 J/cm$^2$ to about 50 J/cm$^2$.

Preparation of the Polymer Blends

The ingredients of the polymer blends, i.e., the ethylene/α-olefin interpolymer, the polyolefin and the optional additives, can be mixed or blended using methods known to a person of ordinary skill in the art, preferably methods that can provide a substantially homogeneous distribution of the polyolefin and/or the additives in the ethylene/α-olefin interpolymer. Non-limiting examples of suitable blending methods include melt blending, solvent blending, extruding, and the like.

In some embodiments, the ingredients of the polymer blends are melt blended by a method as described by Guerin et al. in U.S. Pat. No. 4,152,189. First, all solvents, if there are any, are removed from the ingredients by heating to an appropriate elevated temperature of about 100° C. to about 200° C. or about 150° C. to about 175° C. at a pressure of about 5 torr (667 Pa) to about 10 torr (1333 Pa). Next, the ingredients are weighed into a vessel in the desired proportions and the polymer blend is formed by heating the contents of the vessel to a molten state while stirring.

In other embodiments, the ingredients of the polymer blends are processed using solvent blending. First, the ingredients of the desired polymer blend are dissolved in a suitable solvent and the mixture is then mixed or blended. Next, the solvent is removed to provide the polymer blend.

In further embodiments, physical blending devices that provide dispersive mixing, distributive mixing, or a combination of dispersive and distributive mixing can be useful in preparing homogenous blends. Both batch and continuous methods of physical blending can be used. Non-limiting examples of batch methods include those methods using BRABENDER® mixing equipments (e.g., BRABENDER PREP CENTER®, available from C. W. Brabender Instruments, Inc., South Hackensack, N.J.) or BANBURY® internal mixing and roll milling (available from Farrel Company, Ansonia, Conn.) equipment. Non-limiting examples of continuous methods include single screw extruding, twin screw extruding, disk extruding, reciprocating single screw extruding, and pin barrel single screw extruding. In some embodiments, the additives can be added into an extruder through a feed hopper or feed throat during the extrusion of the ethylene/α-olefin interpolymer, the polyolefin or the polymer blend. The mixing or blending of polymers by extrusion has been described in C. Rauwendaal, "*Polymer Extrusion*", Hanser Publishers, New York, N.Y., pages 322-334 (1986), which is incorporated herein by reference.

When one or more additives are required in the polymer blends, the desired amounts of the additives can be added in one charge or multiple charges to the ethylene/α-olefin interpolymer, the polyolefin or the polymer blend. Furthermore, the addition can take place in any order. In some embodiments, the additives are first added and mixed or blended with the ethylene/α-olefin interpolymer and then the additive-containing interpolymer is blended with the polyolefin. In other embodiments, the additives are first added and mixed or blended with the polyolefin and then the additive-containing polyolefin is blended with the ethylene/α-olefin interpolymer. In further embodiments, the ethylene/α-olefin interpolymer is blended with the polyolefin first and then the additives are blended with the polymer blend. Polymer blends can also be performed at the fabrication equipment as dry blends (no pre-compounding required).

Alternatively, master batches containing high concentrations of the additives can be used. In general, master batches can be prepared by blending either the ethylene/α-olefin interpolymer, the polyolefin or the polymer blend with high concentrations of additives. The master batches can have additive concentrations from about 1 to about 50 wt %, from about 1 to about 40 wt %, from about 1 to about 30 wt %, or from about 1 to about 20 wt % of the total weight of the polymer blend. The master batches can then be added to the polymer blends in an amount determined to provide the desired additive concentrations in the end products. In some embodiments, the master batch contains a slip agent, an anti-blocking agent, a plasticizer, an antioxidant, a UV stabilizer, a colorant or pigment, a filler, a lubricant, an antifogging agent, a flow aid, a coupling agent, a cross-linking agent, a nucleating agent, a surfactant, a solvent, a flame retardant, an antistatic agent, or a combination thereof. In other embodiment, the master batch contains a slip agent, an anti-blocking agent or a combination thereof. In other embodiment, the master batch contains a slip agent.

Applications of the Polymer Blends

The polymer blends disclosed herein can be used to manufacture durable articles for the automotive, construction, medical, food and beverage, electrical, appliance, business machine, and consumer markets. In some embodiments, the polymer blends are used to manufacture flexible durable parts or articles selected from toys, grips, soft touch handles, bumper rub strips, floorings, auto floor mats, wheels, casters, furniture and appliance feet, tags, seals, gaskets such as static and dynamic gaskets, automotive doors, bumper fascia, grill components, rocker panels, hoses, linings, office supplies, seals, liners, diaphragms, tubes, lids, stoppers, plunger tips, delivery systems, kitchen wares, shoes, shoe bladders and shoe soles. In other embodiments, the polymer blends can be used to manufacture durable parts or articles that require a high tensile strength and low compression set. In further embodiments, the polymer blends can be used to manufacture durable parts or articles that require a high upper service temperature and low modulus.

The polymer blends can be used to prepare these durable parts or articles with known polymer processes such as extrusion (e.g., sheet extrusion and profile extrusion); molding (e.g., injection molding, rotational molding, and blow molding); fiber spinning; and blown film and cast film processes. In general, extrusion is a process by which a polymer is propelled continuously along a screw through regions of high temperature and pressure where it is melted and compacted, and finally forced through a die. The extruder can be a single screw extruder, a multiple screw extruder, a disk extruder or a ram extruder. The die can be a film die, blown film die, sheet die, pipe die, tubing die or profile extrusion die. The extrusion of polymers has been described in C. Rauwendaal, "*Polymer Extrusion*", Hanser Publishers, New York, N.Y. (1986); and M. J. Stevens, "*Extruder Principals and Operation*," Ellsevier Applied Science Publishers, New York, N.Y. (1985), both of which are incorporated herein by reference in their entirety.

Injection molding is also widely used for manufacturing a variety of plastic parts for various applications. In general, injection molding is a process by which a polymer is melted and injected at high pressure into a mold, which is the inverse of the desired shape, to form parts of the desired shape and size. The mold can be made from metal, such as steel and aluminum. The injection molding of polymers has been described in Beaumont et al., "*Successful Injection Molding: Process, Design, and Simulation*," Hanser Gardner Publications, Cincinnati, Ohio (2002), which is incorporated herein by reference in its entirety.

Molding is generally a process by which a polymer is melted and led into a mold, which is the inverse of the desired shape, to form parts of the desired shape and size. Molding can be pressureless or pressure-assisted. The molding of polymers is described in Hans-Georg Elias "*An Introduction to Plastics*," Wiley-VCH, Weinhei, Germany, pp. 161-165 (2003), which is incorporated herein by reference.

Rotational molding is a process generally used for producing hollow plastic products. By using additional post-molding operations, complex components can be produced as effectively as other molding and extrusion techniques. Rotational molding differs from other processing methods in that the heating, melting, shaping, and cooling stages all occur after the polymer is placed in the mold, therefore no external pressure is applied during forming. The rotational molding of polymers has been described in Glenn Beall, "*Rotational Molding: Design, Materials & Processing*," Hanser Gardner Publications, Cincinnati, Ohio (1998), which is incorporated herein by reference in its entirety.

Blow molding can be used for making hollow plastics containers. The process includes placing a softened polymer in the center of a mold, inflating the polymer against the mold walls with a blow pin, and solidifying the product by cooling. There are three general types of blow molding: extrusion blow molding, injection blow molding, and stretch blow molding. Injection blow molding can be used to process polymers that cannot be extruded. Stretch blow molding can be used for difficult to blow crystalline and crystallizable polymers such as polypropylene. The blow molding of polymers has been described in Norman C. Lee, "*Understanding Blow Molding*," Hanser Gardner Publications, Cincinnati, Ohio (2000), which is incorporated herein by reference in its entirety.

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

EXAMPLES

Testing Methods

In the examples that follow, the following analytical techniques are employed:

GPC Method for Samples 1-4 and A-C

An automated liquid-handling robot equipped with a heated needle set to 160° C. is used to add enough 1,2,4-trichlorobenzene stabilized with 300 ppm Ionol to each dried polymer sample to give a final concentration of 30 mg/mL. A small glass stir rod is placed into each tube and the samples are heated to 160° C. for 2 hours on a heated, orbital-shaker rotating at 250 rpm. The concentrated polymer solution is then diluted to 1 mg/ml using the automated liquid-handling robot and the heated needle set to 160° C.

A Symyx Rapid GPC system is used to determine the molecular weight data for each sample. A Gilson 350 pump set at 2.0 ml/min flow rate is used to pump helium-purged 1,2-dichlorobenzene stabilized with 300 ppm Ionol as the mobile phase through three Plgel 10 micrometer (µm) Mixed B 300 mm×7.5 mm columns placed in series and heated to 160° C. A Polymer Labs ELS 1000 Detector is used with the Evaporator set to 250° C., the Nebulizer set to 165° C., and the nitrogen flow rate set to 1.8 SLM at a pressure of 60-80 psi (400-600 kPa) $N_2$. The polymer samples are heated to 160° C. and each sample injected into a 250 µl loop using the liquid-handling robot and a heated needle. Serial analysis of the polymer samples using two switched loops and overlapping injections are used. The sample data is collected and analyzed using Symyx Epoch™ software. Peaks are manually integrated and the molecular weight information reported uncorrected against a polystyrene standard calibration curve.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method (Excluding Samples 1-4 and A-C)

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

GPC Method (Excluding Samples 1-4 and A-C)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene}=0.431(M_{polystyrene})$.

Polyethylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Samples for density measurement are prepared according to ASTM D 1928. Measurements are made within one hour of sample pressing using ASTM D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

Optical Properties

Films of 0.4 mm thickness are compression molded using a hot press (Carver Model #4095-4PR1001R). The pellets are placed between polytetrafluoroethylene sheets, heated at 190° C. at 55 psi (380 kPa) for 3 min, followed by 1.3 MPa for 3 min, and then 2.6 MPa for 3 min. The film is then cooled in the press with running cold water at 1.3 MPa for 1 min. The compression molded films are used for optical measurements, tensile behavior, recovery, and stress relaxation.

Clarity is measured using BYK Gardner Haze-gard as specified in ASTM D 1746.

45° gloss is measured using BYK Gardner Glossmeter Microgloss 45° as specified in ASTM D-2457

Internal haze is measured using BYK Gardner Haze-gard based on ASTM D 1003 Procedure A. Mineral oil is applied to the film surface to remove surface scratches.

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\epsilon_f$ is the strain taken for cyclic loading and $\epsilon_s$ is the strain where the load returns to the baseline during the 1$^{st}$ unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min$^{-1}$. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min$^{-1}$ at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

Melt Index

Melt index, or $I_2$, is measured in accordance with ASTM D 1238, Condition 190° C./2.16 kg. Melt index, or $I_{10}$ is also measured in accordance with ASTM D 1238, Condition 190° C./10 kg.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers, J. Polym. Sci.*, 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-d 2/orthodichlorobenzene to 0.4 g sample in a 10 mm NMR tube. The samples are dissolved and homogenized by heating the tube and its contents to 150° C. The data are collected using a JEOL ECLIPSE™ 400 MHz spectrometer or a Varian Unity PLUS™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 μm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 μm polytetrafluoroethylene coated filter paper (available from Osmonics Inc., Cat# Z50WP04750). The filtrated fractions are dried overnight in a vacuum oven at 60° C. and weighed on an analytical balance before further testing.

Melt Strength

Melt Strength (MS) is measured by using a capillary rheometer fitted with a 2.1 mm diameter, 20:1 die with an entrance angle of approximately 45 degrees. After equilibrating the samples at 190° C. for 10 minutes, the piston is run at a speed of 1 inch/minute (2.54 cm/minute). The standard test temperature is 190° C. The sample is drawn uniaxially to a set of accelerating nips located 100 mm below the die with an acceleration of 2.4 mm/sec 2. The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength. The melt strength is recorded in centiNewtons ("cN").

Catalysts

The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from ExxonMobil Chemical Company. In the event the name of a compound herein does not conform to the structural representation thereof, the structural representation shall control. The synthesis of all metal complexes and the preparation of all screening experiments were carried out in a dry nitrogen atmosphere using dry box techniques. All solvents used were HPLC grade and were dried before their use.

MMAO refers to modified methylalumoxane, a triisobutylaluminum modified methylalumoxane available commercially from Akzo-Noble Corporation.

The preparation of catalyst (B1) is conducted as follows.

a) Preparation of (1-methylethyl)(2-hydroxy-3,5-di (t-butyl)phenyl)methylimine 3,5-Di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of 1,2-bis-(3,5-di-t-butylphenylene) (1-(N-(1-methylethyl)immino)methyl)(2-oxoyl)zirconium dibenzyl A solution of (1-methylethyl)(2-hydroxy-3,5-di(t-butyl) phenyl)imine (605 mg, 2.2 mmol) in 5 mL toluene is slowly added to a solution of $Zr(CH_2Ph)_4$ (500 mg, 1.1 mmol) in 50 mL toluene. The resulting dark yellow solution is stirred for 30 min. Solvent is removed under reduced pressure to yield the desired product as a reddish-brown solid.

The preparation of catalyst (B2) is conducted as follows.

a) Preparation of (1-(2-methylcyclohexyl)ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried under reduced pressure. The yield is 11.17 g of a yellow solid. $^1$H NMR is consistent with the desired product as a mixture of isomers.

b) Preparation of bis-(1-(2-methylcyclohexyl)ethyl) (2-oxoyl-3,5-di(t-butyl)phenyl) immino)zirconium dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of $Zr(CH_2Ph)_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Cocatalyst 1 A mixture of methyldi($C_{14-18}$ alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,9883, Ex. 2.

Cocatalyst 2 Mixed $C_{14-18}$ alkyldimethylammonium salt of bis(tris(pentafluorophenyl)-alumane)-2-undecylimidazolide, prepared according to U.S. Pat. No. 6,395,671, Ex. 16.

Shuttling Agents The shuttling agents employed include diethylzinc (DEZ, SA1), di(i-butyl)zinc (SA2), di(n-hexyl) zinc (SA3), triethylaluminum (TEA, SA4), trioctylaluminum (SA5), triethylgallium (SA6), i-butylaluminum bis(dimethyl (t-butyl)siloxane) (SA7), i-butylaluminum bis(di(trimethylsilyl)amide) (SA8), n-octylaluminum di(pyridine-2-methoxide) (SA9), bis(n-octadecyl)i-butylaluminum (SA10), i-butylaluminum bis(di(n-pentyl)amide) (SA11), n-octylaluminum bis(2,6-di-t-butylphenoxide) (SA12), n-octylaluminum di(ethyl(1-naphthyl)amide) (SA13), ethylaluminum bis (t-butyldimethylsiloxide) (SA14), ethylaluminum di(bis (trimethylsilyl)amide) (SA 15), ethylaluminum bis(2,3,6,7-dibenzo-1-azacycloheptaneamide) (SA16), n-octylaluminum bis(2,3,6,7-dibenzo-1-azacycloheptaneamide) (SA17), n-octylaluminum bis(dimethyl(t-butyl)siloxide (SA18), ethylzinc (2,6-diphenylphenoxide) (SA19), and ethylzinc (t-butoxide) (SA20).

Examples 1-4, Comparative A-C

General High Throughput Parallel Polymerization Conditions

Polymerizations are conducted using a high throughput, parallel polymerization reactor (PPR) available from Symyx technologies, Inc. and operated substantially according to U.S. Pat. Nos. 6,248,540, 6,030,917, 6,362,309, 6,306,658, and 6,316,663. Ethylene copolymerizations are conducted at 130° C. and 200 psi (1.4 MPa) with ethylene on demand using 1.2 equivalents of cocatalyst 1 based on total catalyst used (1.1 equivalents when MMAO is present). A series of polymerizations are conducted in a parallel pressure reactor (PPR) contained of 48 individual reactor cells in a 6×8 array that are fitted with a pre-weighed glass tube. The working volume in each reactor cell is 6000 μL. Each cell is temperature and pressure controlled with stirring provided by individual stirring paddles. The monomer gas and quench gas are plumbed directly into the PPR unit and controlled by automatic valves. Liquid reagents are robotically added to each reactor cell by syringes and the reservoir solvent is mixed alkanes. The order of addition is mixed alkanes solvent (4 ml), ethylene, 1-octene comonomer (1 ml), cocatalyst 1 or cocatalyst 1/MMAO mixture, shuttling agent, and catalyst or catalyst mixture. When a mixture of cocatalyst 1 and MMAO or a mixture of two catalysts is used, the reagents are premixed in a small vial immediately prior to addition to the reactor. When a reagent is omitted in an experiment, the above order of addition is otherwise maintained. Polymerizations are conducted for approximately 1-2 minutes, until predetermined ethylene consumptions are reached. After quenching with CO, the reactors are cooled and the glass tubes are unloaded. The tubes are transferred to a centrifuge/vacuum drying unit, and dried for 12 hours at 60° C. The tubes containing dried polymer are weighed and the difference between this weight and the tare weight gives the net yield of polymer. Results are contained in Table 1. In Table 1 and elsewhere in the application, comparative compounds are indicated by an asterisk (*).

Examples 1-4 demonstrate the synthesis of linear block copolymers by the present invention as evidenced by the formation of a very narrow MWD, essentially monomodal copolymer when DEZ is present and a bimodal, broad molecular weight distribution product (a mixture of separately produced polymers) in the absence of DEZ. Due to the fact that Catalyst (A1) is known to incorporate more octene than Catalyst (B1), the different blocks or segments of the resulting copolymers of the invention are distinguishable based on branching or density.

The DSC curve for Comparative Example B* shows a 129.8° C. melting point (Tm) with a heat of fusion of 237.0 J/g. The corresponding CRYSTAF curve shows the tallest peak at 82.4° C. with a peak area of 83.7 percent. Both of these values are consistent with a resin that is high in density. The difference between the DSC Tm and the Tcrystaf is 47.4° C.

The DSC curve for Comparative Example C* shows a 125.3° C. melting point (Tm) with a heat of fusion of 143.0 J/g. The corresponding CRYSTAF curve shows the tallest peak at 81.8° C. with a peak area of 34.7 percent as well as a lower crystalline peak at 52.4° C. The separation between the two peaks is consistent with the presence of a high crystalline

TABLE 1

| Ex. | Cat. (A1) (μmol) | Cat (B1) (μmol) | Cocat (μmol) | MMAO (μmol) | shuttling agent (μmol) | Yield (g) | Mn | Mw/Mn | hexyls[1] |
|---|---|---|---|---|---|---|---|---|---|
| A* | 0.06 | — | 0.066 | 0.3 | — | 0.1363 | 300502 | 3.32 | — |
| B* | — | 0.1 | 0.110 | 0.5 | — | 0.1581 | 36957 | 1.22 | 2.5 |
| C* | 0.06 | 0.1 | 0.176 | 0.8 | — | 0.2038 | 45526 | 5.30[2] | 5.5 |
| 1 | 0.06 | 0.1 | 0.192 | — | DEZ (8.0) | 0.1974 | 28715 | 1.19 | 4.8 |
| 2 | 0.06 | 0.1 | 0.192 | — | DEZ (80.0) | 0.1468 | 2161 | 1.12 | 14.4 |
| 3 | 0.06 | 0.1 | 0.192 | — | TEA (8.0) | 0.208 | 22675 | 1.71 | 4.6 |
| 4 | 0.06 | 0.1 | 0.192 | — | TEA (80.0) | 0.1879 | 3338 | 1.54 | 9.4 |

[1]$C_6$ or higher chain content per 1000 carbons
[2]Bimodal molecular weight distribution It may be seen the polymers produced according to the invention have a relatively narrow polydispersity (Mw/Mn) and larger block-copolymer content (trimer, tetramer, or larger) than polymers prepared in the absence of the shuttling agent.

Further characterizing data for the polymers of Table 1 are determined by reference to the figures. More specifically DSC and ATREF results show the following:

The DSC curve for the polymer of Example 1 shows a 115.7° C. melting point (Tm) with a heat of fusion of 158.1 J/g. The corresponding CRYSTAF curve shows the tallest peak at 34.5° C. with a peak area of 52.9 percent. The difference between the DSC Tm and the Tcrystaf is 81.2° C.

The DSC curve for the polymer of Example 2 shows a peak with a 109.7° C. melting point (Tm) with a heat of fusion of 214.0 J/g. The corresponding CRYSTAF curve shows the tallest peak at 46.2° C. with a peak area of 57.0 percent. The difference between the DSC Tm and the Tcrystaf is 63.5° C.

The DSC curve for the polymer of Example 3 shows a peak with a 120.7° C. melting point (Tm) with a heat of fusion of 160.1 J/g. The corresponding CRYSTAF curve shows the tallest peak at 66.1° C. with a peak area of 71.8 percent. The difference between the DSC Tm and the Tcrystaf is 54.6° C.

The DSC curve for the polymer of Example 4 shows a peak with a 104.5° C. melting point (Tm) with a heat of fusion of 170.7 J/g. The corresponding CRYSTAF curve shows the tallest peak at 30° C. with a peak area of 18.2 percent. The difference between the DSC Tm and the Tcrystaf is 74.5° C.

The DSC curve for Comparative Example A* shows a 90.0° C. melting point (Tm) with a heat of fusion of 86.7 J/g. The corresponding CRYSTAF curve shows the tallest peak at 48.5° C. with a peak area of 29.4 percent. Both of these values are consistent with a resin that is low in density. The difference between the DSC Tm and the Tcrystaf is 41.8° C.

and a low crystalline polymer. The difference between the DSC Tm and the Tcrystaf is 43.5° C.

Examples 5-19

Comparative Examples D*-F*, Continuous Solution Polymerization, Catalyst A1/B2+DEZ Continuous solution polymerizations are carried out in a computer controlled autoclave reactor equipped with an internal stirrer. Purified mixed alkanes solvent (ISOPAR™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

TABLE 2

Process details for preparation of exemplary polymers

| Ex. | C$_8$H$_{16}$ kg/hr | Solv. kg/hr | H$_2$ sccm[1] | T °C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | [C$_2$H$_4$]/ [DEZ][4] | Poly Rate[5] kg/hr | Conv %[6] | Solids % | Eff.[7] |
|---|---|---|---|---|---|---|---|---|---|---|---|---|---|---|---|---|---|
| D* | 1.63 | 12.7 | 29.90 | 120 | 142.2 | 0.14 | — | — | 0.19 | 0.32 | 820 | 0.17 | 536 | 1.81 | 88.8 | 11.2 | 95.2 |
| E* | " | 9.5 | 5.00 | " | — | — | 109 | 0.10 | 0.19 | " | 1743 | 0.40 | 485 | 1.47 | 89.9 | 11.3 | 126.8 |
| F* | " | 11.3 | 251.6 | " | 71.7 | 0.06 | 30.8 | 0.06 | — | — | " | 0.11 | — | 1.55 | 88.5 | 10.3 | 257.7 |
| 5 | " | " | — | " | " | 0.14 | 30.8 | 0.13 | 0.17 | 0.43 | " | 0.26 | 419 | 1.64 | 89.6 | 11.1 | 118.3 |
| 6 | " | " | 4.92 | " | " | 0.10 | 30.4 | 0.08 | 0.17 | 0.32 | " | 0.18 | 570 | 1.65 | 89.3 | 11.1 | 172.7 |
| 7 | " | " | 21.70 | " | " | 0.07 | 30.8 | 0.06 | 0.17 | 0.25 | " | 0.13 | 718 | 1.60 | 89.2 | 10.6 | 244.1 |
| 8 | " | " | 36.90 | " | " | 0.06 | " | " | " | 0.10 | " | 0.12 | 1778 | 1.62 | 90.0 | 10.8 | 261.1 |
| 9 | " | " | 78.43 | " | " | " | " | " | " | 0.04 | " | " | 4596 | 1.63 | 90.2 | 10.8 | 267.9 |
| 10 | " | " | 0.00 | 123 | 71.1 | 0.12 | 30.3 | 0.14 | 0.34 | 0.19 | 1743 | 0.08 | 415 | 1.67 | 90.31 | 11.1 | 131.1 |
| 11 | " | " | " | 120 | 71.1 | 0.16 | " | 0.17 | 0.80 | 0.15 | 1743 | 0.10 | 249 | 1.68 | 89.56 | 11.1 | 100.6 |
| 12 | " | " | " | 121 | 71.1 | 0.15 | " | 0.07 | " | 0.09 | 1743 | 0.07 | 396 | 1.70 | 90.02 | 11.3 | 137.0 |
| 13 | " | " | " | 122 | 71.1 | 0.12 | " | 0.06 | " | 0.05 | 1743 | 0.05 | 653 | 1.69 | 89.64 | 11.2 | 161.9 |
| 14 | " | " | " | 120 | 71.1 | 0.05 | " | 0.29 | " | 0.10 | 1743 | 0.10 | 395 | 1.41 | 89.42 | 9.3 | 114.1 |
| 15 | 2.45 | " | " | " | 71.1 | 0.14 | " | 0.17 | " | 0.14 | 1743 | 0.09 | 282 | 1.80 | 89.33 | 11.3 | 121.3 |
| 16 | " | " | " | 122 | 71.1 | 0.10 | " | 0.13 | " | 0.07 | 1743 | 0.07 | 485 | 1.78 | 90.11 | 11.2 | 159.7 |
| 17 | " | " | " | 121 | 71.1 | 0.10 | " | 0.14 | " | 0.08 | 1743 | " | 506 | 1.75 | 89.08 | 11.0 | 155.6 |
| 18 | 0.69 | " | " | 121 | 71.1 | " | " | 0.22 | " | 0.11 | 1743 | 0.10 | 331 | 1.25 | 89.93 | 8.8 | 90.2 |
| 19 | 0.32 | " | " | 122 | 71.1 | 0.06 | " | " | " | 0.09 | 1743 | 0.08 | 367 | 1.16 | 90.74 | 8.4 | 106.0 |

*Comparative, not an example of the invention
[1]standard cm$^3$/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dibenzyl
[4]molar ratio in reactor
[5]polymer production rate
[6]percent ethylene conversion in reactor
[7]efficiency, kg polymer/g M where g M = g Hf + g Zr

TABLE 3

Properties of exemplary polymers

| Ex. | Density (g/cm$^3$) | I$_2$ | I$_{10}$ | I$_{10}$/I$_2$ | Mw (g/mol) | Mn (g/mol) | Mw/Mn | Heat of Fusion (J/g) | T$_m$ (°C.) | T$_c$ (°C.) | T$_{CRYSTAF}$ (°C.) | Tm − T$_{CRYSTAF}$ (°C.) | CRYSTAF Peak Area (percent) |
|---|---|---|---|---|---|---|---|---|---|---|---|---|---|
| D* | 0.8627 | 1.5 | 10.0 | 6.5 | 110,000 | 55,800 | 2.0 | 32 | 37 | 45 | 30 | 7 | 99 |
| E* | 0.9378 | 7.0 | 39.0 | 5.6 | 65,000 | 33,300 | 2.0 | 183 | 124 | 113 | 79 | 45 | 95 |
| F* | 0.8895 | 0.9 | 12.5 | 13.4 | 137,300 | 9,980 | 13.8 | 90 | 125 | 111 | 78 | 47 | 20 |
| 5 | 0.8786 | 1.5 | 9.8 | 6.7 | 104,600 | 53,200 | 2.0 | 55 | 120 | 101 | 48 | 72 | 60 |
| 6 | 0.8785 | 1.1 | 7.5 | 6.5 | 109600 | 53300 | 2.1 | 55 | 115 | 94 | 44 | 71 | 63 |
| 7 | 0.8825 | 1.0 | 7.2 | 7.1 | 118,500 | 53,100 | 2.2 | 69 | 121 | 103 | 49 | 72 | 29 |
| 8 | 0.8828 | 0.9 | 6.8 | 7.7 | 129,000 | 40,100 | 3.2 | 68 | 124 | 106 | 80 | 43 | 13 |
| 9 | 0.8836 | 1.1 | 9.7 | 9.1 | 129600 | 28700 | 4.5 | 74 | 125 | 109 | 81 | 44 | 16 |
| 10 | 0.8784 | 1.2 | 7.5 | 6.5 | 113,100 | 58,200 | 1.9 | 54 | 116 | 92 | 41 | 75 | 52 |
| 11 | 0.8818 | 9.1 | 59.2 | 6.5 | 66,200 | 36,500 | 1.8 | 63 | 114 | 93 | 40 | 74 | 25 |
| 12 | 0.8700 | 2.1 | 13.2 | 6.4 | 101,500 | 55,100 | 1.8 | 40 | 113 | 80 | 30 | 83 | 91 |
| 13 | 0.8718 | 0.7 | 4.4 | 6.5 | 132,100 | 63,600 | 2.1 | 42 | 114 | 80 | 30 | 81 | 8 |
| 14 | 0.9116 | 2.6 | 15.6 | 6.0 | 81,900 | 43,600 | 1.9 | 123 | 121 | 106 | 73 | 48 | 92 |
| 15 | 0.8719 | 6.0 | 41.6 | 6.9 | 79,900 | 40,100 | 2.0 | 33 | 114 | 91 | 32 | 82 | 10 |
| 16 | 0.8758 | 0.5 | 3.4 | 7.1 | 148,500 | 74,900 | 2.0 | 43 | 117 | 96 | 48 | 69 | 65 |
| 17 | 0.8757 | 1.7 | 11.3 | 6.5 | 107,500 | 54,000 | 2.0 | 43 | 116 | 96 | 43 | 73 | 57 |
| 18 | 0.9192 | 4.1 | 24.9 | 6.1 | 72,000 | 37,900 | 1.9 | 136 | 120 | 106 | 70 | 50 | 94 |
| 19 | 0.9344 | 3.4 | 20.3 | 6.0 | 76,800 | 39,400 | 1.9 | 169 | 125 | 112 | 80 | 45 | 88 |

The resulting polymers are tested by DSC and ATREF as with previous examples. Results are as follows:

The DSC curve for the polymer of Example 5 shows a peak with a 119.6° C. melting point (Tm) with a heat of fusion of 60.0 J/g. The corresponding CRYSTAF curve shows the tallest peak at 47.6° C. with a peak area of 59.5 percent. The delta between the DSC Tm and the Tcrystaf is 72.0° C.

The DSC curve for the polymer of Example 6 shows a peak with a 115.2° C. melting point (Tm) with a heat of fusion of 60.4 J/g. The corresponding CRYSTAF curve shows the tallest peak at 44.2° C. with a peak area of 62.7 percent. The delta between the DSC Tm and the Tcrystaf is 71.0° C.

The DSC curve for the polymer of Example 7 shows a peak with a 121.3° C. melting point with a heat of fusion of 69.1 J/g. The corresponding CRYSTAF curve shows the tallest peak at 49.2° C. with a peak area of 29.4 percent. The delta between the DSC Tm and the Tcrystaf is 72.1° C.

The DSC curve for the polymer of Example 8 shows a peak with a 123.5° C. melting point (Tm) with a heat of fusion of 67.9 J/g. The corresponding CRYSTAF curve shows the tallest peak at 80.1° C. with a peak area of 12.7 percent. The delta between the DSC Tm and the Tcrystaf is 43.4° C.

The DSC curve for the polymer of Example 9 shows a peak with a 124.6° C. melting point (Tm) with a heat of fusion of 73.5 J/g. The corresponding CRYSTAF curve shows the tallest peak at 80.8° C. with a peak area of 16.0 percent. The delta between the DSC Tm and the Tcrystaf is 43.8° C.

The DSC curve for the polymer of Example 10 shows a peak with a 115.6° C. melting point (Tm) with a heat of fusion of 60.7 J/g. The corresponding CRYSTAF curve shows the tallest peak at 40.9° C. with a peak area of 52.4 percent. The delta between the DSC Tm and the Tcrystaf is 74.7° C.

The DSC curve for the polymer of Example 11 shows a peak with a 113.6° C. melting point (Tm) with a heat of fusion of 70.4 J/g. The corresponding CRYSTAF curve shows the tallest peak at 39.6° C. with a peak area of 25.2 percent. The delta between the DSC Tm and the Tcrystaf is 74.1° C.

The DSC curve for the polymer of Example 12 shows a peak with a 113.2° C. melting point (Tm) with a heat of fusion of 48.9 J/g. The corresponding CRYSTAF curve shows no peak equal to or above 30° C. (Tcrystaf for purposes of further calculation is therefore set at 30° C.). The delta between the DSC Tm and the Tcrystaf is 83.2° C.

The DSC curve for the polymer of Example 13 shows a peak with a 114.4° C. melting point (Tm) with a heat of fusion of 49.4 J/g. The corresponding CRYSTAF curve shows the tallest peak at 33.8° C. with a peak area of 7.7 percent. The delta between the DSC Tm and the Tcrystaf is 84.4° C.

The DSC for the polymer of Example 14 shows a peak with a 120.8° C. melting point (Tm) with a heat of fusion of 127.9 J/g. The corresponding CRYSTAF curve shows the tallest peak at 72.9° C. with a peak area of 92.2 percent. The delta between the DSC Tm and the Tcrystaf is 47.9° C.

The DSC curve for the polymer of Example 15 shows a peak with a 114.3° C. melting point (Tm) with a heat of fusion of 36.2 J/g. The corresponding CRYSTAF curve shows the tallest peak at 32.3° C. with a peak area of 9.8 percent. The delta between the DSC Tm and the Tcrystaf is 82.0° C.

The DSC curve for the polymer of Example 16 shows a peak with a 116.6° C. melting point (Tm) with a heat of fusion of 44.9 J/g. The corresponding CRYSTAF curve shows the tallest peak at 48.0° C. with a peak area of 65.0 percent. The delta between the DSC Tm and the Tcrystaf is 68.6° C.

The DSC curve for the polymer of Example 17 shows a peak with a 116.0° C. melting point (Tm) with a heat of fusion of 47.0 J/g. The corresponding CRYSTAF curve shows the tallest peak at 43.1° C. with a peak area of 56.8 percent. The delta between the DSC Tm and the Tcrystaf is 72.9° C.

The DSC curve for the polymer of Example 18 shows a peak with a 120.5° C. melting point (Tm) with a heat of fusion of 141.8 J/g. The corresponding CRYSTAF curve shows the tallest peak at 70.0° C. with a peak area of 94.0 percent. The delta between the DSC Tm and the Tcrystaf is 50.5° C.

The DSC curve for the polymer of Example 19 shows a peak with a 124.8° C. melting point (Tm) with a heat of fusion of 174.8 J/g. The corresponding CRYSTAF curve shows the tallest peak at 79.9° C. with a peak area of 87.9 percent. The delta between the DSC Tm and the Tcrystaf is 45.0° C.

The DSC curve for the polymer of Comparative Example D* shows a peak with a 37.3° C. melting point (Tm) with a heat of fusion of 31.6 J/g. The corresponding CRYSTAF curve shows no peak equal to and above 30° C. Both of these values are consistent with a resin that is low in density. The delta between the DSC Tm and the Tcrystaf is 7.3° C.

The DSC curve for the polymer of Comparative Example E* shows a peak with a 124.0° C. melting point (Tm) with a heat of fusion of 179.3 J/g. The corresponding CRYSTAF curve shows the tallest peak at 79.3° C. with a peak area of 94.6 percent. Both of these values are consistent with a resin that is high in density. The delta between the DSC Tm and the Tcrystaf is 44.6° C.

The DSC curve for the polymer of Comparative Example F* shows a peak with a 124.8° C. melting point (Tm) with a heat of fusion of 90.4 J/g. The corresponding CRYSTAF curve shows the tallest peak at 77.6° C. with a peak area of 19.5 percent. The separation between the two peaks is consistent with the presence of both a high crystalline and a low crystalline polymer. The delta between the DSC Tm and the Tcrystaf is 47.2° C.

Physical Property Testing

Polymer samples are evaluated for physical properties such as high temperature resistance properties, as evidenced by TMA temperature testing, pellet blocking strength, high temperature recovery, high temperature compression set and storage modulus ratio, G'(25° C.)/G'(100° C.). Several commercially available polymers are included in the tests: Comparative G* is a substantially linear ethylene/1-octene copolymer (AFFINITY®, available from The Dow Chemical Company), Comparative H* is an elastomeric, substantially linear ethylene/1-octene copolymer (AFFINITY®EG8100, available from The Dow Chemical Company), Comparative Example I* is a substantially linear ethylene/1-octene copolymer (AFFINITY®PL1840, available from The Dow Chemical Company), Comparative Example J* is a hydrogenated styrene/butadiene/styrene triblock copolymer (KRATON™ G1652, available from KRATON Polymers), Comparative Example K* is a thermoplastic vulcanizate (TPV, a polyolefin blend containing dispersed therein a crosslinked elastomer). Results are presented in Table 4.

TABLE 4

High Temperature Mechanical Properties

| Ex. | TMA-1 mm penetration (° C.) | Pellet Blocking Strength lb/ft$^2$ (kPa) | G'(25° C.)/ G'(100° C.) | 300% Strain Recovery (80° C.) (percent) | Compression Set (70° C.) (percent) |
|---|---|---|---|---|---|
| D* | 51 | — | 9 | Failed | — |
| E* | 130 | — | 18 | — | — |
| F* | 70 | 141 (6.8) | 9 | Failed | 100 |
| 5 | 104 | 0 (0) | 6 | 81 | 49 |

TABLE 4-continued

High Temperature Mechanical Properties

| Ex. | TMA-1 mm penetration (° C.) | Pellet Blocking Strength lb/ft² (kPa) | G'(25° C.)/ G'(100° C.) | 300% Strain Recovery (80° C.) (percent) | Compression Set (70° C.) (percent) |
|---|---|---|---|---|---|
| 6 | 110 | — | 5 | — | 52 |
| 7 | 113 | — | 4 | 84 | 43 |
| 8 | 111 | — | 4 | Failed | 41 |
| 9 | 97 | — | 4 | — | 66 |
| 10 | 108 | — | 5 | 81 | 55 |
| 11 | 100 | — | 8 | — | 68 |
| 12 | 88 | — | 8 | — | 79 |
| 13 | 95 | — | 6 | 84 | 71 |
| 14 | 125 | — | 7 | — | — |
| 15 | 96 | — | 5 | — | 58 |
| 16 | 113 | — | 4 | — | 42 |
| 17 | 108 | 0 (0) | 4 | 82 | 47 |
| 18 | 125 | — | 10 | — | — |
| 19 | 133 | — | 9 | — | — |
| G* | 75 | 463 (22.2) | 89 | Failed | 100 |
| H* | 70 | 213 (10.2) | 29 | Failed | 100 |
| I* | 111 | — | 11 | — | — |
| J* | 107 | — | 5 | Failed | 100 |
| K* | 152 | — | 3 | — | 40 |

In Table 4, Comparative Example F* (which is a physical blend of the two polymers resulting from simultaneous polymerizations using catalyst A1 and B1) has a 1 mm penetration temperature of about 70° C., while Examples 5-9 have a 1 mm penetration temperature of 100° C. or greater. Further, examples 10-19 all have a 1 mm penetration temperature of greater than 85° C., with most having 1 mm TMA temperature of greater than 90° C. or even greater than 100° C. This shows that the novel polymers have better dimensional stability at higher temperatures compared to a physical blend. Comparative Example J* (a commercial SEBS) has a good 1 mm TMA temperature of about 107° C., but it has very poor (high temperature 70° C.) compression set of about 100 percent and it also failed to recover (sample broke) during a high temperature (80° C.) 300 percent strain recovery. Thus the exemplified polymers have a unique combination of properties unavailable even in some commercially available, high performance thermoplastic elastomers.

Similarly, Table 4 shows a low (good) storage modulus ratio, G'(25° C.)/G'(100° C.), for the inventive polymers of 6 or less, whereas a physical blend (Comparative Example F*) has a storage modulus ratio of 9 and a random ethylene/octene copolymer (Comparative Example G*) of similar density has a storage modulus ratio an order of magnitude greater (89). It is desirable that the storage modulus ratio of a polymer be as close to 1 as possible. Such polymers will be relatively unaffected by temperature, and fabricated articles made from such polymers can be usefully employed over a broad temperature range. This feature of low storage modulus ratio and temperature independence is particularly useful in elastomer applications such as in pressure sensitive adhesive formulations.

The data in Table 4 also demonstrate that the polymers of the invention possess improved pellet blocking strength. In particular, Example 5 has a pellet blocking strength of 0 MPa, meaning it is free flowing under the conditions tested, compared to Comparative Examples F* and G* which show considerable blocking. Blocking strength is important since bulk shipment of polymers having large blocking strengths can result in product clumping or sticking together upon storage or shipping, resulting in poor handling properties.

High temperature (70° C.) compression set for the inventive polymers is generally good, meaning generally less than about 80 percent, preferably less than about 70 percent and especially less than about 60 percent. In contrast, Comparative Examples F*, G*, H* and J* all have a 70° C. compression set of 100 percent (the maximum possible value, indicating no recovery). Good high temperature compression set (low numerical values) is especially needed for applications such as gaskets, window profiles, o-rings, and the like.

TABLE 5

Ambient Temperature Mechanical Properties

| Ex. | Flex Modulus (MPa) | Tensile Modulus (MPa) | Tensile Strength (MPa)[1] | Elongation at Break[1] (%) | Tensile Strength (MPa) | Elongation at Break (%) | Abrasion: Volume Loss (mm³) | Tensile Notched Tear Strength (mJ) | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain[2] |
|---|---|---|---|---|---|---|---|---|---|---|---|---|---|
| D* | 12 | 5 | — | — | 10 | 1074 | — | — | 91 | 83 | 760 | — | — |
| E* | 895 | 589 | — | — | 31 | 1029 | — | — | — | — | — | — | — |
| F* | 57 | 46 | — | — | 12 | 824 | 93 | 339 | 78 | 65 | 400 | 42 | — |
| 5 | 30 | 24 | 14 | 951 | 16 | 1116 | 48 | — | 87 | 74 | 790 | 14 | 33 |
| 6 | 33 | 29 | — | — | 14 | 938 | — | — | — | 75 | 861 | 13 | — |
| 7 | 44 | 37 | 15 | 846 | 14 | 854 | 39 | — | 82 | 73 | 810 | 20 | — |
| 8 | 41 | 35 | 13 | 785 | 14 | 810 | 45 | 461 | 82 | 74 | 760 | 22 | — |
| 9 | 43 | 38 | — | — | 12 | 823 | — | — | — | — | — | 25 | — |
| 10 | 23 | 23 | — | — | 14 | 902 | — | — | 86 | 75 | 860 | 12 | — |
| 11 | 30 | 26 | — | — | 16 | 1090 | — | 976 | 89 | 66 | 510 | 14 | 30 |
| 12 | 20 | 17 | 12 | 961 | 13 | 931 | — | 1247 | 91 | 75 | 700 | 17 | — |
| 13 | 16 | 14 | — | — | 13 | 814 | — | 691 | 91 | — | — | 21 | — |
| 14 | 212 | 160 | — | — | 29 | 857 | — | — | — | — | — | — | — |
| 15 | 18 | 14 | 12 | 1127 | 10 | 1573 | — | 2074 | 89 | 83 | 770 | 14 | — |
| 16 | 23 | 20 | — | — | 12 | 968 | — | — | 88 | 83 | 1040 | 13 | — |
| 17 | 20 | 18 | — | — | 13 | 1252 | — | 1274 | 13 | 83 | 920 | 4 | — |
| 18 | 323 | 239 | — | — | 30 | 808 | — | — | — | — | — | — | — |
| 19 | 706 | 483 | — | — | 36 | 871 | — | — | — | — | — | — | — |
| G* | 15 | 15 | — | — | 17 | 1000 | — | 746 | 86 | 53 | 110 | 27 | 50 |
| H* | 16 | 15 | — | — | 15 | 829 | — | 569 | 87 | 60 | 380 | 23 | — |
| I* | 210 | 147 | — | — | 29 | 697 | — | — | — | — | — | — | — |

TABLE 5-continued

Ambient Temperature Mechanical Properties

| Ex. | Flex Modulus (MPa) | Tensile Modulus (MPa) | Tensile Strength (MPa)[1] | Elongation at Break[1] (%) | Tensile Strength (MPa) | Elongation at Break (%) | Abrasion: Volume Loss (mm³) | Tensile Notched Tear Strength (mJ) | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain[2] |
|---|---|---|---|---|---|---|---|---|---|---|---|---|---|
| J* | — | — | — | — | 32 | 609 | — | — | 93 | 96 | 1900 | 25 | — |
| K* | — | — | — | — | — | — | — | — | — | — | — | 30 | — |

[1]Tested at 51 cm/minute
[2]measured at 38° C. for 12 hours

Table 5 shows results for mechanical properties for the new polymers as well as for various comparison polymers at ambient temperatures. It may be seen that the inventive polymers have very good abrasion resistance when tested according to ISO 4649, generally showing a volume loss of less than about 90 mm³, preferably less than about 80 mm³, and especially less than about 50 mm³. In this test, higher numbers indicate higher volume loss and consequently lower abrasion resistance.

Tear strength as measured by tensile notched tear strength of the inventive polymers is generally 1000 mJ or higher, as shown in Table 5. Tear strength for the inventive polymers can be as high as 3000 mJ, or even as high as 5000 mJ. Comparative polymers generally have tear strengths no higher than 750 mJ.

Table 5 also shows that the polymers of the invention have better retractive stress at 150 percent strain (demonstrated by higher retractive stress values) than some of the comparative samples. Comparative Examples F*, G* and H* have retractive stress value at 150 percent strain of 400 kPa or less, while the inventive polymers have retractive stress values at 150 percent strain of 500 kPa (Ex. 11) to as high as about 1100 kPa (Ex. 17). Polymers having higher than 150 percent retractive stress values would be quite useful for elastic applications, such as elastic fibers and fabrics, especially nonwoven fabrics. Other applications include diaper, hygiene, and medical garment waistband applications, such as tabs and elastic bands.

Table 5 also shows that stress relaxation (at 50 percent strain) is also improved (less) for the inventive polymers as compared to, for example, Comparative Example G*. Lower stress relaxation means that the polymer retains its force better in applications such as diapers and other garments where retention of elastic properties over long time periods at body temperatures is desired.

Optical Testing

TABLE 6

Polymer Optical Properties

| Ex. | Internal Haze (percent) | Clarity (percent) | 45° Gloss (percent) |
|---|---|---|---|
| F* | 84 | 22 | 49 |
| G* | 5 | 73 | 56 |
| 5 | 13 | 72 | 60 |
| 6 | 33 | 69 | 53 |
| 7 | 28 | 57 | 59 |
| 8 | 20 | 65 | 62 |
| 9 | 61 | 38 | 49 |
| 10 | 15 | 73 | 67 |
| 11 | 13 | 69 | 67 |
| 12 | 8 | 75 | 72 |
| 13 | 7 | 74 | 69 |

TABLE 6-continued

Polymer Optical Properties

| Ex. | Internal Haze (percent) | Clarity (percent) | 45° Gloss (percent) |
|---|---|---|---|
| 14 | 59 | 15 | 62 |
| 15 | 11 | 74 | 66 |
| 16 | 39 | 70 | 65 |
| 17 | 29 | 73 | 66 |
| 18 | 61 | 22 | 60 |
| 19 | 74 | 11 | 52 |
| G* | 5 | 73 | 56 |
| H* | 12 | 76 | 59 |
| I* | 20 | 75 | 59 |

The optical properties reported in Table 6 are based on compression molded films substantially lacking in orientation. Optical properties of the polymers may be varied over wide ranges, due to variation in crystallite size, resulting from variation in the quantity of chain shuttling agent employed in the polymerization.

Extractions of Multi-Block Copolymers

Extraction studies of the polymers of Examples 5, 7 and Comparative Example E* are conducted. In the experiments, the polymer sample is weighed into a glass fritted extraction thimble and fitted into a Kumagawa type extractor. The extractor with sample is purged with nitrogen, and a 500 mL round bottom flask is charged with 350 mL of diethyl ether. The flask is then fitted to the extractor. The ether is heated while being stirred. Time is noted when the ether begins to condense into the thimble, and the extraction is allowed to proceed under nitrogen for 24 hours. At this time, heating is stopped and the solution is allowed to cool. Any ether remaining in the extractor is returned to the flask. The ether in the flask is evaporated under vacuum at ambient temperature, and the resulting solids are purged dry with nitrogen. Any residue is transferred to a weighed bottle using successive washes of hexane. The combined hexane washes are then evaporated with another nitrogen purge, and the residue dried under vacuum overnight at 40° C. Any remaining ether in the extractor is purged dry with nitrogen.

A second clean round bottom flask charged with 350 mL of hexane is then connected to the extractor. The hexane is heated to reflux with stirring and maintained at reflux for 24 hours after hexane is first noticed condensing into the thimble. Heating is then stopped and the flask is allowed to cool. Any hexane remaining in the extractor is transferred back to the flask. The hexane is removed by evaporation under vacuum at ambient temperature, and any residue remaining in the flask is transferred to a weighed bottle using successive hexane washes. The hexane in the flask is evaporated by a nitrogen purge, and the residue is vacuum dried overnight at 40° C.

The polymer sample remaining in the thimble after the extractions is transferred from the thimble to a weighed bottle and vacuum dried overnight at 40° C. Results are contained in Table 7.

TABLE 7

| Sample | wt. (g) | ether soluble (g) | ether soluble (percent) | $C_8$ mole percent[1] | hexane soluble (g) | hexane soluble (percent) | $C_8$ mole percent[1] | residue $C_8$ mole percent[1] |
|---|---|---|---|---|---|---|---|---|
| Comp. F* | 1.097 | 0.063 | 5.69 | 12.2 | 0.245 | 22.35 | 13.6 | 6.5 |
| Ex. 5 | 1.006 | 0.041 | 4.08 | — | 0.040 | 3.98 | 14.2 | 11.6 |
| Ex. 7 | 1.092 | 0.017 | 1.59 | 13.3 | 0.012 | 1.10 | 11.7 | 9.9 |

[1]Determined by $^{13}C$ NMR

Additional Polymer Examples 19A-F, Continuous Solution Polymerization, Catalyst A1/B2+DEZ Continuous solution polymerizations are carried out in a computer controlled well-mixed reactor. Purified mixed alkanes solvent (ISOPAR™ E available from ExxonMobil Chemical Company), ethylene, 1-octene, and hydrogen (where used) are combined and fed to a 27 gallon reactor. The feeds to the reactor are measured by mass-flow controllers. The temperature of the feed stream is controlled by use of a glycol cooled heat exchanger before entering the reactor. The catalyst component solutions are metered using pumps and mass flow meters. The reactor is run liquid-full at approximately 550 psig pressure. Upon exiting the reactor, water and additive are injected in the polymer solution. The water hydrolyzes the catalysts, and terminates the polymerization reactions. The post reactor solution is then heated in preparation for a two-stage devolatization. The solvent and unreacted monomers are removed during the devolatization process. The polymer melt is pumped to a die for underwater pellet cutting.

Process details and results are contained in Table 8. Selected polymer properties are provided in Table 9.

TABLE 8

Polymerization Conditions for Polymers 19a–j.

| Ex. | $C_2H_4$ lb/hr | $C_8H_{16}$ lb/hr | Solv. lb/hr | $H_2$ sccm[1] | T °C. | Cat A1[2] Conc. ppm | Cat A1 Flow lb/hr | Cat B2[3] Conc. ppm | Cat B2 Flow lb/hr | DEZ Conc wt % | DEZ Flow lb/hr |
|---|---|---|---|---|---|---|---|---|---|---|---|
| 19a | 55.29 | 32.03 | 323.03 | 101 | 120 | 600 | 0.25 | 200 | 0.42 | 3.0 | 0.70 |
| 19b | 53.95 | 28.96 | 325.3 | 577 | 120 | 600 | 0.25 | 200 | 0.55 | 3.0 | 0.24 |
| 19c | 55.53 | 30.97 | 324.37 | 550 | 120 | 600 | 0.216 | 200 | 0.609 | 3.0 | 0.69 |
| 19d | 54.83 | 30.58 | 326.33 | 60 | 120 | 600 | 0.22 | 200 | 0.63 | 3.0 | 1.39 |
| 19e | 54.95 | 31.73 | 326.75 | 251 | 120 | 600 | 0.21 | 200 | 0.61 | 3.0 | 1.04 |
| 19f | 50.43 | 34.80 | 330.33 | 124 | 120 | 600 | 0.20 | 200 | 0.60 | 3.0 | 0.74 |
| 19g | 50.25 | 33.08 | 325.61 | 188 | 120 | 600 | 0.19 | 200 | 0.59 | 3.0 | 0.54 |
| 19h | 50.15 | 34.87 | 318.17 | 58 | 120 | 600 | 0.21 | 200 | 0.66 | 3.0 | 0.70 |
| 19i | 55.02 | 34.02 | 323.59 | 53 | 120 | 600 | 0.44 | 200 | 0.74 | 3.0 | 1.72 |
| 19j | 7.46 | 9.04 | 50.6 | 47 | 120 | 150 | 0.22 | 76.7 | 0.36 | 0.5 | 0.19 |

| Ex. | Cocat 1 Conc. ppm | Cocat 1 Flow lb/hr | Cocat 2 Conc. ppm | Cocat 2 Flow lb/hr | [Zn][4] in polymer ppm | Poly Rate[5] lb/hr | Conv[6] wt % | Polymer wt % | Eff.[7] |
|---|---|---|---|---|---|---|---|---|---|
| 19a | 4500 | 0.65 | 525 | 0.33 | 248 | 83.94 | 88.0 | 17.28 | 297 |
| 19b | 4500 | 0.63 | 525 | 0.11 | 90 | 80.72 | 88.1 | 17.2 | 295 |
| 19c | 4500 | 0.61 | 525 | 0.33 | 246 | 84.13 | 88.9 | 17.16 | 293 |
| 19d | 4500 | 0.66 | 525 | 0.66 | 491 | 82.56 | 88.1 | 17.07 | 280 |
| 19e | 4500 | 0.64 | 525 | 0.49 | 368 | 84.11 | 88.4 | 17.43 | 288 |
| 19f | 4500 | 0.52 | 525 | 0.35 | 257 | 85.31 | 87.5 | 17.09 | 319 |
| 19g | 4500 | 0.51 | 525 | 0.16 | 194 | 83.72 | 87.5 | 17.34 | 333 |

TABLE 8-continued

Polymerization Conditions for Polymers 19a–j.

| | | | | | | | | | |
|---|---|---|---|---|---|---|---|---|---|
| 19h | 4500 | 0.52 | 525 | 0.70 | 259 | 83.21 | 88.0 | 17.46 | 312 |
| 19i | 4500 | 0.70 | 525 | 1.65 | 600 | 86.63 | 88.0 | 17.6 | 275 |
| 19j | — | — | — | — | — | — | — | — | — |

[1] standard cm³/min
[2] [N-(2,6-di(1-methylethyl)phenyl)amido)(2-isopropylphenyl)(α-naphthalen-2-diyl(6-pyridin-2-diyl)methane)]hafnium dimethyl
[3] bis-(1-(2-methylcyclohexyl)ethyl)(2-oxoyl-3,5-di(t-butyl)phenyl)immino) zirconium dimethyl
[4] ppm in final product calculated by mass balance
[5] polymer production rate
[6] weight percent ethylene conversion in reactor
[7] efficiency, kg polymer/g M where g M = g Hf + g Z

TABLE 9

Polymer Physical properties

| Polymer Ex. No. | Density (g/cc) | I2 | I10 | I10/I2 | Mw (g/mol) | Mn (g/mol) | Mw/Mn | Heat of Fusion (J/g) | Tm (° C.) | Tc (° C.) | TCRYSTAF (° C.) | Tm – TCRYSTAF (° C.) | CRYSTAF Peak Area (wt %) |
|---|---|---|---|---|---|---|---|---|---|---|---|---|---|
| 19g | 0.8649 | 0.9 | 6.4 | 7.1 | 135000 | 64800 | 2.1 | 26 | 120 | 92 | 30 | 90 | 90 |
| 19h | 0.8654 | 1.0 | 7.0 | 7.1 | 131600 | 66900 | 2.0 | 26 | 118 | 88 | — | — | — |

TABLE 9A

Average Block Index For exemplary polymers[1]

| Example | Zn/C$_2$[2] | Average BI |
|---|---|---|
| Polymer f | 0 | 0 |
| Polymer 8 | 0.56 | 0.59 |
| Polymer 19a | 1.3 | 0.62 |
| Polymer 5 | 2.4 | 0.52 |
| Polymer 19b | 0.56 | 0.54 |
| Polymer 19h | 3.15 | 0.59 |

[1] Additional information regarding the calculation of the block indices for various polymers is disclosed in U.S. Patent Application Serial No. __ (insert when known), entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose which is incorporated by reference herein in its entirety.
[2] Zn/C$_2$ * 1000 = (Zn feed flow * Zn concentration/1000000/Mw of Zn)/(Total Ethylene feed flow * (1 – fractional ethylene conversion rate)/Mw of Ethylene) * 1000. Please note that "Zn" in "Zn/C$_2$ * 1000" refers to the amount of zinc in diethyl zinc ("DEZ") used in the polymerization process, and "C2" refers to the amount of ethylene used in the polymerization process.

Comparative Examples L-P

Comparative Example L was a f-PVC, i.e., flexible poly(vinyl chloride), (obtained from Wofoo Plastics, Hong Kong, China). Comparative Example M was a SBS copolymer, VECTOR™ 7400 (obtained from Dexco Polymers, Houston, Tex.). Comparative Example N was a partially crosslinked TPV, VYRAM™ TPV 9271-65 (obtained from Advanced Elastomer Systems, Akron, Ohio). Comparative Example 0 was a SEBS copolymer, KRATON® G2705 (obtained from Kraton Polymers, Houston, Tex.). Comparative Example P was a SBS copolymer, KRATON® G3202 (obtained from Kraton Polymers, Houston, Tex.).

Examples 20-26

Example 20 was 100% of Example 19f. Example 21 was similar to Example 20, except that 30% of Example 19f was replaced with a high density polyethylene (HDPE), DMDA-8007 (from The Dow Chemical Company, Midland, Mich.). Example 22 was similar to Example 20, except that 20% of Example 19f was replaced with DMDA-8007. Example 23 was similar to Example 20, except that 10% of Example 19f was replaced with DMDA-8007. Example 24 was similar to Example 20, except that 30% of Example 19f was replaced with a homopolymer polypropylene, H700-12 (from The Dow Chemical Company, Midland, Mich.). Example 25 was similar to Example 20, except that 20% of Example 19f was replaced with H700-12. Example 26 was similar to Example 20, except that 10% of Example 19f was replaced with H700-12.

Comparative Examples Q-X

Comparative Example Q was similar to Example 21, except that Example 19f was replaced with a polyolefin elastomer, ENGAGE® ENR 7380 (from DuPont Dow Elastomers, Wilmington, Del.). Comparative Example R was similar to Example 24, except that Example 19f was replaced with ENGAGE® ENR 7380. Comparative Example S was similar to Example 20, except that Example 19f was replaced with a polyolefin elastomer, ENGAGE® 8407 (from DuPont Dow Elastomers, Wilmington, Del.) and the sample is 30 mil (0.762 mm) thick. Comparative Example T was similar to Example 20, except that Example 19f was replaced with a polyolefin elastomer, ENGAGE® 8967 (from DuPont Dow Elastomers, Wilmington, Del.). Comparative Example U was similar to Example 24, except that Example 19f was replaced with a propylene-ethylene copolymers, VERSIFY® DE3300 (from The Dow Chemical Company, Midland, Mich.). Comparative Example V was similar to Example 24, except that Example 19f was replaced with a propylene-ethylene copolymer, VERSIFY® DE3400 (from The Dow Chemical Company, Midland, Mich.). Comparative Example W was similar to Example 22, except that Example 19f was replaced with VERSIFY® DE3300. Comparative Example X was similar to Example 322 except that Example 19f was replaced with VERSIFY® DE3400.

Examples 27-33

Example 27 was a mixture of 56% of Example 19f, 16% of H700-12, and 28% of RENOIL® 625 (an oil from Renkert Oil Elversony, Pa.). Example 28 was similar to Example 27, except that the mixture was 33% of Example 19f, 17% of H700-12, and 50% of RENOIL® 625. Example 29 was similar to Example 27, except that the mixture was 56% of Example 19f, 16% of DMDA-8007, and 28% of RENOIL® 625. Example 30 was similar to Example 27, except that the mixture was 33% of Example 19f, 17% of DMDA-8007, and 50% of RENOIL® 625. Example 31 was similar to Example 27, except that the mixture was 17% of Example 19f, 16% of H700-12, 16% of KRATON® G2705 and 50% of RENOIL® 625. Example 32 was similar to Example 20, except that 1% of AMPACET® 10090 (an Erucamide concentrate from Ampacet Corporation, Tarrytown, N.Y.), was added as the slip/anti-blocking agent. Example 33 was similar to Example 32, except that 5% of AMPACET® 10090 was added as the slip/anti-blocking agent.

Mechanical and Physical Properties Measurements

The Thermomechanical (TMA) properties, hardness, compression set properties, flexural modulus, gull wing tear strength, Vicat softening point, blocking property, scratch mar resistance, ultimate elongation, 100% modulus, 300% modulus, ultimate tensile strength, and yield strength of Comparative Examples L-X and Examples 20-33 were measured and the results are shown in Tables 10 and 11 below.

The penetration temperature by thermal mechanical analysis (TMA) technique was conducted on 30 mm diameter×3.3 mm thick, compression molded discs, formed at 180° C. and 10 MPa molding pressure for 5 minutes and then air quenched. The instrument used was a Perkin-Elmer TMA 7. In the TMA test, a probe with 1.5 mm radius tip (P/N N519-0416) was applied to the surface of the sample disc with 1N force. The temperature was raised at 5° C./minute from 25° C. The probe penetration distance was measured as a function of temperature. The experiment ended when the probe had penetrated 0.1 mm and 1 mm respectively into the sample. The 0.1 mm and 1 mm penetration temperatures of each example are listed in Table 10 below.

The Shore D hardness of each sample was measured according to ASTM D 2240, which is incorporated herein by reference.

The compression set properties of each sample at 23° C. and 70° C. were measured according to ASTM D 4703, which is incorporated herein by reference.

The flexural modulus of each sample was measured according to the method described in ASTM D 790, which is incorporated herein by reference.

The gull wing tear strength of each sample was measured according to the method described in ASTM D 1004, which is incorporated herein by reference.

The Vicat softening point of each sample was measured according to the method described in ASTM D1525, which is incorporated herein by reference.

The blocking of each sample was measured by stacking six each 4"×4'×0.125" injection molded plaques, leaving the plaques at ambient conditions (73 F) for 24 hours, then un-stacking the plaques. The blocking rating is between 1 and 5 with 5 being excellent (all the plaques easily un-stacked) to 1 being unacceptable (where the 6 plaques had adhered to each other so much that none of the plaques could be separated by hand).

The scratch mar resistance of each sample was measured by manually scribing a X on a 4×4×0.125 inch plaque from corner to corner with a rounded plastic stylus. The scratch mar resistance rating is between 1 and 5 with 5 is excellent (where no evidence of the X is visible) and 1 is unacceptable (where the X is highly visible and can not be rubbed off).

The 100% modulus, 300% modulus, ultimate tensile strength, ultimate elongation, and yield strength of each sample were measured according to ASTM D 412, which is incorporated herein by reference.

TABLE 10

| Sample | 0.1 mm TMA (° C.) | 1.0 mm TMA (° C.) | Shore D | Compression Set at 70° C. | Compression Set at 23° C. | Flexural Modulus (psi) | Tear Strength (lbs/in) | Vicat Softening Point (° C.) | Blocking | Scratch Mar Resistance |
|---|---|---|---|---|---|---|---|---|---|---|
| Comp. Ex. L | 49 | 129 | 53 | 67 | 49 | 26654 | 391 | 69 | 5 | 4 |
| Comp. Ex. M | 25 | 78 | 10 | 91 | 17 | 1525 | / | 58 | 5 | 4 |
| Comp. Ex. N | 60 | 146 | 15 | 51 | 30 | 4613 | 149 | 65 | 4 | 4 |
| Comp. Ex. O | 71 | 137 | / | 40 | 21 | 2781 | 169 | / | 3 | 1 |
| Comp. Ex. P | 53 | 71 | / | 106 | 15 | 2043 | 149 | / | 1 | 1 |
| Example 20 | 67 | 99 | 17 | 57 | 21 | 4256 | 206 | 44 | 1 | 1 |
| Example 21 | 94 | 111 | 34 | 55 | 43 | 22071 | 441 | 66 | 1 | 1 |
| Example 22 | 98 | 113 | 33 | 56 | 31 | 14261 | 323 | 59 | 1 | 1 |
| Example 23 | 74 | 103 | 25 | 52 | 28 | 6943 | 254 | 50 | 1 | 1 |
| Example 24 | 99 | 111 | 36 | 66 | 37 | 24667 | 421 | 67 | 1 | 1 |
| Example 25 | 84 | 104 | 30 | 61 | 29 | 12325 | 331 | 55 | 1 | 1 |
| Example 26 | 81 | 104 | 24 | 61 | 23 | / | 257 | 47 | 1 | 1 |
| Comp. Ex. Q | 101 | 119 | 41 | 63 | 10 | 21358 | 426 | 59 | 1 | 1 |
| Comp. Ex. R | 101 | 146 | 41 | 97 | 27 | 20267 | / | 58 | 3 | 3 |
| Comp. Ex. S | 35 | 52 | 16 | 112 | 35 | 2116 | 186 | / | 1 | 1 |
| Comp. Ex. T | 48 | 95 | 22 | 83 | 37 | 6475 | 234 | / | 2 | 1 |
| Comp. Ex. U | 116 | 142 | 40 | / | / | / | / | / | 3 | 4 |
| Comp. Ex. V | 53 | 113 | 33 | / | / | 21348 | / | / | 1 | 3 |
| Comp. Ex. W | 68 | 95 | 33 | 76 | 44 | 11497 | 328 | / | 2 | 3 |
| Comp. Ex. X | 40 | 64 | 25 | 87 | 40 | 11384 | 281 | / | 1 | 1 |
| Example 27 | 76 | 105 | 18 | 48 | 28 | / | 252 | / | 2 | 1 |
| Example 28 | 49 | 95 | 13 | 57 | 27 | / | 177 | / | 2 | 2 |
| Example 29 | 63 | 106 | 18 | 42 | 30 | / | 215 | 47 | 2 | 1 |
| Example 30 | 54 | 99 | 10 | / | / | / | / | 48 | 2 | 2 |

TABLE 10-continued

| Sample | 0.1 mm TMA (° C.) | 1.0 mm TMA (° C.) | Shore D | Compression Set at 70° C. | Compression Set at 23° C. | Flexural Modulus (psi) | Tear Strength (lbs/in) | Vicat Softening Point (° C.) | Blocking | Scratch Mar Resistance |
|---|---|---|---|---|---|---|---|---|---|---|
| Example 31 | 48 | 99 | 12 | 55 | 41 | / | / | 57 | 3 | 2 |
| Example 32 | 69 | 99 | 20 | 54 | 21 | / | / | 44 | 5 | 4 |
| Example 33 | 74 | 99 | 19 | 52 | 19 | / | / | 44 | 5 | 5 |

TABLE 11

| Sample | 100% Modulus (psi) | 300% Modulus (psi) | Ultimate Tensile Strength (psi) | Ultimate Elongation (%) | Yield Strength (psi) |
|---|---|---|---|---|---|
| Comp. Ex. L | 1934 | 0 | 2522 | 224 | 607 |
| Comp. Ex. M | 198 | 140 | 549 | 505 | 45 |
| Comp. Ex. N | 336 | 175 | 604 | 459 | 122 |
| Comp. Ex. O | 213 | 118 | 1038 | 656 | 82 |
| Comp. Ex. P | 613 | 0 | 563 | 97 | 253 |
| Example 20 | 333 | 130 | 672 | 1039 | 162 |
| Example 21 | 795 | 258 | 1430 | 1007 | 652 |
| Example 22 | 589 | 198 | 1062 | 1026 | 443 |

Comparative Examples L, M, N, O and P are commercial flexible molded goods resins which are not olefin-based. Examples 20-26 are various embodiments of this invention (as a base resin or as a blend of the base resin with PP and/or HDPE) demonstrating the improved balance of low modulus and high upper service temperature. Comparative Examples Q-X are commercial flexible molded good resins that are olefin-based. Examples 20-26 demonstrate the improved balance of low modulus and high upper service temperature over Comparative Examples Q-X.

SEBS/Inventive Interpolymer Blends

Blends of ethylene/α-olefin block copolymer and hydrogenated styrenics block copolymer (OBC/SEBS) were prepared using a Haake Rheomix 300 rheometer. The temperature of the sample bowl was set at 190° C. and the rotor speed was 40 rpm. After all the components were added, the mixing was continued for about five minutes or until a stable torque has been established. Samples for further testing and evaluation were compression molded a Garver automatic press at 190° C. under 44.45 kN force for 3 minutes. The molten materials were subsequently quenched with the press equilibrated at room temperature using an electronic cooling bath.

Comparative Examples Y1-Y5

Comparative Example Y1 was 100% of KRATON® G1652, a styrene-ethylene/butylenes-styrene block copolymer available from Shell Chemical Company, Houston, Tex. Comparative Example Y1 was the same as Comparative Example J*. Comparative Example Y2 was a blend of 75% of KRATON® G1652 and 25% of AFFINITY® EG8100. Comparative Example Y3 was a blend of 50% of KRATON® G1652 and 50% of AFFINITY® EG8100. Comparative Example Y4 was a blend of 25% of KRATON®G1652 and 75% of AFFINITY® EG8100. Comparative Example Y5 was 100% AFFINITY® EG8100. Comparative Example Y5 was the same as Comparative Example H*.

Examples 34-45

Example 34 was a blend of 75% of KRATON® G1652 and 25% of Example or Polymer 19a. Example 35 was a blend of 50% of KRATON® G1652 and 50% of Example 19a. Example 36 was a blend of 25% of KRATON® G1652 and 75% of Example 19a. Example 37 was the same as Example 19a. Example 38 was a blend of 75% of KRATON® G1652 and 25% of Example 19b. Example 39 was a blend of 50% of KRATON® G1652 and 50% of Example 19b. Example 40 was a blend of 25% of KRATON® G1652 and 75% of Example 19b. Example 41 was the same as Example 19b. Example 42 was a blend of 75% of KRATON® G1652 and 25% of Polymer 19i. Polymer 19i was an interpolymer prepared substantially similarly to Examples 1-19 and Example 19a-19h. One skilled in the art knows how to manipulate process conditions, such as shuttling agent ratios, hydrogen flow, monomer concentration, etc., to make a target polymer using the process conditions already detailed in the instant application. Example 43 was a blend of 50% of KRATON® G1652 and 50% of Polymer 19i. Example 44 was a blend of 25% of KRATON® G1652 and 75% of Polymer 19i. Example 45 was 100% of Polymer 19i.

Mechanical and Physical Properties Measurement

The thermomechanical (TMA) properties, elastic recovery at 300% strain, elongation at break, tensile strength and elmendorf tear strength of comparative examples Y1-Y5 and Examples 34-45 were measured by methods described herein and known to one of skill in the art and the results are shown in Table 12 below.

TABLE 12

Compositions and properties of SEBS blends of Examples 34–45 and Comparative Examples Y1–Y5.

| | Component B content, % | Component B[2] | TMA Temperature (° C.)[1] | Elastic Recovery @300% strain | Elongation @ Break (%) | Tensile Strength (MPa) | Elmendorf tear (g/mil) |
|---|---|---|---|---|---|---|---|
| Comparative Example Y1 | 0 | AFFINITY ® EG8100[3] | 97 | 92 | 589.8 | 21.2 | 70.2 |
| Comparative Example Y2 | 25 | AFFINITY ® EG8100 | 86 | 90 | 675.8 | 23.82 | 81.04 |
| Comparative Example Y3 | 50 | AFFINITY ® EG8100 | 71 | 82 | 664.3 | 17.08 | 47.57 |
| Comparative Example Y4 | 75 | AFFINITY ® EG8100 | 63.3 | 73 | 746.5 | 17.44 | 43.16 |
| Comparative Example Y5 | 100 | AFFINITY ® EG8100 | 60.2 | 61.7 | 777.4 | 13.52 | 55.6 |

TABLE 12-continued

Compositions and properties of SEBS blends of Examples 34–45 and Comparative Examples Y1–Y5.

|  | Component B content, % | Component B[2] | TMA Temperature (° C.)[1] | Elastic Recovery @300% strain | Elongation @ Break (%) | Tensile Strength (MPa) | Elmendorf tear (g/mil) |
|---|---|---|---|---|---|---|---|
| Example 34 | 25 | 19a[4] | 100 | 92 | 742.4 | 28.46 | 50.71 |
| Example 35 | 50 | 19a | 103 | 89 | 763.3 | 18.75 | 51.02 |
| Example 36 | 75 | 19a | 106 | 83.7 | 827.9 | 17.77 | 56.89 |
| Example 37 | 100 | 19a | 107.2 | 78.3 | 986.4 | 13.63 | 204.3 |
| Example 38 | 25 | 19b[5] | 99.5 | 92.7 | 693.6 | 24.45 | 41.27 |
| Example 39 | 50 | 19b | 101 | 90 | 770.8 | 21.1 | 36.05 |
| Example 40 | 75 | 19b | 104.9 | 86 | 813.1 | 18.18 | 34.7 |
| Example 41 | 100 | 19b | 106 | 80 | 931.5 | 13.93 | 67.76 |
| Example 42 | 25 | 19i[6] | 100 | 93.3 | 672 | 22.13 | 47.11 |
| Example 43 | 50 | 19i | 102.5 | 91 | 704.1 | 15.62 | 34.76 |
| Example 44 | 75 | 19i | 103.7 | 88 | 1059 | 18.42 | 20.85 |
| Example 45 | 100 | 19i | 108 | 80.2 | 1518 | 13.3 | 39.5 |

Notes:
[1]TMA temperature was measured at 1 mm penetration with a heating rate of 5° C./min under 1N force.
[2]The rest is Component A which is KRATON ® G1652, a SEBS available from Shell Chemical Company.
[3]AFFINITY ® EG8100 is a substantially linear ethylene/1-octene copolymer having $I_2$ of 1 g/10 min. (ASTM D-1238) and density of 0.870 g/cc (ASTMD-792).
[4]19a is an inventive ethylene/octene copolymer having $I_2$ of 1 g/10 min. and density of 0.878 g/cc.
[5]19b is an inventive ethylene/octene copolymer having $I_2$ of 1 g/10 min. and density of 0.875 g/cc.
[6]19i is an inventive ethylene/butene copolymer having $I_2$ of 1 g/10 min. and density of 0.876 g/cc.

Figure 8:
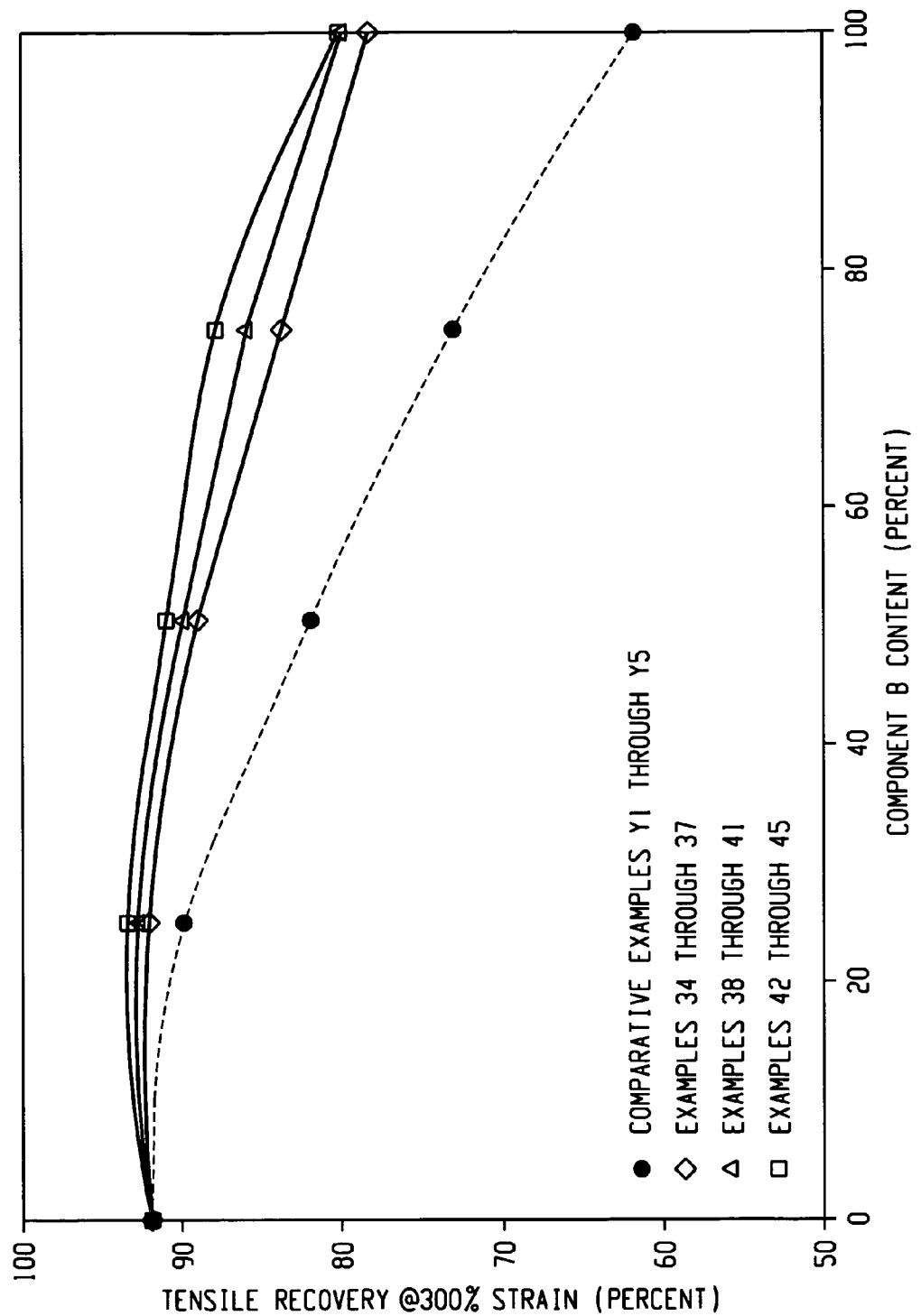
FIG. 8 shows tensile recovery of two-component blends containing Component A (i.e., KRATON® G1652, a SEBS) and Component B (i.e., Dow AFFINITY® EG8100 or inventive Polymer 19a, 19b or 19i). The cycles represent blends containing KRATON® G1652 and Dow AFFINITY® EG8100 (i.e., Comparative Examples Y1-Y5 having respectively 0%, 25%, 50%, 75% and 100% of Dow AFFINITY® EG8100). The diamonds represent blends containing KRATON® G1652 and inventive Polymer 19a (i.e., Examples 34-37 having respectively 25%, 50%, 75% and 100% of Polymer 19a). The triangles represent the blends containing KRATON® G1652 and inventive Polymer 19b (i.e., Examples 38-41 having respectively 25%, 50%, 75% and 100% of Polymer 19b). The squares represent blends containing KRATON® G1652 and inventive Polymer 19i (i.e., Examples 42-45 having respectively 25%, 50%, 75% and 100% of Polymer 19i).
Figure 9:
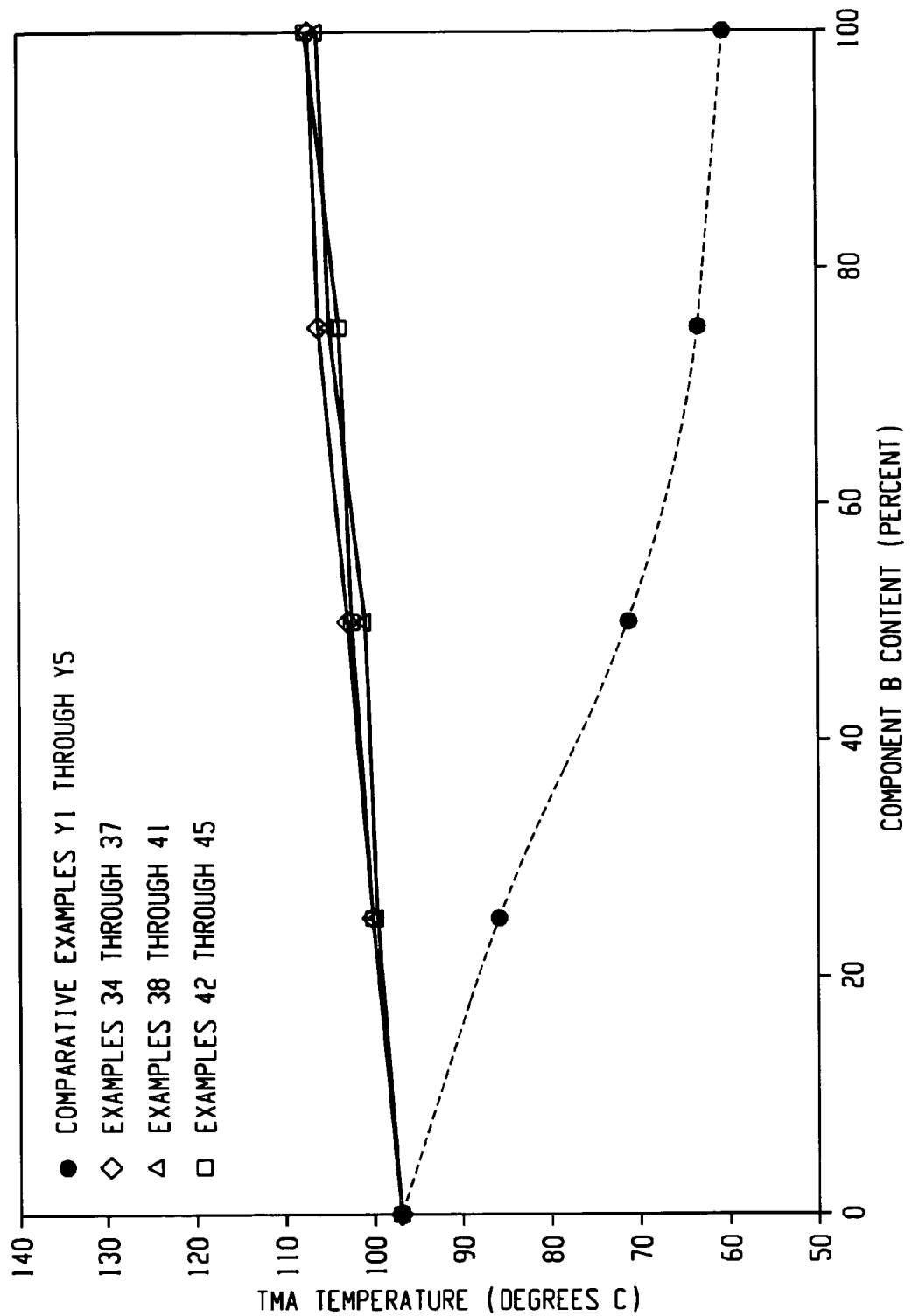
FIG. 9 shows heat resistance properties (i.e., TMA temperatures) of two-component blends containing Component A (i.e., KRATON® G1652, a SEBS) and Component B (i.e., Dow AFFINITY® EG8100 or inventive Polymer 19a, 19b or 19i). The cycles represent blends containing KRATON® G1652 and Dow AFFINITY® EG8100 (i.e., Comparative Examples Y1-Y5 having respectively 0%, 25%, 50%, 75% and 100% of Dow AFFINITY®EG8100). The diamonds represent blends containing KRATON® G1652 and inventive Polymer 19a (i.e., Examples 34-37 having respectively 25%, 50%, 75% and 100% of Polymer 19a). The triangles represent the blends containing KRATON® G1652 and inventive Polymer 19b (i.e., Examples 38-41 having respectively 25%, 50%, 75% and 100% of Polymer 19b). The squares represent blends containing KRATON® G1652 and inventive Polymer 19i (i.e., Examples 42-45 having respectively 25%, 50%, 75% and 100% of Polymer 19i).

Elastic recovery properties of exemplary blends (i.e., Examples 34-45) and Comparative Examples Y1-Y5 at various amounts of SEBS (i.e., KRATON® G1652) in the blend are shown in FIG. 8. The TMA temperatures of exemplary blends and Comparative Examples 1-5 at various amounts of SEBS in the blend are shown in FIG. 9. As seen in Table 12 and FIGS. 8-9, the exemplary blends (i.e., Examples 34-45) exhibit improved heat resistance and elastic recovery properties over the corresponding Comparative Examples Y1-Y5.

HMS-HDPE/Inventive Interpolymer or HMS-PP/INvebtive Interpolymer Blends

Comparative Examples Z1-Z4

Comparative Example Z1 was 100% of Polymer 19j. Polymer 19j was an inventive ethylene/octene copolymer having a Zn level of 517 ppm, a density of 0.877 g/cc and a melt index ($I_2$) of 5. Comparative Example Z2 was 100% of Polymer 19k. Polymer 19k was an inventive ethylene/octene copolymer having a Zn level of 693 ppm, a density of 0.877 g/cc and a melt index ($I_2$) of 5. Comparative Example Z3 was 100% of Polymer 19l. Polymer 19l was an inventive ethylene/octene copolymer having a density of 0.877 g/cc and a melt index ($I_2$) of 30. Comparative Example Z4 was 100% of Polymer 19m. Polymer 19m was an inventive ethylene/octene copolymer having a Zn level of 255 ppm, a density of 0.866 g/cc and a melt index ($I_2$) of 5. Polymers 19j, 19k, 19l and 19m were prepared substantially similarly to Examples 1-19 and Example 19a-19h. One skilled in the art knows how to manipulate process conditions, such as shuttling agent ratios, hydrogen flow, monomer concentration, etc., to make a target polymer using the process conditions already detailed in the instant application.

Examples 46-57

Example 46 was a blend of 90% of Polymer 19m and 10% of PROFAX® PF814, a HMS-PP from Basell Polyolefins, Elkton, Md. Example 47 was a blend of 85% of Polymer 19m and 15% of PROFAX® PF814. Example 48 was a blend of 95% of Polymer 19m and 5% of PROFAX® PF814. Example 49 was a blend of 95% of Polymer 19j and 5% of PROFAX® PF814. Example 50 was a blend of 90% of Polymer 19j and 10% of PROFAX® PF814. Example 51 was a blend of 85% of Polymer 19j and 15% of PROFAX® PF814. Example 52 was a blend of 85% of Polymer 19k and 15% of PROFAX® PF814. Example 53 was a blend of 90% of Polymer 19k and 10% of PROFAX® PF814. Example 54 was a blend of 95% of Polymer 19k and 5% of PROFAX® PF814. Example 55 was a blend of 95% of Polymer 19l and 5% of PROFAX® PF814. Example 56 was a blend of 90% of Polymer 19l and 10% of PROFAX® PF814. Example 57 was a blend of 85% of Polymer 19l and 15% of PROFAX® PF814.

Comparative Examples Z1-Z4 and Examples 46-57 were dry blended (if a blend) and then injection molded using a 80 ton Arburg 370C injection molding machine (available from ARBURG GmbH+Co KG, Lossburg, Germany) into a 4 inch by 6 inch by 0.125 inch test plaque. The mold had a polished smooth surface and used a cold runner through a fan gate. The molding conditions were held constant at 23 seconds total cycle time (to test the ability of the resins to solidify quickly).

Comparative Examples Z1-Z4 and Examples 46-57 were injection molded as described above into plaques or parts, which were subsequently subjected to "Parts Stick in Mold" test, "Parts Initially Stick Together" test, Shore A hardness, "Part Quality" test and "Aged Part Tackiness" test.

The "Parts Stick in Mold" test included observing whether the molded parts adhered to the mold surfaces and would not be ejected from the mold. A "Yes" rating is unfavorable and means that the molded parts did stick in the mold and required manual extraction. A "No" is favorable and means that the molded parts did not stick in the mold and fell to the conveyor system without manual extraction. In the "Parts Initially Stick Together" test, two molded parts of each sample immediately after injection molding were placed on top of each other; hand pressure was applied; and then the molded parts were pulled away from each other. The amount of force required to remove the two parts from each other was measured. A rating for each pair was given from 3 (best, no sticking, no force required to remove the two samples) to 1 (worse, excessive sticking, substantial hand force was required to removed the two samples). The molded parts were then set aside and laid flat for 24 hours. After 24 hours, the Shore A hardness of each molded part was measured according to ASTM D2240, which is incorporated herein by reference. The average of two Shore A hardness readings for each sample were recorded. Further, each molded part was graded for "Part Quality" and "Aged Part Tackiness." The "Part Quality" was rated from 5 (best, absolute perfect part without voids, warpage, shrinkage) to 1 (worse, excessive voids, a warped parts, excessive shrinkage). The "Aged Part Tackiness" was tested by placing two molded parts on top of each other; applying hand pressure, and pulling the parts away from each other. The amount of force required to remove the two parts from each other was measured. A rating of each pair was given from 5 (best, no sticking, no force required to remove the two samples) to 1 (worse, excessive sticking, substantial hand force was required to removed the two samples). The test results of Comparative Examples Z1-Z4 and Examples 46-57 are shown in Table 13 below.

The test data in Table 13 indicate that the tackiness and hardness of the inventive the ethylene/α-olefin interpolymers (e.g., Polymers 19j, 19k, 19l, and 19m) can be improved by blending each of them with a HMS-PP such as PROFAX® PF814.

Some of the polymer blends disclosed herein can provide a better combination of moldability, appealing appearance, non-stickiness and mechanical properties than any of the components of the polymer blends alone. For example, Examples 21-26, which are polymer blends of Polymer 19f and at least one other polymer, demonstrate a better balance of flexural modulus, tear strength, and 0.1 mm penetration temperature by TMA than those of Polymer 19f alone (i.e., Example 20) or Comparative Examples M-P, which are not polymer blends. Similarly, the polymer blends comprising Polymer 19a, 19b or 19i (i.e, Examples 34-36, 38-40 and 42-44) has a better balance of 1 mm penetration temperature by TMA and elastic recovery than KRATON® G1652, AFFINITY® EG8100 or the corresponding Polymer 19a, 19b or 19i

TABLE 13

| Sample | Tacky Flexible Resin Component | Modifying Resin Component | Part sticks in mold | Parts initially stick together[1] | Shore A Hardness | Part Quality[2] | Aged Part Tackiness[3] |
|---|---|---|---|---|---|---|---|
| Comparative Example Z1 | 100% Polymer 19j | NONE | yes | 1 | 74 | 3 | 1 |
| Comparative Example Z2 | 100% Polymer 19k | NONE | yes | 1 | 76 | 3 | 1 |
| Comparative Example Z3 | 100% Polymer 19l | NONE | yes | 1 | 71 | 4 | 1 |
| Comparative Example Z4 | 100% Polymer 19m | NONE | yes | 1 | 63 | 4 | 1 |
| Example 46 | 90% Polymer 19m | 10% PROFAX ® PF814 | no | 3 | 76 | 5 | 5 |
| Example 47 | 85% Polymer 19m | 15% PROFAX ® PF814 | no | 3 | 77 | 5 | 5 |
| Example 48 | 95% Polymer 19m | 5% PROFAX ® PF814 | no | 2 | 66 | 4 | 4 |
| Example 49 | 95% Polymer 19j | 5% PROFAX ® PF814 | no | 2 | 80 | 5 | 4 |
| Example 50 | 90% Polymer 19j | 10% PROFAX ® PF814 | no | 3 | 81 | 5 | 5 |
| Example 51 | 85% Polymer 19j | 15% PROFAX ® PF814 | no | 3 | 86 | 5 | 5 |
| Example 52 | 85% Polymer 19k | 15% PROFAX ® PF814 | no | 3 | 84 | 5 | 5 |
| Example 53 | 90% Polymer 19k | 10% PROFAX ® PF814 | no | 3 | 84 | 5 | 5 |
| Example 54 | 95% Polymer 19k | 5% PROFAX ® PF814 | no | 2 | 80 | 5 | 4 |
| Example 55 | 95% Polymer 19k | 5% PROFAX ® PF814 | no | 2 | 80 | 5 | 4 |
| Example 56 | 90% Polymer 19k | 10% PROFAX ® PF814 | no | 3 | 83 | 5 | 5 |
| Example 57 | 85% Polymer 19k | 15% PROFAX ® PF814 | no | 3 | 87 | 5 | 5 |

Note:
[1] The scale of the "Parts initially stick together" test is 3 = best 1 = worst;
[2] the scale of the "Part Quality" test is 5 = best (no tackiness), 1 = worse (extreme tackiness);
[3] the scale of the "Aged Part Tackiness" is 5 = best (minimal shrink, no bubbles, no curl, flat part), 1 = worse (excessive shrink, bubbles, curled part).

alone. Similarly, the polymer blends comprising Polymer 19j, 19k, 19l or 19m (i.e, Examples 46-57) has a better balance of tackiness (i.e., lower tackiness) and hardness (i.e, higher hardness) than the corresponding Polymer 19j, 19k, 19l or 19m alone.

As demonstrated above, embodiments of the invention provide various polymer blends which possess unique physical and mechanical properties that are suitable for making molded articles for a variety of applications. The blends have relatively low modulus, while maintaining relatively high heat resistance. Such balance of properties makes the blends suitable for making flexible molded articles. Moreover, some blends exhibit little or no stickiness in the surface.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A polymer blend comprising:
   (i) at least one ethylene/α-olefin multi-block interpolymer, wherein the ethylene/α-olefin multi-block interpolymer:
      (a) has a Mw/Mn from about 1.7 to about 3.5, at least one melting point, Tm, in degrees Celsius, and a density, d, in grams/cubic centimeter, wherein the numerical values of Tm and d correspond to the relationship:

$T_m \geq -2002.9 + 4538.5(d) - 2422.2(d)^2$; or (b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$\Delta T > -0.1299(\Delta H) + 62.81$ for $\Delta H$ greater than zero and up to 130 J/g, $\Delta T \geq 48°$ C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$Re > 1481 - 1629(d)$; or (d) has a molecular fraction which elutes between 40° C. and 130° C. when fractionated using TREF, charac-terized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) is characterized by a storage modulus at 25° C., G'(25° C.), and a storage modulus at 100° C., G'(100° C.), wherein the ratio of G'(25° C.) to G'(100° C.) is from about 1:1 to about 10:1; and
   (ii) at least one polyolefin, or at least one styrenic block copolymer, or a combination thereof.

2. The polymer blend of claim 1, wherein the ethylene/α-olefin interpolymer has a Mw/Mn from about 1.7 to about 3.5, at least one melting point, Tm, in degrees Celsius, and a density, d, in grams/cubic centimeter, wherein the numerical values of Tm and d correspond to the relationship:

$Tm \geq 858.91 - 1825.3(d) + 1112.8(d)^2$.

3. The polymer blend of claim 1, wherein the ethylene/α-olefin interpolymer has a Mw/Mn from about 1.7 to about 3.5 and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$\Delta T > -0.1299(\Delta H) + 62.81$ for $\Delta H$ greater than zero and up to 130 J/g, $\Delta T \geq 48°$ C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.

4. The polymer blend of claim 1, wherein the ethylene/α-olefin interpolymer is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$Re > 1481 - 1629(d)$.

5. The polymer blend of claim 4, wherein the numerical values of Re and d satisfy the following relationship:

$Re > 1491 - 1629(d)$.

6. The polymer blend of claim 4, wherein the numerical values of Re and d satisfy the following relationship:

$Re > 1501 - 1629(d)$.

7. The polymer blend of claim 4, wherein the numerical values of Re and d satisfy the following relationship:

$Re > 1511 - 1629(d)$.

8. The polymer blend of claim 1, wherein the ethylene/α-olefin interpolymer has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer.

9. The polymer blend of claim 1, wherein the ethylene/α-olefin interpolymer is characterized by a storage modulus at 25° C., G'(25° C.), and a storage modulus at 100° C., G'(100° C.), wherein the ratio of G'(25° C.) to G'(100° C.) is from about 1:1 to about 10:1.

10. The polymer blend of claim 1, wherein the α-olefin in the ethylene/α-olefin interpolymer is styrene, propylene, 1-butene, 1-hexene, 1-octene, 4-methyl-1-pentene, norbornene, 1-decene, 1,5-hexadiene, or a combination thereof.

11. The polymer blend of claim 1, wherein the ethylene/α-olefin interpolymer is present in the range from about 5% to about 95% by weight of the total composition.

12. The polymer blend of claim 1, wherein the polyolefin is an olefin homopolymer, an olefin copolymer, an olefin terpolymer or a combination thereof.

13. The polymer blend of claim 1, wherein the polyolefin is a high melt strength polypropylene, a high melt strength high density polyethylene, an ethylene/propylene copolymer, an ethylene/propylene/diene terpolymer, or a combination thereof.

14. The polymer blend of claim 1, wherein the styrenic block copolymer is a styrene-butadiene-styrene block copolymer, a styrene-ethylene-co-(butene)-styrene block copolymer or a combination thereof.

15. The polymer blend of claim 1, further comprising at least an additive.

16. The polymer blend of claim 14, wherein the additive is a slip agent, anti-blocking agent, plasticizer, oil, antioxidant, UV stabilizer, colorant or pigment, filler, lubricant, antifogging agent, flow aid, coupling agent, cross-linking agent, nucleating agent, surfactant, solvent, flame retardant, anti-static agent or a combination thereof.

17. The polymer blend of claim 1, wherein the polyolefin is a polypropylene.

18. The polymer blend of claim 1, wherein the polyolefin is a polypropylene having a melt strength of at least 10 cN.

19. The polymer blend of claim 1, wherein the styrenic block copolymer is a styrene-butadiene-styrene block copolymer.

20. The polymer blend of claim 1, wherein the styrenic block copolymer is a styrene-ethylene/butylene-styrene block copolymer.

21. A flexible molded article comprising the polymer blend of claim 1.

22. The flexible molded article of claim 21, wherein the flexible molded article is selected from the group consisting of toys, grips, soft touch handles, bumper rub strips, floorings, auto floor mats, wheels, casters, furniture and appliance feet, tags, seals, gaskets, automotive doors, bumper fascia, grill components, rocker panels, hoses, linings, office supplies, seals, liners, diaphragms, tubes, lids, stoppers, plunger tips, delivery systems, kitchen wares, shoes, shoe bladders, shoe soles and combinations thereof.

23. A flexible molded article comprising the polymer blend of claim 17.

24. The flexible molded article of claim 23, wherein the flexible molded article is selected from the group consisting of toys, grips, soft touch handles, bumper rub strips, floorings, auto floor mats, wheels, casters, furniture and appliance feet, tags, seals, gaskets, automotive doors, bumper fascia, grill components, rocker panels, hoses, linings, office supplies, seals, liners, diaphragms, tubes, lids, stoppers, plunger tips, delivery systems, kitchen wares, shoes, shoe bladders, shoe soles and combinations thereof.

* * * * *